(12) United States Patent
Katzlinger

(10) Patent No.: US 11,971,354 B2
(45) Date of Patent: Apr. 30, 2024

(54) METHODS AND SYSTEMS FOR FLUORESCENCE DETECTION USING INFRARED DYES

(71) Applicant: Molecular Devices, LLC, San Jose, CA (US)

(72) Inventor: Michael Katzlinger, Eugendorf (AT)

(73) Assignee: Molecular Devices, LLC, San Jose, CA (US)

( * ) Notice: Subject to any disclaimer, the term of this patent is extended or adjusted under 35 U.S.C. 154(b) by 649 days.

(21) Appl. No.: 16/717,046

(22) Filed: Dec. 17, 2019

(65) Prior Publication Data

US 2021/0055222 A1 Feb. 25, 2021

Related U.S. Application Data

(63) Continuation-in-part of application No. 15/053,428, filed on Feb. 25, 2016, now Pat. No. 10,571,396, which is a continuation-in-part of application No. 14/682,026, filed on Apr. 8, 2015, now Pat. No. 10,379,046.

(51) Int. Cl.
   *G01N 21/64* (2006.01)

(52) U.S. Cl.
   CPC ..... *G01N 21/6408* (2013.01); *G01N 21/6428* (2013.01); *G01N 2021/6421* (2013.01); *G01N 2021/6439* (2013.01)

(58) Field of Classification Search
   None
   See application file for complete search history.

(56) References Cited

U.S. PATENT DOCUMENTS

| | | |
|---|---|---|
| 4,474,892 A | 10/1984 | Murad |
| 4,591,550 A | 5/1986 | Hafeman et al. |
| 4,659,678 A | 4/1987 | Forrest |
| 5,674,698 A | 10/1997 | Zarling et al. |
| 6,268,222 B1 | 7/2001 | Chandler et al. |
| 6,537,829 B1 | 3/2003 | Zarling et al. |
| 9,188,527 B2 | 11/2015 | Atzler et al. |
| 10,379,046 B2 | 8/2019 | Katzlinger |
| 10,571,396 B2 | 2/2020 | Schramm |
| 2003/0228703 A1 | 12/2003 | Hoppe et al. |
| 2004/0043502 A1 | 3/2004 | Song et al. |
| 2004/0265938 A1 | 12/2004 | Remacle et al. |
| 2007/0012884 A1 | 1/2007 | Fishkin |
| 2007/0287709 A1 | 12/2007 | Goutopoulos |
| 2008/0138830 A1 | 6/2008 | De Pauw |
| 2009/0142856 A1 | 6/2009 | Hudack et al. |
| 2009/0159510 A1 | 6/2009 | Haushalter et al. |
| 2010/0035349 A1 | 2/2010 | Bau et al. |
| 2010/0184046 A1 | 7/2010 | Klass et al. |
| 2012/0283575 A1 | 11/2012 | Rao et al. |
| 2013/0150265 A1 | 6/2013 | Balog et al. |
| 2013/0162981 A1 | 6/2013 | Emeric |
| 2013/0190192 A1 | 7/2013 | Lowe |
| 2013/0260372 A1 | 10/2013 | Buermann et al. |
| 2014/0336061 A1 | 11/2014 | Haushalter |

FOREIGN PATENT DOCUMENTS

| | | |
|---|---|---|
| CN | 1632570 A | 6/2005 |
| CN | 101158688 A | 4/2008 |
| CN | 101475597 A | 7/2009 |
| CN | 104204799 A | 12/2014 |
| CN | 106290688 A | 1/2017 |
| EP | 2821500 A1 | 1/2015 |
| JP | 2006-349574 A | 12/2006 |
| JP | 2008-517280 A | 5/2008 |
| JP | 2010-046071 A | 3/2010 |
| JP | 2010-072933 A | 4/2010 |
| JP | 2012-525883 A | 10/2012 |
| WO | 9958951 A1 | 11/1999 |
| WO | 03/021212 | 3/2003 |
| WO | 2006/047621 | 5/2006 |
| WO | 2009077876 A2 | 6/2009 |
| WO | 2013184168 A1 | 12/2013 |

OTHER PUBLICATIONS

ICNIRP, Infrared Radiation, Accessed at: https://www.icnirp.org/en/frequencies/infrared/index.html#:~:text=Infrared%20radiation%20(IR)%2C%20also,3%20%C2%B5m%2D1%20mm). [Web] Accessed: Mar. 17, 2023 (Year: 2023).*

Kuningas, K. et al., "Simultaneous Use of Time-Resolved Fluorescence and Anti-Stokes Photoluminescence in a Bioaffinty Assay." Anal. Chem., vol. 77, No. 9, 2826-2834 (2005). ACS Publications, Washington, D.C.

Geddes, C. Review in Fluorescence 2009. New York: Springer, (2011). Print. (12 pages).

Riuttamaki, T, Upconverting Phosphor Technology: Exceptional Photoluminescent Properties Light Up Homogeneous Bioanalytical Assays, Turun Yliopiston Julkaisuja, Annales Universitatis Turkuensis, Turku 2011.

Sigma Aldrich, Sunstone® Luminescent UCP Nanocrystals, article from Sigma Aldrich's Website at http://www.sigma-aldrich.com/technical-documents/articles/biology/upconverting-ucp-nanocrystals_html#applications_ ; this reference was made of record in parent U.S. Appl. No. 15/053,428.

(Continued)

*Primary Examiner* — Ellen J Marcsisin
(74) *Attorney, Agent, or Firm* — Merchant & Gould P.C.

(57) ABSTRACT

Methods and systems for time-domain and wavelength domain resolved multiplexed time-resolved fluorescence of a sample having at least one of a first fluorescent label bound to a first analyte and a second fluorescent label bound to a second analyte. The sample also includes a third fluorescent label bound to a third analyte and a fourth fluorescent label bound to a fourth analyte. The first and second fluorescent labels emit wavelengths having a first and second lifetime. The third fluorescent label comprises an upconverting phosphor (UCP) emitting at a wavelength having a third lifetime, and the fourth fluorescent label comprises an infrared dye emitting at wavelength having a fourth lifetime. The methods and systems measure as a function of time intensities of at least one of more of the first, second, third, and fourth fluorescent labels.

20 Claims, 26 Drawing Sheets

(56) References Cited

OTHER PUBLICATIONS

"IRDye® Infrared Dyes—Products"; LI-COR, Inc., 2023; 4 pgs.
"DyLight™ 800 NHS Ester—Catalog No. 46421", Thermo Scientific™, 2023; 6 pgs.
"Alexa Fluor Dyes—Across the Spectrum", Thermo Fisher Scientific; 2023; 3 pgs.
"Active Esters and Kits for Labeling Proteins and Nucleic Acids—Table 1.2", Thermo Fisher Scientific; 2023; 4 pgs.
European Extended Search Report in Application 16777014.8, dated Dec. 12, 2018, 8 pages.
PCT International Preliminary Report on Patentability in Application PCT/US2016/019563 dated Oct. 19, 2017, 13 pages.
PCT International Search Report and Written Opinion for PCT/US2016/019563 dated Jun. 30, 2016, 14 pages.
Sloviter et al., "Substance P Receptor Expression by Inhibitory Interneurons of the Rat Hippocarnpus: Enhanced Detection Using Improved Immunocytochemical Methods for the Preservation and Co localization of GABA and Other Neuronal Markers", The Journal of Comparative Neurology, 430, (2001), p. 283-305.
Song et al., "Time-resolved lanthanide luminescence for lab-on-a-chip detection of biomarkers on cancerous tissues", Analyst, 134, (2009), p. 1991-1993.
Tan et al., "Nanoscaled lanthanide/nucleotide coordination polymer for detection of an anthrax biomarker", Sensors and Actuators B Chemical, 190:621-626.
Uniprot, "UniprotKB-P25103 (NKIR_HUMAN)". Sep. 21, 2011. Online: http://www.uniprot.org/uniprot/P25 I 03. Accessed via the Internet Archive. [https://web.archive.org/web/20111007170859/http://www.uniprot.org/uniprot/P25103] on May 25, 2016, 4 pages.

* cited by examiner

```
                                    100
┌─────────────────────────────────────────────────────────────────────┐
│ Providing a sample comprising a first fluorescent label bound to a first analyte and │
│ a second fluorescent label bound to a second analyte, wherein the first fluorescent  │
│ label has a first fluorescence emission lifetime, a first excitation wavelength, and a │ 110
│ first emission wavelength, and the second fluorescent label has a second            │
│ fluorescence emission lifetime, a second excitation wavelength, and a second        │
│ emission wavelength; wherein the second fluorescence emission lifetime is at least  │
│ 10 times longer than the first fluorescence emission lifetime.                      │
└─────────────────────────────────────────────────────────────────────┘
                                     │
                                     ▼
┌─────────────────────────────────────────────────────────────────────┐
│ Exciting the first fluorescent label with an excitation light having the first      │ 120
│ excitation wavelength, whereby the first fluorescent label emits a first detection  │
│ signal having the first emission wavelength.                                        │
└─────────────────────────────────────────────────────────────────────┘
                                     │
                                     ▼
┌─────────────────────────────────────────────────────────────────────┐
│ Exciting the second fluorescent label with an excitation light having the second    │ 130
│ excitation wavelength, whereby the second fluorescent label emits a second          │
│ detection signal having the second emission wavelength.                             │
└─────────────────────────────────────────────────────────────────────┘
                                     │
                                     ▼
┌─────────────────────────────────────────────────────────────────────┐
│ Measuring intensity of the first detection signal, wherein the intensity of the first │ 140
│ detection signal is positively correlated with the amount of the first analyte in the │
│ sample.                                                                             │
└─────────────────────────────────────────────────────────────────────┘
                                     │
                                     ▼
┌─────────────────────────────────────────────────────────────────────┐
│ Measuring intensity of the second detection signal, wherein the intensity of the    │ 150
│ second detection signal is positively correlated with the amount of the second      │
│ analyte in the sample.                                                              │
└─────────────────────────────────────────────────────────────────────┘
```

FIG. 1

METHODS AND SYSTEMS FOR FLUORESCENCE DETECTION USING INFRARED DYES

CROSS REFERENCE TO RELATED APPLICATIONS

This application is related and claims priority as a continuation-in-part to U.S. Ser. No. 15/053,428, now U.S. Pat. No. 10,571,396, issued on Feb. 25, 2020, which is a continuation-in-part of U.S. Ser. No. 14/682,026, now U.S. Pat. No. 10,379,046, issued on Aug. 13, 2019, the entire contents of each of which are incorporated herein by reference.

TECHNICAL FIELD

The present invention generally relates to methods, apparatuses, and systems for fluorescence-based detection or measurement of samples, particularly multiplexed detection utilizing different fluorophores. The invention may implement different types of techniques for fluorescence-based detection, including normal fluorescence detection (FD) and time-resolved fluorescence (TRF) detection.

BACKGROUND

Protein detection and characterization is an important task for pharmaceutical and clinical research. Chemiluminescence (CL) is a common method for detection of proteins in biochemical analyses or on surface-bound and spatially separated proteins. An example of the latter is the method of sodium dodecyl sulfate-polyacrylamide gel electrophoresis (SDS-PAGE) with electrophoretic transfer of proteins to a membrane, referred to as Western Blot (WB) analysis (Towbin et al. (1979) Proc. Natl. Acad. Sci. U.S.A. 76(9): 4350-4354, Renart et al. (1979) Proc. Natl. Acad. Sci. U.S.A. 76(7):3116-3120). Electro-chemiluminescence (ECL) has also been applied to detect proteins bound to spots in specially designed multiwell plates (e.g., MULTI SPOT® and MULTI-ARRAY™ plates and SECTOR™ instruments, Meso Scale Discovery, a division of Meso Scale Diagnostics, LLC, Gaithersburg, Md.).

An advantage of CL and ECL is very high sensitivity with limits of detection for proteins in solution in the sub-picogram/ml range. However, these systems produce transient signals, are not chemically stable, and require a complicated procedure to produce the chemical reaction required for detection. They are also non-linear systems (i.e., one probe produces many photons) and have poor reproducibility so are not suitable for applications where quantitation of protein amount is desired. A last, but significant limitation is the inability to multiplex multiple CL signals. Their emissions are very broad and that makes the ability to detect two different CL emissions from the same spatial location very challenging.

Fluorescence (FL) probes overcome some of the limitations of CL. They provide ability for better quantitation since the relationship between excitation photons and emission photons is, in general, linear. They are also more versatile as there is no need to provide access to the probes by other reactive molecules. In general, FL probes are also more stable, especially when protected from light as they are generally non-reactive chemical species. Perhaps the most important advantage of FL probes is that they provide the ability to perform multiplexing. FL molecules come in a wide variety of forms with a wide range of excitation and emission bands. Thus two (or more) probes at the same spatial location can be independently excited and detected with minimal overlap (or cross-talk) between detection channels. The ability to detect up to four independent fluorophores from the same spatial location is regularly reported using color bandpass filters. Higher levels of multiplexing have been reported with flow cytometry and multispectral imaging (Stack et al. (2014) Methods 70(1):46-58; Perfetto et al. (2004) 4(8):648-655).

Unfortunately, FL probes have not demonstrated the same level of sensitivity as CL and typically have a lower dynamic range. A reason for lower sensitivity with FL probes is the presence of background from autofluorescence of co-localized material or interference of fluorescence from other probes. A different technique was developed to reduce background from autofluorescence using longer lifetime fluorescent probes called time-resolved fluorescence (TRF) (Zuchner et al. (2009) Anal. Chem. 81(22): 9449-9453; Kemper et al. (2001) Electrophoresis. 22(5):881-889; Lim et al. (1997) Anal Biochem. 245(2): 184-195; Huhtinen et al (2005) Anal. Chem. 77(8):2643-2648; Vereb et al. (1998) Biophys J. 74(5):2210-2222). In brief, autofluorescence typically has a relatively short lifetime (<20 ns) so that TRF detection is delayed in time until after the autofluorescence signal has died away. This is technically time gated detection, but has commonly been called time-resolved (Lakowicz, "Principles of Fluorescence Spectroscopy," 3rd Edition, Springer-Verlag, New York, 2006). The benefits of TRF detection have been well documented and include higher sensitivity, lower background, and wider dynamic range (Eliseeva & Bunzli (2010) Chem. Soc. Rev. 39(1) 189-227, Bunzli & Piguet (2005) Chem. Soc. Rev. 34(12):1048-1077; Diamandis (1991) Clin. Chem. 37(9):1486-1491).

Multiplexing of TRF has been reported with some success. The use of Eu and Tb based probes has been demonstrated in biochemical assays using Time-Resolved Fluorescence Resonance Energy Transfer (TR-FRET) to detect two different proteins (Degorce et al. (2009) Curr. Chem. Genomics. 3:22-32; Bookout et al. (2000) J. Agric. Food Chem. 48(12):5868-5873; Hamy et al. (2001) J Biomol. Screen. 6(3):179-187). In addition, there have also been reports of multiplexing with Eu and Sm, and Eu, Tb, and Sm (Bador et al. (1987) Clin. Chem. 33(1):48-51; Heinonen et al. (1997) Clin. Chem. 43(7):1142-1150). However, these systems suffer from cross-talk as emission from one of the lanthanides bleeds into the detection channels of the other lanthanides. This limits the utility of these methods to having only one truly sensitive channel, while the other is limited by background signal from the second species.

Therefore, there is a need for an improved multiplexed system.

SUMMARY

These systems of the prior art described above suffer from cross-talk as emission from one of the lanthanides bleeds into the detection channels of the other lanthanides. In practice, good separation can be achieved in only one of the ratios because of the abundance of emission peaks in the lanthanide spectrum. For example, with Eu and Tb there is minimal Eu signal in the Tb channel, but the Tb cross-talk into the Eu channel can be as high as 10%. Eu and Sm are reversed where there is no Sm cross-talk into the Eu channel, but significant (>10%) Eu cross-talk into the Sm channel. This limits the utility of these methods to having only one truly sensitive channel, while the other is limited by background signal from the second species.

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to an embodiment, a method for multiplexed time-resolved fluorescence (TRF) detection includes: providing a sample comprising a first fluorescent label bound to a first analyte and a second fluorescent label bound to a second analyte, wherein the first fluorescent label has a first fluorescence emission lifetime which is at least 3 times longer than background fluorescence emission lifetimes, a first excitation wavelength, and a first emission wavelength, and the second fluorescent label has a second fluorescence emission lifetime, a second excitation wavelength, and a second emission wavelength; exciting the first fluorescent label with a first excitation light having the first excitation wavelength, wherein the first fluorescent label emits a first detection signal having the first emission wavelength; exciting the second fluorescent label with a second excitation light having the second excitation wavelength, wherein the second fluorescent label emits a second detection signal having the second emission wavelength; measuring intensity of the first detection signal, wherein the intensity of the first detection signal is positively correlated with the amount of the first analyte in the sample; and measuring intensity of the second detection signal, wherein the intensity of the second detection signal is positively correlated with the amount of the second analyte in the sample; wherein the second fluorescence emission lifetime is at least 5 times longer than the first fluorescence emission lifetime.

According to another embodiment, the sample further comprises at least one additional fluorescent label bound to an additional analyte, wherein the additional fluorescent label has a label-specific excitation wavelength, a label-specific emission wavelength, and a label-specific fluorescence emission lifetime which is at least 3 times longer than background emission lifetimes; wherein the first fluorescence emission lifetime, the second fluorescence emission lifetime, and the label-specific fluorescence emission lifetime are each at least an order of magnitude different from one another. The additional fluorescent label is excited with a label-specific excitation light having the label-specific excitation wavelength, wherein the additional fluorescent label emits a label-specific detection signal having the label-specific emission wavelength. The intensity of the label-specific detection signal is then measured, wherein the intensity of the label-specific detection signal is positively correlated with the amount of the additional analyte in the sample. The at least one additional fluorescent label bound to an additional analyte may also comprise a plurality of different fluorescent labels bound to different analytes.

According to another embodiment, a multiplexed time-resolved fluorescence (TRF) detection apparatus or system is configured for performing all or part of any of the methods disclosed herein, such as the exciting and measuring steps of the method.

According to another embodiment, an apparatus or system for performing fluorescence detection includes: a processor and a memory configured for performing all or part of any of the methods disclosed herein.

According to another embodiment, a computer-readable storage medium includes instructions for performing all or part of any of the methods disclosed herein.

According to another embodiment, an apparatus or system includes the computer-readable storage medium.

According to another embodiment, a multiplexed time-resolved fluorescence (TRF) detection apparatus includes, a sample support configured for supporting a sample, the sample comprising a first fluorescent label and a second fluorescent label, wherein the first fluorescent label has a first fluorescence emission lifetime which is at least 3 times longer than background fluorescence emission lifetimes, a first excitation wavelength, and a first emission wavelength, and the second fluorescent label has a second fluorescence emission lifetime, a second excitation wavelength, and a second emission wavelength, and wherein the second fluorescence emission lifetime is at least 5 times longer than the first fluorescence emission lifetime; a light source configured for generating a first excitation light at the first excitation wavelength and a second excitation light at the second excitation wavelength; a light detector configured for measuring a first detection signal emitted from the sample in response to excitation by the first excitation light and a second detection signal emitted from the sample in response to excitation by the second excitation light, a computing device configured for: controlling the light source to generate the first excitation light and the second excitation light according to a timing sequence; and receiving an electrical output from the light detector corresponding to measurements of the first detection signal and the second detection signal.

According to another embodiment, a method for multiplexed fluorescence detection includes: providing a sample comprising a first fluorescent label bound to a first analyte and a second fluorescent label bound to a second analyte, wherein the first fluorescent label comprises an upconverting phosphor (UCP) and the second fluorescent label comprises a non-UCP label; irradiating the first fluorescent label with a first excitation light at a first excitation wavelength, wherein the first fluorescent label emits a first detection signal at a first emission wavelength; irradiating the second fluorescent label with a second excitation light at a second excitation wavelength different from the first excitation wavelength, wherein the second fluorescent label emits a second detection signal at a second emission wavelength different from the first emission wavelength; measuring an intensity of the first detection signal at a first measurement time, wherein the intensity of the first detection signal is correlated with the amount of the first analyte in the sample; ceasing irradiating the second fluorescent label; and after ceasing irradiating the second fluorescent label, measuring an intensity of the second detection signal at a second measurement time different from the first measurement time, wherein the intensity of the second detection signal is correlated with the amount of the second analyte in the sample.

According to another embodiment, the sample comprises a third fluorescent label bound to a third analyte, the third fluorescent label comprises a non-UCP label different from the second fluorescent label, and the method further includes: irradiating the third fluorescent label with a third excitation light at a third excitation wavelength different from the first excitation wavelength and the second excitation wavelength, wherein the third fluorescent label emits a third detection signal at a third emission wavelength different from the first emission wavelength and the second emission wavelength; ceasing irradiating the third fluorescent label; and after ceasing irradiating the third fluorescent label, measuring an intensity of the third detection signal at a third measurement time different from the first measurement time and the second measurement time.

According to another embodiment, a fluorescence detection apparatus is configured for performing at least the irradiating and measuring steps of any of the methods disclosed herein, and includes: a light source configured for generating the first excitation light and the second excitation light; and a light detector configured for measuring the first detection signal and the second detection signal.

According to another embodiment, a fluorescence detection apparatus includes: a sample support configured for supporting a sample, the sample comprising a first fluorescent label bound to a first analyte and a second fluorescent label bound to a second analyte, wherein the first fluorescent label comprises an upconverting phosphor (UCP) and the second fluorescent label comprises a non-UCP label; a light source configured for generating a first excitation light at a first excitation wavelength and a second excitation light at a second excitation wavelength different from the first excitation wavelength; a light detector configured for measuring a first detection signal emitted from the sample at a first emission wavelength in response to excitation by the first excitation light, and a second detection signal emitted from the sample at a second emission wavelength in response to excitation by the second excitation light; and a computing device configured for: controlling the light source to respectively generate the first excitation light and the second excitation light at predetermined excitation times and for predetermined durations; and controlling the light detector to measure the first detection signal at a first measurement time, and to measure the second detection signal at a second measurement time.

According to another embodiment, the sample comprises a third fluorescent label bound to a third analyte, the third fluorescent label comprising a non-UCP label different from the second fluorescent label; the light source is configured for generating a third excitation light at a third excitation wavelength different from the first excitation wavelength and the second excitation wavelength; the light detector is configured for measuring a third detection signal at a third emission wavelength; and the computing device is configured for: controlling the light source to generate the third excitation light at a predetermined excitation time and for a predetermined duration; and controlling the light detector to measure the third detection signal at a third measurement time.

According to another embodiment, the fluorescence detection apparatus or system includes an apparatus housing, a cartridge removably installed in the apparatus housing, excitation optics configured for defining an optical path from the light source to the sample, and emission optics configured for defining an optical path from the sample to the light detector, wherein: the light source is disposed in the cartridge or in the apparatus housing; the light detector is disposed in the cartridge or in the apparatus housing; and the computing device is disposed in the apparatus housing.

According to another embodiment, a fluorescence detection apparatus or system is configured for performing all or part of any of the methods disclosed herein.

According to another embodiment, an apparatus or system for performing fluorescence detection includes: a processor and a memory configured for performing all or part of any of the methods disclosed herein.

According to another embodiment, a computer-readable storage medium includes instructions for performing all or part of any of the methods disclosed herein.

According to another embodiment, an apparatus or system includes the computer-readable storage medium.

Presently, additional processing of more species at one time is needed. Complicating the mere addition of other fluorescent labels to the sample is both the available antibody-antigen complexes, the spectral excitation and emission characteristic of the fluorescent labels, secondary stimulation of fluorescence of other materials in the sample the primary fluorescence stimulated by the light source, the background fluorescence of materials in the sample and materials in the optical path.

Accordingly, there is provided a method for time-domain and wavelength domain resolved multiplexed time-resolved fluorescence comprises;

providing a sample comprising a first fluorescent label bound to a first analyte, a second fluorescent label bound to a second analyte, a third fluorescent label bound to a third analyte, and a fourth fluorescent label bound to a fourth analyte, wherein
 the first fluorescent label emits at a first emission wavelength having a first lifetime,
 the second fluorescent label emits at a second emission wavelength having a second lifetime,
 the third fluorescent label comprises an upconverting phosphor (UCP) emitting at a third emission wavelength having a third lifetime, and
 the fourth fluorescent label comprises an infrared dye emitting infrared light at a fourth emission wavelength having a fourth lifetime;

irradiating the first fluorescent label with a first excitation light at a first excitation wavelength, wherein the first fluorescent label upon irradiation with the first excitation wavelength emits a first detection signal at the first emission wavelength;

irradiating the second fluorescent label with a second excitation light at a second excitation wavelength different from the first excitation wavelength, wherein the second fluorescent label upon irradiation with the second excitation wavelength emits a second detection signal at the second emission wavelength;

irradiating the third fluorescent label with a third excitation light at a third excitation wavelength different from the first excitation wavelength and different from the second excitation wavelength, wherein the third fluorescent label upon irradiation with the third excitation wavelength emits a third detection signal at the third emission wavelength;

irradiating the fourth fluorescent label with a fourth excitation light at a fourth excitation wavelength different from the first excitation wavelength, different from the second excitation wavelength, and different from the third excitation wavelength, wherein the fourth fluorescent label upon irradiation with the fourth excitation wavelength emits a fourth detection signal at the third emission wavelength; and measuring as a function of time at least one intensity of at least one of the first emission wavelength, the second emission wavelength, the third emission wavelength, and the fourth emission wavelength for a first duration, and measuring at least a different one of the first emission wavelength, the second emission wavelength, the third emission wavelength, and the fourth emission wavelength for a second duration.

According to another embodiment, a time-domain and wavelength domain resolved multiplexed time-resolved fluorescence detection apparatus configured for performing at least the irradiating and measuring steps in the immediately preceding embodiment, the apparatus comprising:

one or more light sources configured for generating the first excitation light, the second excitation light, the third excitation light, and the fourth excitation light; and one or more light detectors configured for measuring the first detection signal, the second detection, signal, the third detection signal, and the fourth detection signal Other devices, apparatuses, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 1 is a flow chart of a method for multiplexed time-resolved fluorescence (TRF) detection according to some embodiments.

DETAILED DESCRIPTION

Figure 2:
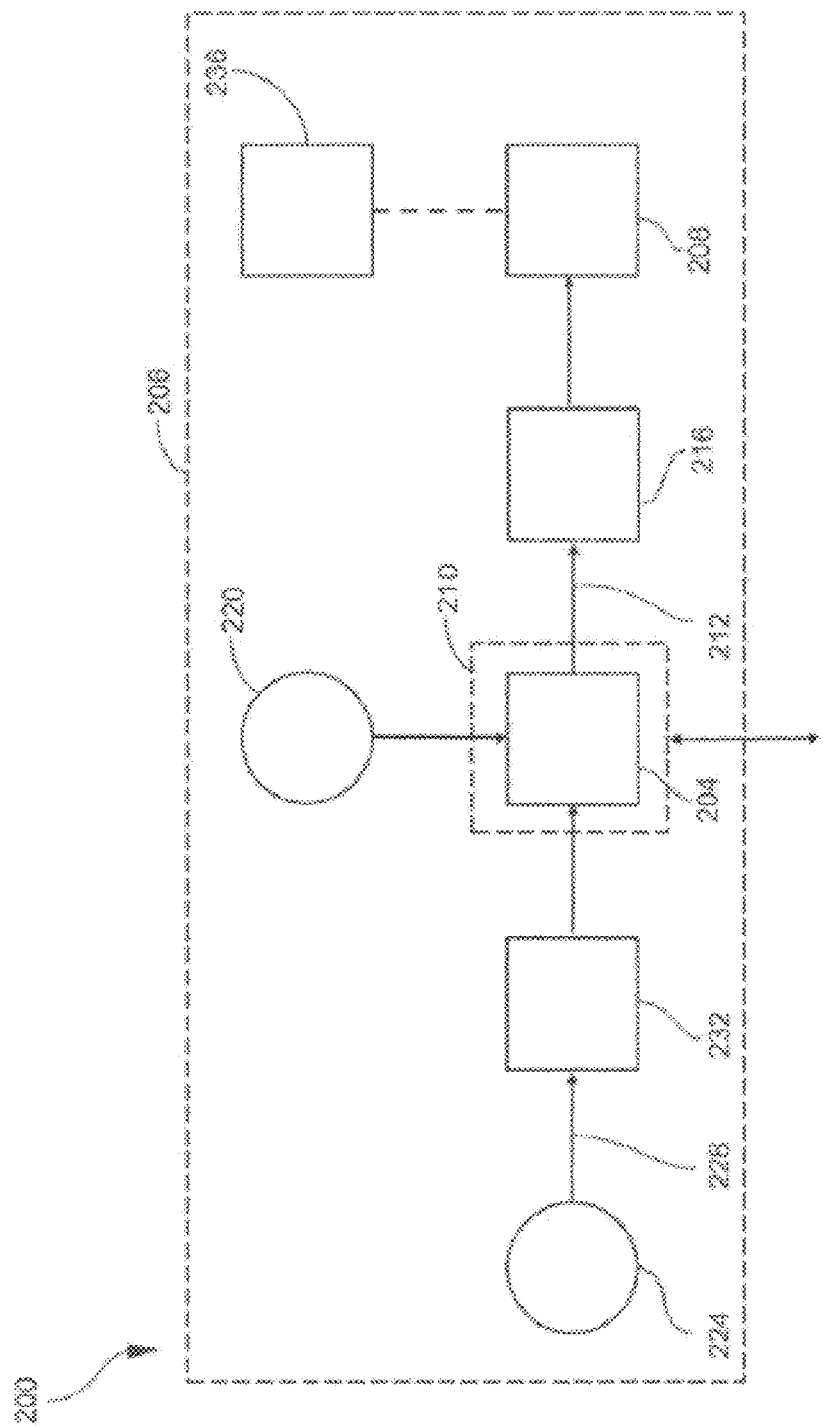
FIG. 2 is a schematic view of an example of a sample analyzing apparatus according to some embodiments.

As used herein, the term "analyte" generally refers to a substance to be detected. For example, in other particular embodiments, the first analyte and the second analyte within the method for performing multiplexed TRF detection comprise proteins, more particularly membrane-bound proteins. Analytes may also include antigenic substances, haptens, antibodies, and combinations thereof. Accordingly, analytes include, but are not limited to, toxins, organic compounds, proteins, peptides, microorganisms, amino acids, nucleic acids, hormones, steroids, vitamins, drugs (including those administered for therapeutic purposes as well as those administered for illicit purposes), drug intermediaries or byproducts, bacteria, virus particles and metabolites of or antibodies to any of the above substances.

As used herein, the term "sample" generally refers to a material known or suspected of containing the analyte. The sample may be used directly as obtained from the source or following a pretreatment to modify the character of the sample. The sample may be derived from any biological source, such as a physiological fluid, including, blood, interstitial fluid, saliva, ocular lens fluid, cerebral spinal fluid, sweat, urine, milk, ascites fluid, raucous, synovial fluid, peritoneal fluid, vaginal fluid, amniotic fluid or the like. The sample may be pretreated prior to use, such as preparing plasma from blood, diluting viscous fluids, and the like. Methods of pretreatment can involve filtration, precipitation, dilution, distillation, concentration, inactivation of interfering components, chromatography, separation steps, and the addition of reagents. Besides physiological fluids, other liquid samples may be used such as water, food products and the like for the performance of environmental or food production assays. In addition, a solid material known or suspected of containing the analyte may be used as the sample. In some instances it may be beneficial to modify a solid sample to form a liquid medium or to release the analyte.

As used herein, the term "light" generally refers to electromagnetic radiation, quantizable as photons. As it pertains to the present disclosure, light may propagate at wavelengths ranging from ultraviolet (UV) to infrared (IR). In the present disclosure, the term "light" is not intended to be limited to electromagnetic radiation in the visible range. In the present disclosure, the terms "light," "photons," and "radiation" are used interchangeably.

The present invention is directed to methods for multiplexing various types of fluorophores, including long-lifetime fluorescent dyes and upconversion phosphors (UCPs), using normal fluorescence detection (FD), time-resolved fluorescence (TRF) detection, or a combination of both. A combination of spectral and temporal differences in fluorescence emission is used to enhance the ability to separate signals in an assay from multiple dyes. Multiplexed fluorescence detection apparatuses and systems configured for performing all or part of any of the methods disclosed herein are also provided, including apparatuses and systems incorporating cartridge-based optical plate readers such as so-called multi-mode readers.

Conventional TRF detection involves exciting a fluorescent label with a short pulse of light, then typically waiting a certain time after excitation before measuring the remaining long-lived fluorescent signal. In this manner, any short-lived fluorescent background signals and scattered excitation radiation are eliminated. This ability to eliminate much of the background signals can result in sensitivities that are 2 to 4 orders greater than conventional fluorescence. Thus, TRF detection is designed to reduce background signals from the emission source or from scattering processes (resulting from scattering of the excitation radiation) by taking advantage of the fluorescence characteristics of certain fluorescent materials.

The typical selection criteria of fluorescent labels for TRF include a relatively long emission lifetime. As indicated above, this is desired so that the label emits its signal well after any short-lived background signals dissipate. A long fluorescence lifetime also makes it possible to use flashlamp excitation and low-cost circuitry for time-gated fluorescence measurements. In addition, the fluorescent label may have a relatively large "Stokes shift." The term "Stokes shift" is generally defined as the displacement of spectral lines or bands of luminescent radiation to a longer emission wavelength than the excitation lines or bands. A relatively large Stokes shift allows the excitation wavelength of the fluorescent label to remain far apart from its emission wavelengths and is desirable because a large difference between excitation and emission wavelengths makes it easier to eliminate excitation radiation from the emitted signal. Further, a large Stokes shift also minimizes interference from fluorescent molecules in the sample and/or light scattering due to proteins or colloids, which are present with some body fluids (e.g., blood). In addition, a large Stokes shift also minimizes the requirement for expensive, high-precision filters to eliminate background interference.

One type of fluorescent compound that has both a relatively long emission lifetime and relatively large Stokes shift are lanthanide chelates such as chelates of samarium (Sm (III)), dysprosium (Dy(III)), europium (Eu(III)), and terbium (Tb(III)). Such chelates can exhibit strongly red-shifted, narrow-band, long-lived emission after excitation of the chelate at substantially shorter wavelengths. Typically, the chelate possesses a strong ultraviolet (UV) excitation band due to a chromophore located close to the lanthanide in the molecule. Subsequent to excitation by the chromophore, the excitation energy can be transferred from the excited chromophore to the lanthanide. This is followed by a fluorescence emission characteristic of the lanthanide. Lanthanide chelates, for instance, have exceptionally large Stokes shifts of about 250 to about 350 nanometers (nm), as compared to only about 28 nanometers for fluorescein. Also, the fluorescence of lanthanide chelates is long-lived, with lifetimes of about 100 to about 1000 microseconds (μs), as compared to about 1 to about 20 nanoseconds (nm) for other fluorescent labels. In addition, these chelates have a very narrow emission spectra, typically having bandwidths less than about 10 nanometers at about 50% emission.

Another type of fluorescent compound that has both a relatively long emission lifetime and relatively large Stokes shift are transition metal chelates such as chelates of ruthenium (Ru(II)), osmium (Os(II)), and rhenium (Re(I)). The fluorescence lifetime of transition metal chelates is typically about 0.1 to about 10 microseconds.

As described above, the present invention in one aspect is directed to a novel method to multiplex long lifetime fluorescent dyes using TRF detection. A combination of spectral and temporal differences in fluorescence emission is used to enhance the ability to separate signals in an assay from multiple dyes. The method exploits both time-domain and wavelength-domain differences between TRF dyes to reduce cross-talk to below 1%, and more particularly to below 0.01%.

The multiplexed TRF detection methods of the present invention provide a number of advantages compared to conventional methods. For example, improved quantitation may be achieved by using one channel as a reference or standard. For example, when using conventional methods for loading samples into a column on a gel to perform a Western Blot there can be significant error in how much sample actually makes it down the lane By utilizing a reference protein (also known as a housekeeping protein) signal in one channel, then the signal from an "unknown" protein in a second (or third) channel can be normalized to the reference channel to improve relative accuracy.

Another advantage of the multiplexed TRF detection methods of the present invention is that they allow for improved ratiometric measurements. A common application of Western Blot is to look at phosphorylation of a protein as an indicator of a signaling event and calculate the ratio of phosphoprotein to unmodified (or total) protein. Using single channel Western Blot to calculate such a ratio requires measuring the first protein, stripping the Western Blot membrane, and then re-probing and measuring the second protein. Two-channel detection allows for probing and measurement of both phospho- and total-protein at the same time. This saves significant time and increases accuracy since sources of experimental error are removed by not having to strip and re-probe.

FIG. 1 is a flow chart of a method 100 for multiplexed TRF detection according to some embodiments. First, a sample is provided comprising a first fluorescent label bound to a first analyte and a second fluorescent label bound to a second analyte, wherein the first fluorescent label has a first fluorescence emission lifetime which is at least three (3) times longer than background fluorescence emission lifetimes, a first excitation wavelength, and a first emission wavelength, and the second fluorescent label has a second fluorescence emission lifetime, a second excitation wavelength, and a second emission wavelength, and wherein the second fluorescence emission lifetime is at least five (5) times longer than the first fluorescence emission lifetime (step 110). Next, the first fluorescent label is excited with a first excitation light having the first excitation wavelength, wherein the first fluorescent label emits a first detection signal having the first emission wavelength (step 120). Then, the second fluorescent label is excited with a second excitation light having the second excitation wavelength, wherein the second fluorescent label emits a second detection signal having the second emission wavelength (step 130). Next, intensity of the first detection signal is measured, wherein the intensity of the first detection signal is positively correlated with the amount of the first analyte in the sample (step 140) Then, intensity of the second detection signal is measured, wherein the intensity of the second detection signal is positively correlated with the amount of the second analyte in the sample (step 150). In particular embodiments, the second fluorescence emission lifetime is at least 100 times or at least 1,000 times longer than the first fluorescence emission lifetime.

In some embodiments, the flow chart of FIG. 1 may be considered as schematically representing a sample analyzing apparatus configured for carrying out all or part of the steps of the method 100 described above. Further examples of a sample analyzing apparatus are described below.

In other particular embodiments, the method for performing multiplexed TRF detection comprises the use of a second fluorescent label having a second fluorescence emission lifetime in a range of 100 µs to 1 ms, more particularly wherein the second fluorescent label is selected from the group consisting of lanthanide chelates of samarium (Sm (III)), dysprosium (Dy(II)), europium (Eu(III)), and terbium (Tb(III)). In further particular embodiments, the method for performing multiplexed TRF detection comprises the use of a first fluorescent label having a first fluorescence emission lifetime in a range of 0.1 µs to 10 µs, more particularly wherein the first fluorescent label is selected from the group consisting of transition metal chelates of ruthenium (Ru(II)), osmium (Os(II)), and rhenium (Re(I)).

In further particular embodiments, the fluorescent labels within the method for performing multiplexed TRF detection have a Stokes shift of greater than about 20 nanometers, in some embodiments greater than about 100 nanometers, and in some embodiments from about 250 to about 350 nanometers.

In further embodiments, prior to step 110 the sample is prepared according to the following steps:
a) contacting the sample with
  i) a first antibody that specifically binds the first analyte
  ii) a second antibody that specifically binds the second analyte;
  iii) a first fluorescent antibody conjugate that specifically binds the first antibody, wherein the first fluorescent antibody conjugate comprises a first fluorescent label having a first fluorescence emission lifetime, a first excitation wavelength, and a first emission wavelength;
  iv) a second fluorescent antibody conjugate that specifically binds the second antibody, wherein the second fluorescent antibody conjugate comprises a second fluorescent label having a second fluorescence emission lifetime, a second excitation wavelength, and a second emission wavelength; and
b) incubating the sample under conditions and for a time sufficient to allow the antibodies and the antibody conjugates to form immunocomplexes.

In some embodiments, the antibodies and antibody conjugates may be provided in the form of a mixture in solution, or the antibodies and/or antibody conjugates may be attached to the surface of a solid support. The solid support may be, but is not limited to, magnetic beads, gold nanoparticles, biodegradable organic polymer nanoparticles, microwells, or microtiter plates. In other embodiments, the first or second antibodies may have the first or second fluorescent labels directly attached to them eliminating the need for antibody conjugates.

Accordingly, the presently disclosed methods encompass a wide range of assays for the detection of analytes, such as the detection of proteins bound to membranes, proteins bound to beads, proteins in microfluidic channels (potentially separated), proteins in the wells of a multi-well plate, and/or proteins in gels or other viscous media (potentially separated).

In other particular embodiments, the sample within the method for performing multiplexed TRF detection comprises at least one additional fluorescent label bound to an additional analyte. The additional fluorescent label has a label-specific excitation wavelength, a label-specific emission wavelength, and a label-specific fluorescence emission lifetime which may be at least 3 times longer than background emission lifetimes. Furthermore, the first fluorescence emission lifetime, the second fluorescence emission lifetime, and the label-specific fluorescence emission lifetime each may be at least an order of magnitude different from one another. The additional fluorescent label is excited with a label-specific excitation light having the label-specific excitation wavelength, whereby the additional fluorescent label emits a label-specific detection signal having the label-specific emission wavelength. Intensity of the label-specific detection signal is then measured, wherein the intensity of the label-specific detection signal is positively correlated with the amount of the additional analyte in the sample. The at least one additional fluorescent label bound to an additional analyte may also comprise a plurality of different fluorescent labels bound to different analytes.

In a further embodiment, within the method for performing multiplexed TRF detection, the first analyte is a reference protein and the second analyte is an unknown protein, further wherein the second detection signal is normalized to the first detection signal.

In another embodiment, within the method for performing multiplexed TRF detection, the first analyte is a protein and the second analyte is a modified version of the protein, further wherein the ratio of modified protein to unmodified protein is calculated, particularly wherein the modified version of the protein is a phosphorylated version of the protein.

In further embodiments, one or more upconversion phosphors (UCPs) may be utilized as fluorescent labels, and may be utilized in combination with other types of fluorescent labels (i.e., "non-UCP" labels) such as the lanthanide chelates and transition metal chelates described herein. As appreciated by persons skilled in the art, a UCP exhibits an anti-Stokes shift (or negative Stokes shift) rather than a positive Stokes shift. That is, in the process of photon upconversion, the sequential absorption of two or more photons of excitation light by a UPC results in emission of light by the UPC at a shorter wavelength than the excitation wavelength, rather than at a longer wavelength than the excitation wavelength. In a typical example, a UPC emits emission light in the visible spectrum (e.g., 600 nm) in response to absorbing light in the infrared (IR) spectrum (e.g., 980 nm). Like the non-UCP fluorescent labels described herein, UCP fluorescent labels can be configured (formulated, fabricated) to have prolonged emission lifetimes. Moreover, the IR wavelengths at which UCP fluorescent labels are irradiated are significantly different (i.e., far separated spectrally) from the UV wavelengths at which the non-UCP fluorescent labels are irradiated, and enables background noise to be reduced significantly. The emission wavelengths of UCP labels are also sufficiently different from the non-UCP labels to provide very good resolution in the measurement signals and very reduced cross-talk. According to an aspect of the present disclosure, the use of different labels, such as a UCP label and one or more different non-UCP labels, entails the use of different excitation wavelengths, different emission wavelengths, and different emission lifetimes, resulting in very little cross-talk. As in the case of the non-UCP labels, the specific excitation wavelengths, emission wavelengths, and emission lifetimes depend on the particular configuration of a given UCP. Combining the use of one or more UCP labels with one or more non-UCP labels (e.g., lanthanide chelates and/or transition metal chelates) in multiplexed (e.g., duplex, triplex, etc.) experiments may also reduce the amounts of sample experimental time required. In addition, certain UCP labels are useful for normal fluorescence-based experiments, i.e., simultaneously detecting/measuring a sample while irradiating the sample (i.e., with little or no delay required between excitation and detection/measurement of emission), due to very low background signal associated with UCPs. Thus, in some embodiments disclosed herein, the method when utilizing such UCPs in combination non-UCP labels with may entail TRF or a combination of normal fluorescence and TRF.

As a non-limiting example, the UCP may be a lanthanide-doped or transition metal-doped inorganic compound exhibiting anti-Stokes shift. The inorganic compound may be a crystalline material that includes a transparent host lattice doped with one or more dopants that enable or enhance the upconversion activity. Examples of inorganic compounds forming the basis for certain UCPs include, but are not limited to, various halides (e.g., $NaYF_4$, $YF_3$, $LaF_3$), oxides (e.g., $Y_2O_3$, $ZrO_2$), and oxysulfides (e.g., $Y_2O_2S$, $La_2O_2S$). Examples of suitable dopants include, but are not limited to, trivalent lanthanide ions and transition metals such as erbium ($Er^{3+}$), thulium ($Tm^{3+}$), holmium ($Ho^{3+}$), praseodymium ($Pr^{3+}$), neodymium ($Nd^{3+}$), dysprosium ($Dy^{3+}$), ytterbium ($Yb^{3+}$), and/or samarium ($Sm^{3+}$). As another example, UCPs may be utilized as described by Riuttamaki, Terhi, *UPCONVERTING PHOSPHOR TECHNOLOGY: Exceptional Photoluminescent Properties Light Up Homogeneous Bioanalytical Assays*, University of Turku Publications (2011), the entire content of which is incorporated by reference herein. As another example, suitable UCPs may be SUNSTONE® UCP Nanocrystals manufactured by Intelligent Material Solutions Inc., Princeton, N.J., USA, and commercially available from Sigma-Aldrich, Inc., St. Louis, Mo., USA.

Methods disclosed herein may be implemented with the use of a suitable sample analyzing apparatus. Examples of suitable sample analyzing apparatuses are described below with reference to FIGS. 2 to 3H.

FIG. 2 is a schematic view of an example of a sample analyzing according to some embodiments. The sample analyzing apparatus 200 is configured for performing multiplexed fluorescence detection on a sample to detect multiple analytes, as these terms have been defined elsewhere herein. In some embodiments, the sample analyzing apparatus 200 is configured to enable a user to select a desired type of optical measurement to be performed, not only TRF measurement but other fluorescence-based measurements as well as other types of optical measurements such as, for example, luminescence, absorbance, cell imaging, etc. For example, the user may be able to reconfigure the optics of the sample analyzing apparatus 200 to perform a desired type of fluorescence measurement. Thus, in some embodiments the sample analyzing apparatus 200 may be a multi-mode reader. For example, as a multi-mode reader the sample analyzing apparatus 200 may be reconfigurable by enabling a user to select an application-specific cartridge among a number of different cartridges available, and load the selected cartridge into the sample analyzing apparatus 200 so as to establish optical and electrical circuits specific to the desired application. The selected cartridge is coupled to the sample analyzing apparatus 200 whereby the sample analyzing apparatus 200 is properly configured for carrying out the selected experiment. The cartridge may contain optics specific to or optimized for a particular type of application such as, for example, multiplexed TRF detection. The internal optics housed within the cartridge may communicate with external optics housed within the housing of the sample analyzing apparatus 200 through optical ports of the cartridge's housing. Some cartridges may additionally include one or more internal light sources and/or one or more light detectors. Examples of cartridge-based multi-mode readers are described in U.S. Pat. Nos. 9,188,527 and 8,119,066, the contents of which are incorporated by reference herein in their entireties.

Generally, the structure and operation of the various components provided in optical-based sample analysis instruments are understood by persons skilled in the art, and thus are only briefly described herein to facilitate an understanding of the presently disclosed subject matter. In the illustrated embodiment, the sample analyzing apparatus 200 includes a sample support 204 configured for supporting one or more samples under analysis, and a light detector 208 configured for receiving and measuring emitted light 212 emitted from the sample. The sample support 204 when in an operative position for carrying out optical measurements on the sample, and the light detector 208 and other components illustrated in FIG. 2, may be enclosed in an apparatus housing 206 of the sample analyzing apparatus 200. The apparatus housing 206 may include one or more panels, doors, drawers, etc. for loading the sample support 204 (and cartridges if provided), accessing interior regions of the sample analyzing apparatus 200, etc.

Generally, the sample support 204 may be one or more containers configured for holding one or more samples during an analysis. As non-limiting examples, the sample support 204 may be a multi-well plate (also known as a microtiter plate, microplate, or optical plate), one or more cuvettes, a substrate supporting spots or blots containing respective samples, etc. The sample support 204 may be disposed on a sample carrier (or sample support carrier) 210 configured for moving the sample support 204 along more or more axes. For example, the sample carrier 210 may be a manually actuated, semi-automated, or motorized stage or platform. The sample carrier 210 may be movable into and out from the apparatus housing 206, as indicated by an arrow in FIG. 2. A sample, or the sample support 204 containing one or more samples, may be mounted onto the sample carrier 210 while the sample carrier 210 is at an outside position, e.g., where the sample carrier 210 is positioned at least partially outside the apparatus housing 206. The sample carrier 210 may thus also be considered as a sample support. The sample carrier 210 may then be moved to an inside position at which the sample carrier 210 is positioned entirely in the apparatus housing 206 so as to align the sample (or successively align multiple samples) with an optical component and/or liquid handling component of the sample analyzing apparatus 200

In various embodiments, the optical input end of the light detector 208 typically includes a lens. The output end may include an electrical connector (e.g., contacts, terminals, pins, wire support, etc.) to provide power and enable measurement signals generated by the light detector 208 to be outputted to signal processing circuitry (e.g., data acquisition circuitry) provided with or external to the sample analyzing apparatus 200. Depending on the embodiment, the light detector 208 may be a photomultiplier tube (PMT), a photodiode, a charge-coupled device (CCD), an active-pixel sensor (APS) such as a complementary metal-oxide-semiconductor (CMOS) device, etc., as needed to optimize sensitivity to the emission wavelengths to be detected.

In typical embodiments, the sample analyzing apparatus 200 further includes emission optics 216 configured for transmitting the emitted light 212 from the sample to the light detector 208. The emission optics 216 may also be configured for processing the emitted light 212. Examples of processing include, but are not limited to, collecting, focusing, collimating, filtering, beam steering, beam splitting, and optical path switching. Thus, depending on the embodiment, the emission optics 216 may include one or more lenses, read heads, apertures, filters, light guides, mirrors, beam splitters, monochromators, diffraction gratings, prisms, optical path switches, etc. The emission optics 216 may configured for receiving emitted light 212 from above the sample (e.g., a top read head) and/or below the sample (e.g., a bottom read head).

In some embodiments, the sample analyzing apparatus 200 further includes a liquid dispensing system 220 (e.g., injector needle(s), tubing, pump(s), reservoir(s), etc.) configured for adding a liquid to the sample (e.g., into selected wells or onto selected blots of the sample support 204) before or after the sample has been operatively positioned in the sample analyzing apparatus 200. For example, a labeling agent may be added to the sample for fluorescence, luminescence or other types of measurements, as appreciated by persons skilled in the art. In some embodiments, two or more different types of reagents may be added.

In embodiments requiring excitation such as the fluorescence detection techniques disclosed herein, the sample analyzing apparatus 200 includes one or more light sources 224 for producing excitation light 228 of a desired wavelength that is directed to the sample. Depending on the embodiment, the light source 224 may include a broadband light source (e.g., flash lamp) or one or more light emitting diodes (LEDs), laser diodes (LDs), lasers, etc. Multiple light sources 224 may be provided to enable a user to select a desired excitation wavelength. In typical embodiments, the sample analyzing apparatus 200 further includes excitation optics 232 configured for transmitting the excitation light 228 from the light source 224 to the sample. The excitation optics 232 may include, for example, one or more lenses, read heads, apertures, filters, light guides, mirrors, beam splitters, monochromators, diffraction gratings, prisms, optical path switches, etc., as noted above.

In embodiments in which the light source 224 is an LED light source, the sample analyzing apparatus 200 (or a cartridge operatively coupled to the sample analyzing apparatus 200) may have an electronic current supply that is capable of pulsing the LED light source, a control for changing the intensity of the exciting light from the LED light source, and/or a photodiode that is capable of measuring the intensity of exciting light produced by the LED light source, which may be used to stabilize the LED light source. Preferred LED light sources are obtained from Lumileds, San Jose, Calif. Luxeon Star, Nichia, Tokushima, Japan; and Roithner-Laser, Vienna, Austria. In other embodiments, the light source 224 may be a Xenon flash lamp module, the module having a Xenon flash lamp as the light source and having the corresponding electronics to produce a pulsed light beam. In the case of using a wide band light source, such as a Xenon flash lamp, the optical system includes a wavelength selector, filter, or the like for controlling the wavelength of the exciting light. Preferred Xenon flash lamp modules are obtained from Excelitas, Waltham, Mass.; and Hamamatsu Photonics, Japan.

As also schematically illustrated in FIG. 2, the sample analyzing apparatus 200 may further include a computing device (or system controller) 236. As appreciated by persons skilled in the art, the computing device 236 may represent one or more modules configured for controlling, monitoring and/or timing various functional aspects of the sample analyzing apparatus 200, and/or for receiving data or other signals from the sample analyzing apparatus 200 such as measurement signals from the light detector 208 and transmitting control signals to the light detector 208 and/or other components. For all such purposes, the computing device 236 may communicate with various components of the sample analyzing apparatus 200 via wired or wireless communication links, as depicted by a dashed line between the computing device 236 and the light detector 208. For simplicity, other communication links that may be present between the computing device 236 and other components of the sample analyzing apparatus 200 are not shown. In typical embodiments, the computing device 236 includes a main electronic processor providing overall control, and may include one or more electronic processors configured for dedicated control operations or specific signal processing tasks. The computing device 236 may also include one or more memories and/or databases for storing data and/or software. The computing device 236 may also include a computer-readable medium 236 that includes instructions for performing any of the methods disclosed herein. The functional modules of the computing device 236 may comprise circuitry or other types of hardware (or firmware), software, or both. For example, the modules may include signal processing (or data acquisition) circuitry for receiving measurement signals from the light detector 208 and software for processing the measurement signals such as for generating graphical data. The computing device 236 may also be representative of one or more types of user interface devices, such as user input devices (e.g., keypad, touch screen, mouse, and the like), user output devices (e.g., display screen, printer, visual indicators or alerts, audible indicators or alerts, and the like), a graphical user interface (GUI) controlled by software, and devices for loading media readable by the electronic processor (e.g., logic instructions embodied in software, data, and the like). The computing device 236 may include an operating system (e.g., Microsoft Windows® software) for controlling and managing various functions of the computing device 236.

According to some embodiments, an experiment entailing optical measurement utilizing the analyzing apparatus 200 may be implemented as follows. The sample is introduced into the sample analyzing apparatus 200 and placed in a proper operating position relative to optics and other components of the sample analyzing apparatus 200. Generally, the "operating" position of the sample is an "optically aligned" position, i.e., a position that establishes an optical path sufficient for optical data acquisition from the sample. Depending on the experiment, the operating position may also correspond to the sample being "fluidly aligned" with the sample analyzing apparatus 200, i.e., positioned so as to be able to dispense fluid onto the sample such as by operating the liquid dispensing system 220. Sample introduction may entail loading one or more samples in one or more wells of a microplate or other type of sample support 204 (e.g., preparing samples in accordance with botting techniques such as Western Blot, as appreciated by persons skilled in the art), and loading or mounting the sample support 204 in the sample analyzing apparatus 200, such as with the use of a sample carrier 210 as noted above. Also as noted above, depending on the sample and the type of measurement to be made, the sample may be subjected to preparation or treatment (incubation, mixing, homogenization, centrifuging, buffering, reagent addition, analytical separation such as solid phase extraction, chromatography, electrophoresis, etc.) prior to being positioned in the sample analyzing apparatus 200, as appreciated by persons skilled in the art.

In addition to sample introduction, the sample analyzing apparatus 200 or certain components thereof (optics, electronics, etc.) may need to be configured for implementing the specific type of measurement to be made. For example, if cartridge-based, the appropriate cartridge (or cartridges) may be installed in the sample analyzing apparatus 200. After installing a cartridge, optics provided in the cartridge become part of the optical circuit within the housing 206 of the sample analyzing apparatus 200. For example, the cartridge optics may be aligned with (in optical communication with) the emission optics 216 and light detector 208, and in some embodiments also with the excitation optics 232 and light source 224. Installing the cartridge results in establishing electrical paths for transmitting power, data and control signals to and/or from the cartridge.

The sample is then processed as necessary to induce the emission of photons from the sample which, for fluorescence, may entail the addition of reagents using the liquid dispensing system 220 and/or irradiation/excitation using the light source 224 and associated excitation optics 232. The emission optics 216 collect the emitted light 212 from the sample and direct the emitted light 212 to the light detector 208. The light detector 208 converts these optical signals into electrical signals (detector signals, or measurement signals) and transmits the electrical signals to signal processing circuitry, such as may be provided by a computing device 236 of the sample analyzing apparatus 200 as described above. In the case of multiple samples, the sample support 204 may be moved (such as by using a sample carrier 210 as described above) to sequentially align each additional sample with the optics being utilized for the experiment, whereby measurements are taken from all samples sequentially.

As noted above, the sample analyzing apparatus 200 may be utilized to carry out all or part of any of the methods disclosed herein. Accordingly, the sample analyzing apparatus 200 may also be referred to as a fluorescence detection apparatus. For example, the light source 224 may be operated to irradiate the sample with a first excitation signal having a first excitation wavelength optimized for exciting a first fluorescent label of the sample, and with a second excitation signal having a second excitation wavelength optimized for exciting a second fluorescent label of the sample. The light detector 208 may be operated to measure a first detection signal emitted from the sample at a first emission wavelength in response to excitation by the first excitation signal, and a second detection signal emitted from the sample at a second emission wavelength in response to excitation by the second excitation signal. For these purposes, in some embodiments the light source 224 may include at least two discrete light sources and/or the light detector 208 may include at least two discrete light detectors.

Figure 3A:
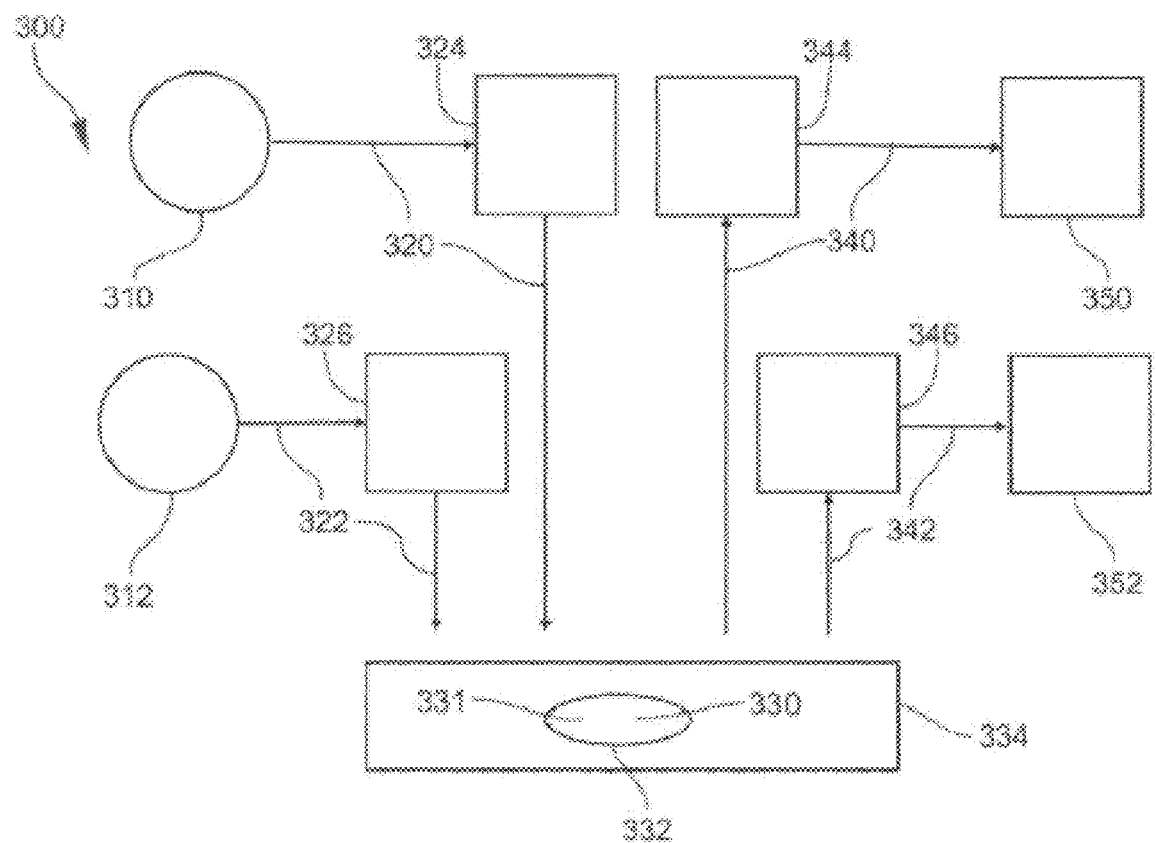
FIG. 3A is a schematic view of an example of a fluorescence detection apparatus according to an embodiment.

According to another embodiment, an apparatus for multiplexed fluorescence detection (or a multiplexed fluorescence detection apparatus) is provided. Referring now to FIG. 3A, an apparatus 300 for multiplexed fluorescence detection is shown. A sample 332 may be held within the apparatus 300 on a sample support 334, such as a microplate or a membrane or substrate supporting samples. The apparatus 300 comprises a first light source 310 that produces a first excitation light 320 and a second light source 312 that produces a second excitation light 322. The apparatus 300 has a first excitation light optical system 324 and a second excitation light optical system 326, which have components for directing the first excitation light 320 and second excitation light 322, respectively, to the sample 332 as described above in conjunction with FIG. 2. The sample 332, containing a first analyte 330 and a second analyte 331, emits a first emitted light 340 and a second emitted light 342. The apparatus 300 has a first emitted light optical system 344 which receives the first emitted light 340 and a second emitted light optical system 346 which receives the second emitted light 342. The first emitted light optical system 344 then directs the first emitted light 340 to a first detector 350, and the second emitted light optical system 346 then directs the second emitted light 342 to a second detector 352. The foregoing components may be positioned in a main apparatus housing of the apparatus 300 (e.g., the apparatus housing 206 illustrated in FIG. 2).

FIGS. 3B through 3H are schematic views of components of the apparatus 300 illustrated in FIG. 3A, in which various components of the apparatus 300 are illustrated as contained inside or outside of one or more cartridges according to some embodiments. That is, such a cartridge may generally include a cartridge housing that encloses (contains) one or more components of the apparatus 300. Such cartridge(s) may be loaded or installed in the apparatus 300 such that the cartridge(s) are enclosed in the interior of a main apparatus housing of the apparatus 300 (e.g., the apparatus housing 206 illustrated in FIG. 2). Examples of cartridge-based readers are described in above-referenced U.S. Pat. Nos. 9,188,527 and 8,119,066.

Figure 3B:
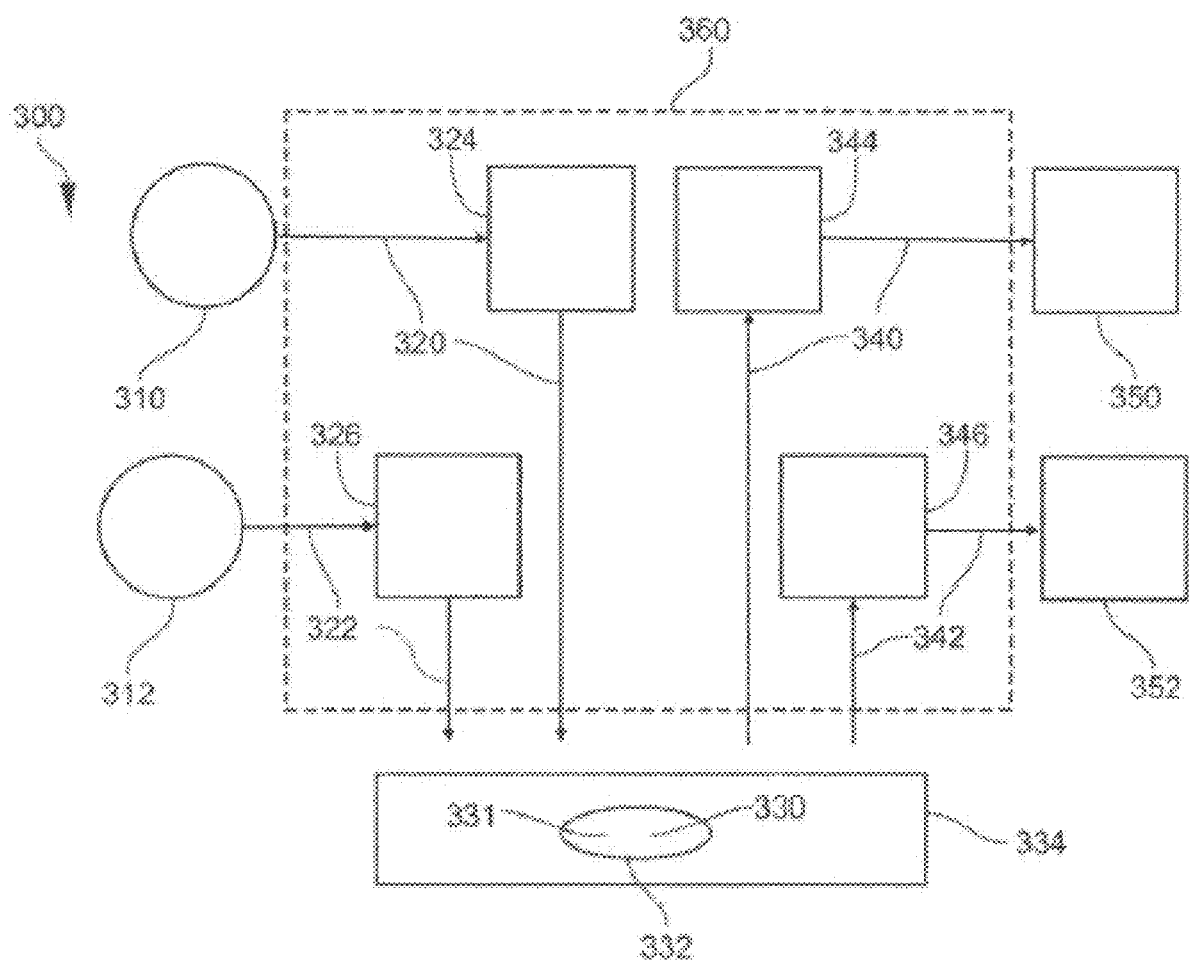
FIG. 3B is a schematic view of an example of a fluorescence detection apparatus according to another embodiment.

Referring now to FIG. 3B, the apparatus 300 further comprises a cartridge 360 comprising the first excitation light optical system 324, the second excitation light optical system 326, the first emitted light optical system 344, and the second emitted light optical system 346.

Figure 3C:
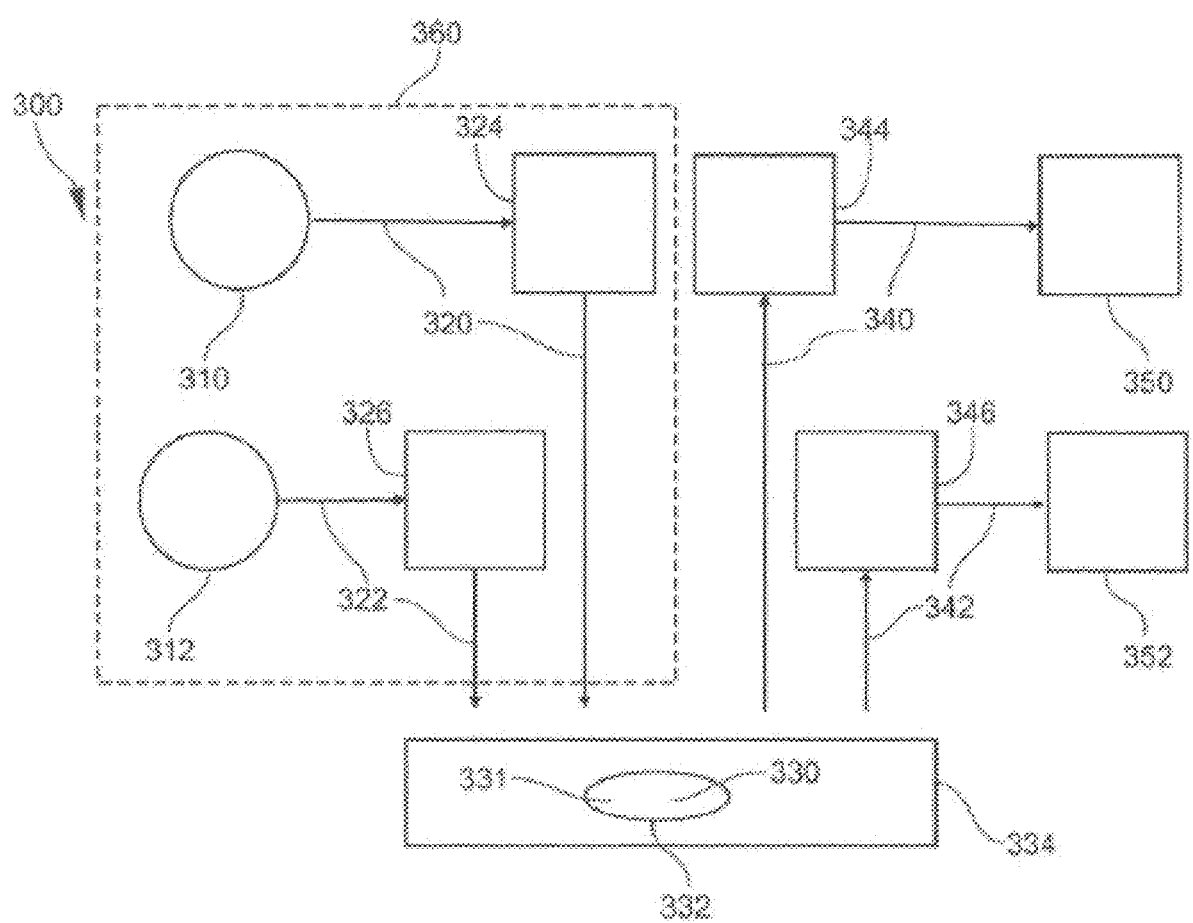
FIG. 3C is a schematic view of an example of a fluorescence detection apparatus according to another embodiment.

Referring now to FIG. 3C, the apparatus 300 further comprises a cartridge 360 comprising the first light source 310, the second light source 312, the first excitation light optical system 324, and the second excitation light optical system 326.

Figure 3D:
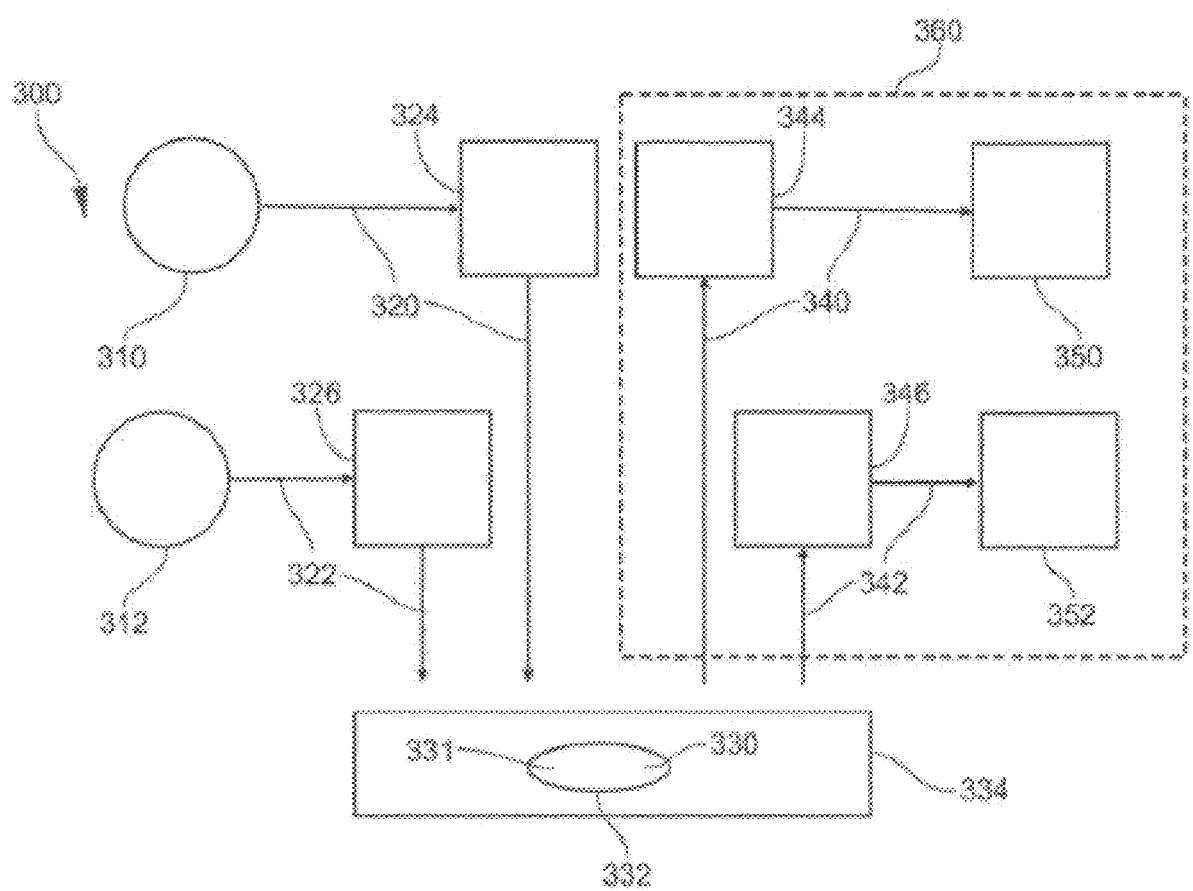
FIG. 3D is a schematic view of an example of a fluorescence detection apparatus according to another embodiment.

Referring now to FIG. 3D, the apparatus 300 further comprises a cartridge 360 comprising the first emitted light optical system 344, the second emitted light optical system 346, the first detector 350, and the second detector 352.

Figure 3E:
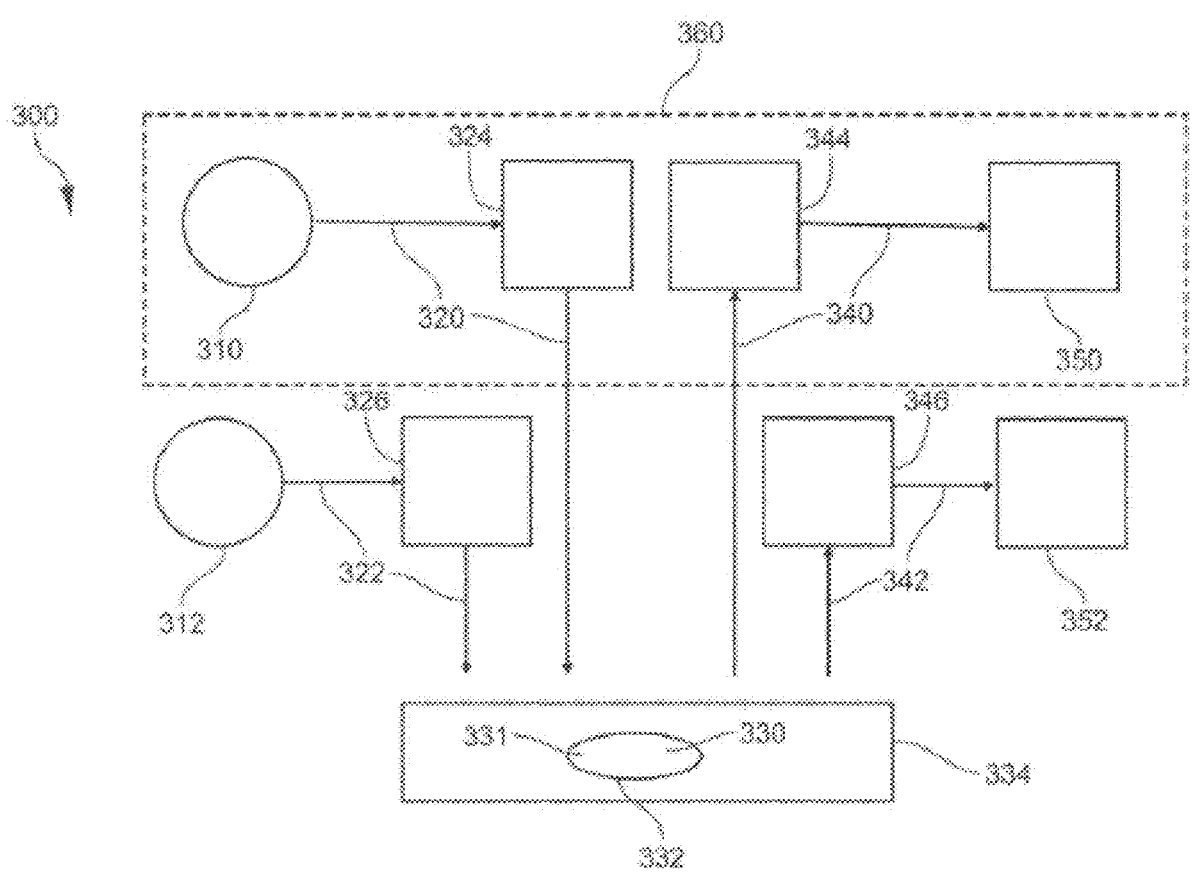
FIG. 3E is a schematic view of an example of a fluorescence detection apparatus according to another embodiment.

Referring now to FIG. 3E, the apparatus 300 further comprises a cartridge 360 comprising the first excitation light optical system 324, the first light source 310, the first emitted light optical system 344, and the first detector 350.

Figure 3F:
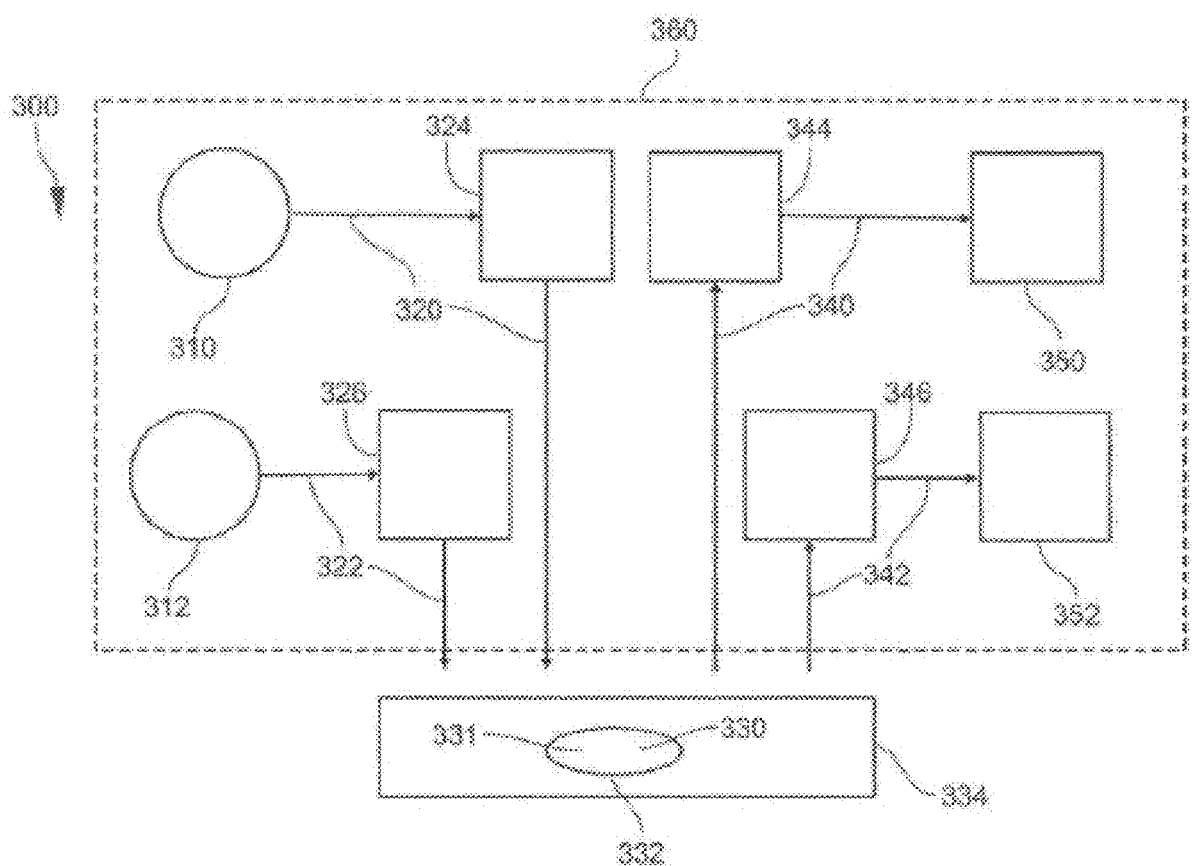
FIG. 3F is a schematic view of an example of a fluorescence detection apparatus according to another embodiment.

Referring now to FIG. 3F, the apparatus 300 further comprises a cartridge 360 comprising the first light source 310, the second light source 312, the first excitation light optical system 324, the second excitation light optical system 326, the first emitted light optical system 344, the second emitted light optical system 346, the first detector 350, and the second detector 352.

Figure 3G:
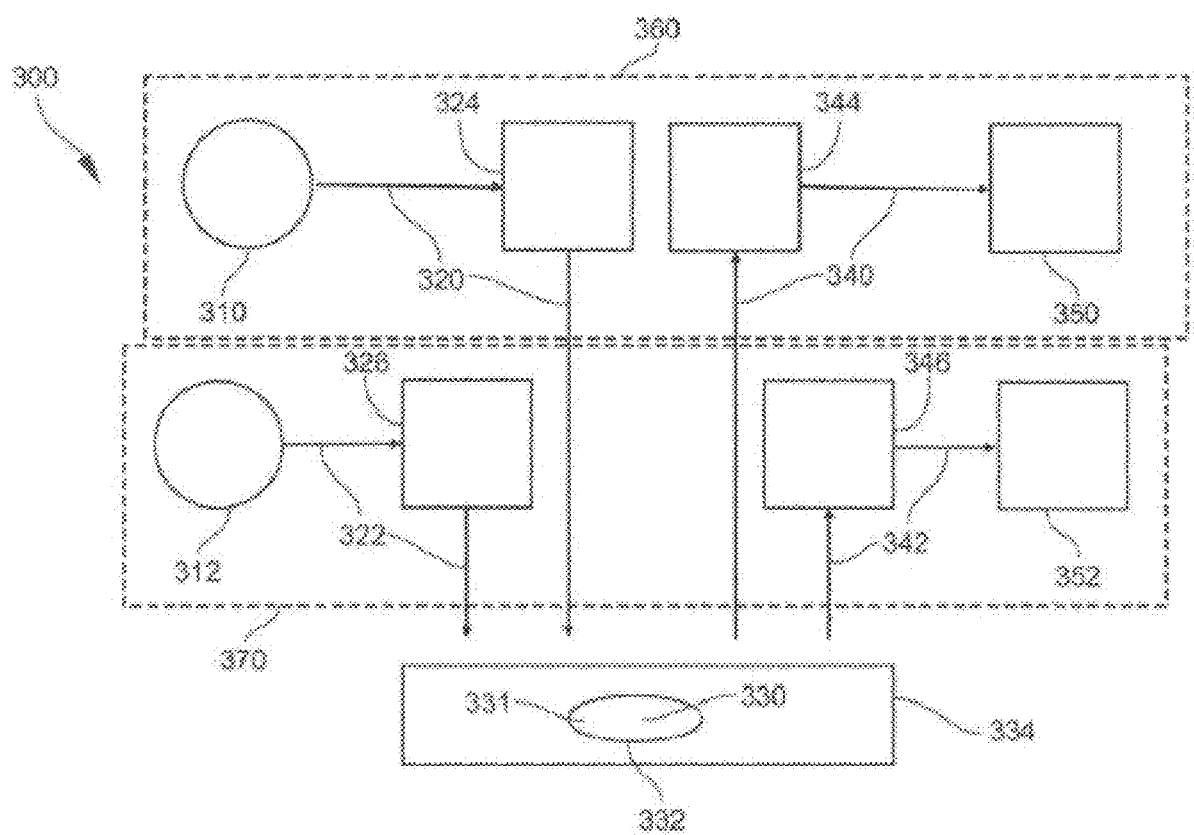
FIG. 3G is a schematic view of an example of a fluorescence detection apparatus according to another embodiment.

Referring now to FIG. 3G, the apparatus 300 further comprises a first cartridge 360 comprising the first light source 310, the first excitation light optical system 324, the first emitted light optical system 344, and the first light detector 350. The apparatus 300 further comprises a second cartridge 370 comprising the second light source 312, the second excitation light optical system 326, the second emitted light optical system 346, and the second light detector 352. In alternative embodiments, the first cartridge 360 may not contain both the first light source 310 and the first light detector 350 as shown, and in further embodiments both the first light source 310 and the first light detector 350 may be external to the first cartridge 360. Likewise, the second cartridge 370 may not contain both the second light source 312 and the second light detector 352 as shown, and in further embodiments both the second light source 312 and the second light detector 352 may be external to the second cartridge 370.

It will be understood to one of skill in the art that, for methods of fluorescence detection involving at least one additional fluorescent label bound to an additional analyte, apparatuses and systems will be configured for performing excitation and detection of the additional fluorescent label. For example, an additional light source configured for generating the label-specific excitation light at the label-specific excitation wavelength could be used, as well as an additional light detector configured for measuring the label-specific detection signal emitted from the sample in response to excitation by the label-specific excitation light. Where the at least one additional fluorescent label bound to an additional analyte comprises a plurality of different fluorescent labels bound to different analytes, a plurality of different additional light sources and light detectors could be used.

Figure 3H:
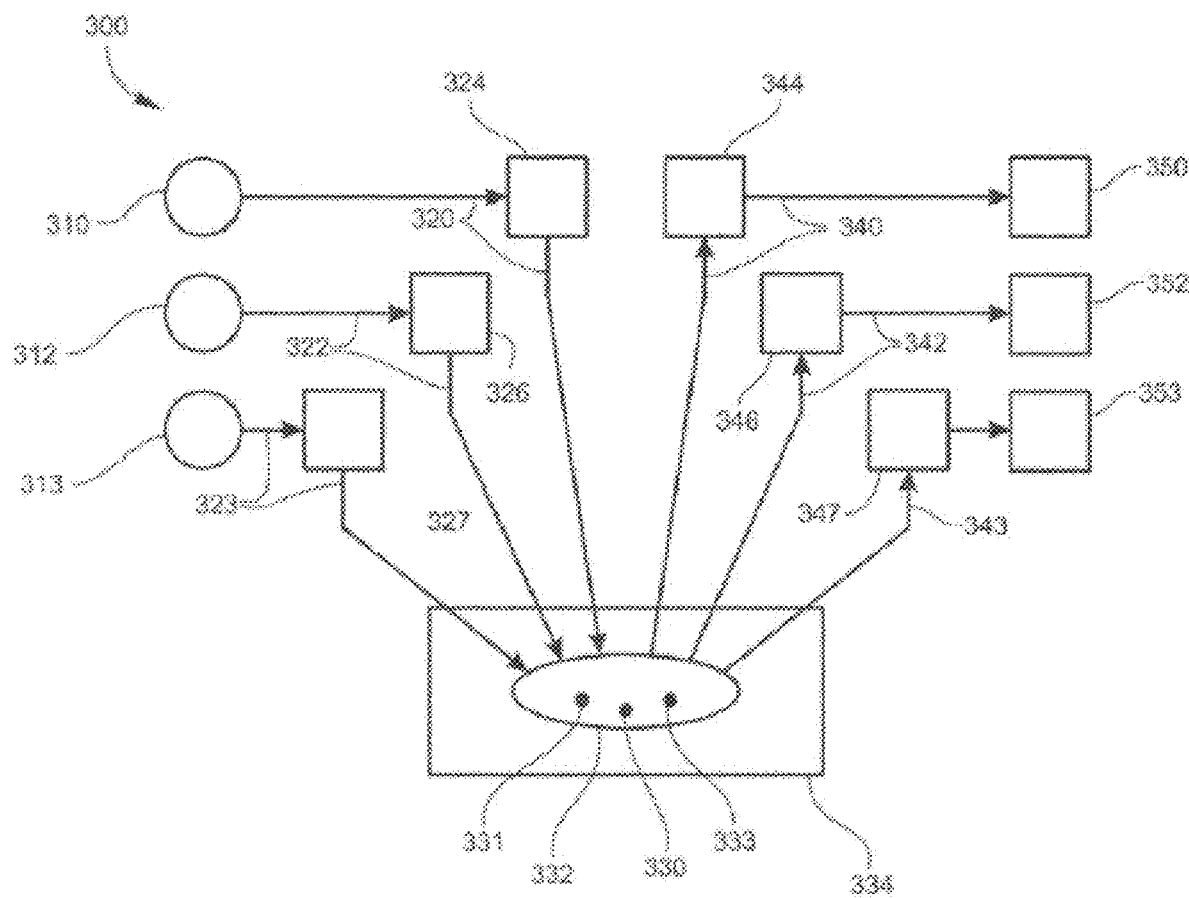
FIG. 3H is a schematic view of an example of a fluorescence detection apparatus according to another embodiment.

As an example, in the embodiment illustrated in FIG. 3H the apparatus 300 may include, in addition to the first light source 310 and the second light source 312 configured for generating the first excitation light 320 and the second excitation light 322, respectively, a third light source 313 configured for generating a third excitation light 327. The apparatus 300 may also include, in addition to the first light detector 350 and the second light detector 352 configured for receiving and measuring a first detection signal 340 and a second detection signal 342 emitted from the first analyte 330 and the second analyte 331, respectively, a third light detector 353 configured for receiving and measuring a third detection signal 343 emitted from a third analyte 333 of the sample 332. The apparatus 300 may also include, in addition to the first excitation optics 324 and the second excitation optics 326, third excitation optics 327. The apparatus 300 may also include, in addition to the first emission optics 344 and the second emission optics 346, third emission optics 347.

As in other embodiments described herein, one or more of the foregoing components may be provided in one or more cartridges (not shown) that may be removably installed in the apparatus 300. As in other embodiments described herein, the apparatus 300 shown in FIG. 3H may be utilized for duplex measurements that employ two different fluorescent labels bound to different analytes. In addition, the apparatus 300 shown in FIG. 3H may be utilized for triplex measurements that employ three different fluorescent labels bound to different analytes. In other embodiments, the apparatus 300 may include more than three light sources and/or more than three light detectors.

As in other embodiments described herein, the apparatus 200 may further include a computing device, such as the computing device (or system controller) 236 described above and schematically illustrated in FIG. 2, which is configured for controlling, monitoring and/or timing various functional aspects of the apparatus 300, receiving data or other signals from the apparatus 300 such as detection signals from the light detectors and transmitting control signals to the light detector detectors and/or other components. For example, in a duplex experiment the computing device may be configured for controlling the first light source 310 and the second light source 312 to respectively generate the first excitation light 320 and the second excitation light 322 at predetermined excitation times and for predetermined durations, controlling the first light detector 350 to measure the first detection signal 340 at a first measurement time, and controlling the second light detector 352 to measure the second detection signal 342 at a second measurement time different from the first measurement time. The computing device may also be configured for receiving an electrical output from the respective light detectors 350 and 352 corresponding to measurements of the first detection signal 340 and the second detection signal 342, and correlating the measurements with the amount of the first analyte 330 in the sample 332 and the amount of the second analyte 331 in the sample 332. The computing device may also be configured for controlling the second light source 312 to cease generating the second excitation light 322, and controlling the second light detector 352 to measure the second detection signal 342 after ceasing generating the second excitation light 322.

As another example, in a triplex experiment the computing device may be configured for controlling the third light source 313 to generate the third excitation light 323 at a predetermined excitation time and for a predetermined duration, and controlling the third light detector 353 to measure the third detection signal 343 at a third measurement time different from the first measurement time and the second measurement time. The computing device may also be configured for controlling the third light source 313 to cease generating the third excitation light 323, and controlling the third light detector 353 to measure the third detection signal 343 at a third measurement time different from the first measurement time and the second measurement time after ceasing generating the third excitation light 323. The computing device may also be configured for receiving an electrical output from the third light detector 353 corresponding to a measurement of the third detection signal 343, and correlating the measurement with the amount of the third analyte 333 in the sample 332.

In any of the embodiments illustrated in FIGS. 2-3H, certain components of the apparatus 300 may be common to (or shared by) more than one channel Thus, the number of light sources provided may be different from the number of light detectors provided, or the number of sets of excitation or emission optics, etc. For example, a light detector may have a range of wavelength sensitivity that allows it to be effective in detecting signals transmitted over two or more channels. As another example, the emission optics may include an emission filter having a wavelength bandpass effective for filtering detection signals transmitted over two or more channels. Providing common or shared components may reduce the total number of, and total space required by, components required for the apparatus 300, and may enable the apparatus 300 and/or cartridges utilized with the apparatus 300 to be more compact.

An example of a method for multiplexed fluorescence detection according to a representative embodiment will now be described. Reference is made primarily to FIG. 3H as illustrating an example of a fluorescence detection apparatus 300 that may be utilized to implement the method, with the understanding that other apparatuses or systems described herein may also be configured to implement the method.

According to the method, a sample 332 to be analyzed is provided. The sample 332 may include a first fluorescent label bound to a first analyte 330 and a second fluorescent label bound to a second analyte 331. The first fluorescent label may be or include an upconverting phosphor (UCP) label and the second fluorescent label may be or include a non-UCP label. As described herein, the UCP label may be or include a lanthanide-doped or transition metal-doped inorganic compound exhibiting anti-Stokes shift, and non-UCP label may be or include a transition metal chelate or a lanthanide chelate exhibiting (positive) Stokes shift. As non-limiting examples, the Stokes shift of the non-UCP label may be greater than 20 nm, or greater than 100 nm, or greater than 250 nm, or in a range from about 250 nm to about 350 nm.

In some embodiments and as described elsewhere herein, the sample 332 may be provided by contacting the sample 332 with: a first antibody that specifically binds the first analyte 330, a second antibody that specifically binds the second analyte 331; a first fluorescent antibody conjugate that specifically binds the first antibody, the first fluorescent antibody conjugate being or including the first (UCP) fluorescent label, and a second fluorescent antibody conjugate that specifically binds the second antibody, the second fluorescent antibody conjugate being or including the second (non-UCP) fluorescent label. The sample 332 may then be incubated under conditions and for a time sufficient to allow the antibodies and the antibody conjugates to form immunocomplexes.

In other embodiments and as described elsewhere herein, the sample 332 may be provided by contacting the sample 332 with a first antibody that specifically binds the first analyte and a second antibody that specifically binds the second analyte. The first fluorescent label may be attached directly to the first antibody, and/or the second fluorescent label may be attached directly to the second antibody.

The first fluorescent label is irradiated with a first excitation light 320 at a first excitation wavelength. In response, the first fluorescent label emits a first detection signal 340 at a first emission wavelength. The second fluorescent label is irradiated with a second excitation light 322 at a second excitation wavelength that is different from the first excitation wavelength. In response, the second fluorescent label emits a second detection signal 342 at a second emission wavelength which may be different from the first emission wavelength. In the present embodiment, the first excitation wavelength may be in the near-infrared range, and the first emission wavelength may be in the visible range. The second excitation wavelength is in the ultraviolet range, and the second emission wavelength is longer than the second excitation wavelength. Irradiation of the first fluorescent label and irradiation of the second fluorescent label may be done simultaneously or sequentially.

An intensity of the first detection signal 340 is measured at a first measurement time. Irradiation of the second fluorescent label is ceased, after which an intensity of the second detection signal 342 is measured at a second measurement time, which may be different from the first measurement time. The intensity of the first detection signal 340 is correlated with the amount of the first analyte 330 in the sample 332, and the intensity of the second detection signal 342 is correlated with the amount of the second analyte in the sample 332. The emission optics 344, 346 and 347 may be configured to direct the first detection signal 340 and the second detection signal 342 through a common emission filter or through different emission filters.

In some embodiments and as described elsewhere herein, the UCP label, whether or not it has a prolonged emission lifetime, is suitable for taking a reading (making a measurement) according to the normal fluorescence technique. In such case, the intensity of the first detection signal 340 may be measured while irradiating the first fluorescent label. In other embodiments and as described elsewhere herein, the UCP label has a prolonged emission lifetime that is exploited by taking a reading according to the TRF technique. In such case, irradiation of the first fluorescent label is ceased, after which an intensity of the first detection signal is measured. In either case, the first measurement time and the second measurement time may be different from each other. Moreover, the first fluorescence emission lifetime (of the UCP label) and the second fluorescence emission lifetime (of the non-UCP label) may be different from each other. As non-limiting examples, the second fluorescence emission lifetime may be in a range of 0.1 μs to 10 μs, or in a range of 100 μs to 1 ms.

In some embodiments and as described elsewhere herein, the first analyte 330 and the second analyte 331 are or include proteins or membrane-bound proteins. In some embodiments, one of the analytes 330 and 331 is a reference protein and the other is an unknown protein. In such case, the second detection signal 342 may be normalized to the first detection signal 340, or the first detection signal 340 may be normalized to the second detection signal 342, depending on which analyte 330 and 331 is the reference protein. In a further embodiment, one of the analytes 330 and 331 is an unmodified protein and the other is a modified or phosphorylated version of the protein. In such case, ratio of the modified or phosphorylated version of the protein to the unmodified protein may be calculated based on the measured intensities of the first detection signal 340 and the second detection signal 342.

In some embodiments and as described elsewhere herein, a plurality of samples are provided, such as in separate wells of a multi-well plate or separate blots of a membrane or other suitable substrate. Multiplexed fluorescence detection as described herein may be performed on each sample by performing, on each sample, the steps of irradiating the first fluorescent label, irradiating the second fluorescent label, measuring an intensity of the first detection signal 340, and measuring an intensity of the second detection signal 342. Each sample (typically sequentially) may be optically aligned with the first light source 310 and the first light detector 350, and with the second light source 312 and the second light detector 352. Optical alignment of the samples with selected light sources and light detectors may entail optical alignment of the samples with a cartridge removably installed in an apparatus housing of a fluorescence detection apparatus 300, such that the cartridge communicates with the fluorescence detection apparatus 300 optically and/or electrically. As described elsewhere herein, the cartridge may enclose one or more components of the fluorescence detection apparatus 300.

In other embodiments, the method may be extended to the use of three or more different fluorescent labels, and may utilize a combination of two or different classes or groups of fluorescent labels (e.g., UCPs, lanthanide chelates, transition metal chelates, etc.), which provides advantages such as significantly reduced signal channel cross-talk as described herein. As an example of a method for triplexed fluorescence detection, the sample 332 includes a third fluorescent label bound to a third analyte 333. Antibodies and antibody conjugates, or direct binding, may be performed depending on the embodiment. The third analyte 333 may be, for example, a protein, a membrane-bound protein, a reference protein, an unknown protein, an unmodified protein, or a modified or phosphorylated version of a protein, as described herein. The third fluorescent label may be or include a non-UCP label different from the second fluorescent label. For example, the second fluorescent label may be or include a transition metal chelate, and the third fluorescent label may be or include a lanthanide chelate.

In the triplex method presently being described, the third fluorescent label is irradiated with a third excitation light 323 at a third excitation wavelength different from the first excitation wavelength and the second excitation wavelength. In response, the third fluorescent label emits a third detection signal 343 at a third emission wavelength which may be different from the first emission wavelength and the second emission wavelength. Irradiation of the third fluorescent label is then ceased, after which an intensity of the third detection signal 343 is measured at a third measurement time, which may be different from the first measurement time and the second measurement time. Measurement of the UCP-containing analyte (first analyte 330) may be acquired by normal fluorescence or TRF as described above.

In some embodiments, the first excitation wavelength is in the near-infrared range, and the first emission wavelength is in the visible range, and at least one of the second excitation wavelength and the third excitation wavelength is in the ultraviolet range. In some embodiments, the UCP of the first fluorescent label has a first fluorescence emission lifetime, the second fluorescent label has a second fluorescence emission lifetime, the third fluorescent label has a third fluorescence emission lifetime, and the first fluorescence emission lifetime is different than the second fluorescence emission lifetime and the third fluorescence emission lifetime. In some embodiments, the second fluorescence emission lifetime is longer than the third fluorescence emission lifetime by a factor of at least 5 times, or at least 50 times, or at least 100 times, or at least 500 times, or 1000 times.

EXAMPLES

Protein detection and characterization is an important task for pharmaceutical and clinical research. For example, protein detection and characterization can provide information on up and down regulation of proteins in cells, phosphorylation during cell signaling, and expression of transfected proteins. Multiple techniques have been developed for protein analysis including plate reader based enzyme-linked immunosorbent assays (ELISA), sodium dodecyl sulfate-polyacrylamide gel electrophoresis (SDS-PAGE), and spot or bead based capture systems that utilize luminescence read outs. However, improvement in analytical methods for the detection and quantitation of proteins is important to provide better tools to help understand disease mechanisms.

A number of luminescence probes have been developed to enable detection and analysis of proteins. Typically probes are attached to primary or secondary antibodies that then bind selectively to the protein of interest. These probes can be fluorescent molecules that produce light upon excitation with electromagnetic radiation or reactive species that will produce light when they are put in contact with another reactive molecule (e.g., a substrate) or some other stimulant (e.g., electrical current). Such probes are versatile as they can be attached through well-known chemical reactions to proteins, nucleotides, or small molecules. The relative amount of protein in a sample can be determined by the amount of light produced by the probes leading to the ability to do protein quantitation. Such probes also facilitate determining the spatial location of a protein of interest from low resolution (100-1000 µM) spots or blots to high resolution (<1 µM) sub-cellular imaging. These probes can be organic dyes, inorganic compounds, fluorescent proteins, or enzymes.

Chemiluminescence (CL) is a common method for detection of proteins in biochemical analyses or on surface-bound and spatially separated proteins. An example of the latter is the method of sodium dodecyl sulfate-polyacrylamide gel electrophoresis (SDS-PAGE) with electrophoretic transfer of proteins to a membrane, referred to as Western Blot (WB) analysis (Towbin et al. (1979) *Proc. Natl. Acad. Sci. U.S.A.* 76(9):4350-4354; Renart et al (1979) *Proc. Nat. Acad. Sci. U.S.A.* 76(7):3116-3120). Electro-chemiluminescence (ECL) has also been applied to detect proteins bound to spots in specially designed multiwell plates (e.g., MULTI SPOT® and MULTI-ARRAY™ plates and SECTOR™ instruments, Meso Scale Discovery, a division of Meso Scale Diagnostics, LLC, Gaithersburg, Md.).

An advantage of CL and ECL is very high sensitivity with limits of detection for proteins in solution in the sub-picogram/ml range. However, these systems produce transient signals, are not stable, and require a complicated procedure to produce the chemical reaction required for detection. They are also non-linear systems (i.e., one probe produces many photons) and have poor reproducibility so are not suitable for applications where quantitation of protein amount is desired. A last, but significant limitation is the inability to multiplex multiple CL signals. Their emissions are very broad and that makes the ability to detect two different CL emissions from the same spatial location very challenging.

Fluorescence (FL) probes overcome some of the limitations of CL. They provide ability for better quantitation since the relationship between excitation photons and emission photons is, in general, linear. They are also more versatile as there is no need to provide access to the probes by other reactive molecules. In general, FL probes are also more stable, especially when protected from light as they are generally non-reactive chemical species. Perhaps the most important advantage of FL probes is that they provide the ability to perform multiplexing. FL molecules come in a wide variety of forms with a wide range of excitation and emission bands. Thus two (or more) probes at the same spatial location can be independently excited and detected with minimal overlap (or cross-talk) between detection channels. The ability to detect up to four independent fluorophores from the same spatial location is regularly reported using color bandpass filters Higher levels of multiplexing have been reported with flow cytometry and multispectral imaging (Stack et al. (2014) *Methods* 70(1):46-58; Perfetto et al. (2004) 4(8):648-655).

Unfortunately, FL probes have not demonstrated the same level of sensitivity as CL and typically have a lower dynamic range. A reason for lower sensitivity with FL probes is the presence of background from autofluorescence of co-localized material or interference of fluorescence from other probes. A different technique was developed to reduce background from autofluorescence using longer lifetime fluorescent probes called time-resolved fluorescence (TRF) (Zuchner et al. (2009) *Anal. Chem.* 81(22): 9449-9453; Kemper et al. (2001) *Electrophoresis.* 22(5):881-889; Lim et al. (1997) *Anal. Biochem.* 245(2) 184-195, Huhtinen et al. (2005) *Anal. Chem.* 77(8):2643-2648; Vereb et al. (1998) *Biophys J.* 74(5):2210-2222). In brief, autofluorescence typically has a relatively short lifetime (<20 ns) so that TRF detection is delayed in time until after the autofluorescence signal has died away. This is technically time gated detection, but has commonly been called time resolved (Lakowicz, "*Principles of Fluorescence Spectroscopy,*" 3rd Edition, Springer-Verlag, New York, 2006). The benefits of TRF detection have been well documented and include higher sensitivity, lower background, and wider dynamic range (Eliseeva & Bunzli (2010) Chem. Soc. Rev. 39(1):189-227; Bunzli & Piguet (2005) Chem. Soc. Rev. 34(12):1048-1077; Diamandis (1991) Clin. Chem. 37(9):1486-1491).

Significant effort has been made to develop and optimize TRF probes based on lanthanide coordination complexes with the most popular entities based on Eu and Tb (Kemper et al. (1999) 1 Biomol. Screen. 4(6):309-314; Lopez et al. (1993) Clin. Chem. 39(2):196-201; Degorce et al. (2009) Curr. Chem. Genomics. 3:22-32). These probes have a wide range of use besides membranes and have shown good sensitivity for detection of proteins in histologic sections and in living cells (Su et al. (2005) Anal. Biochem. 347(1):89-93; Gahlaut & Miller (2010) Cytometry A. December 2010; 77(12):1113-1125). Various instruments have been developed for measurement of TRF especially for 2-dimensional arrays. The lanthanide probes can be imaged using standard camera systems with ultraviolet (UV) excitation, although reported sensitivities are only in the nanogram of protein range (Kemper et al (2001)Electrophoresis. 22(5):881-889). Improvements in sensitivity can be made by using time-gated cameras with chopped or pulsed high intensity uv light sources (Gahlaut & Miller (2010) Cytometry A. 77(12): 1113-1125). However, this increases the overall cost of the instrumentation. A spot scanning system was developed using a pulsed uv laser and time-gated photon counting (Zuchner et al (2009) Anal. Chem. 81(22):9449-9453). Excellent sensitivity for both Dot Blots and Western Blots were reported as well as extended dynamic range compared to chemiluminescence and fluorescence.

Figure 4A:
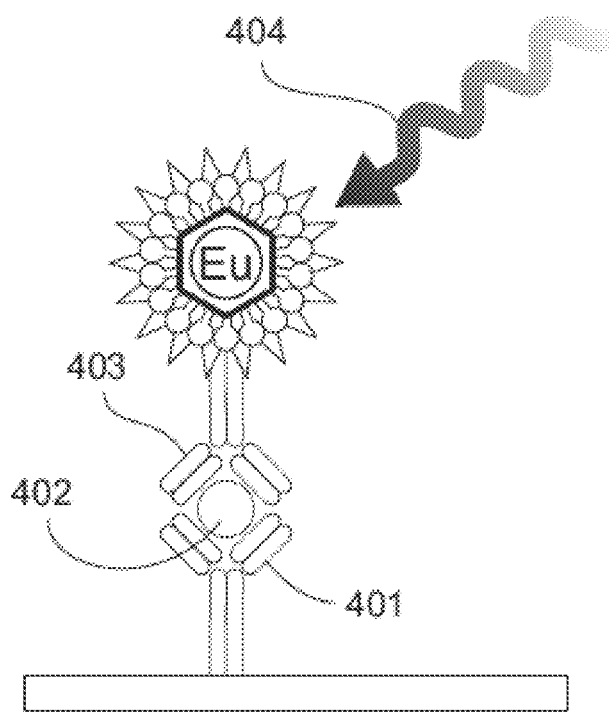
FIG. 4A is a schematic view of a method of TRF detection using a ScanLater™ Western Blot Detection System (Molecular Devices, LLC, Sunnyvale, Calif.).
Figure 4B:
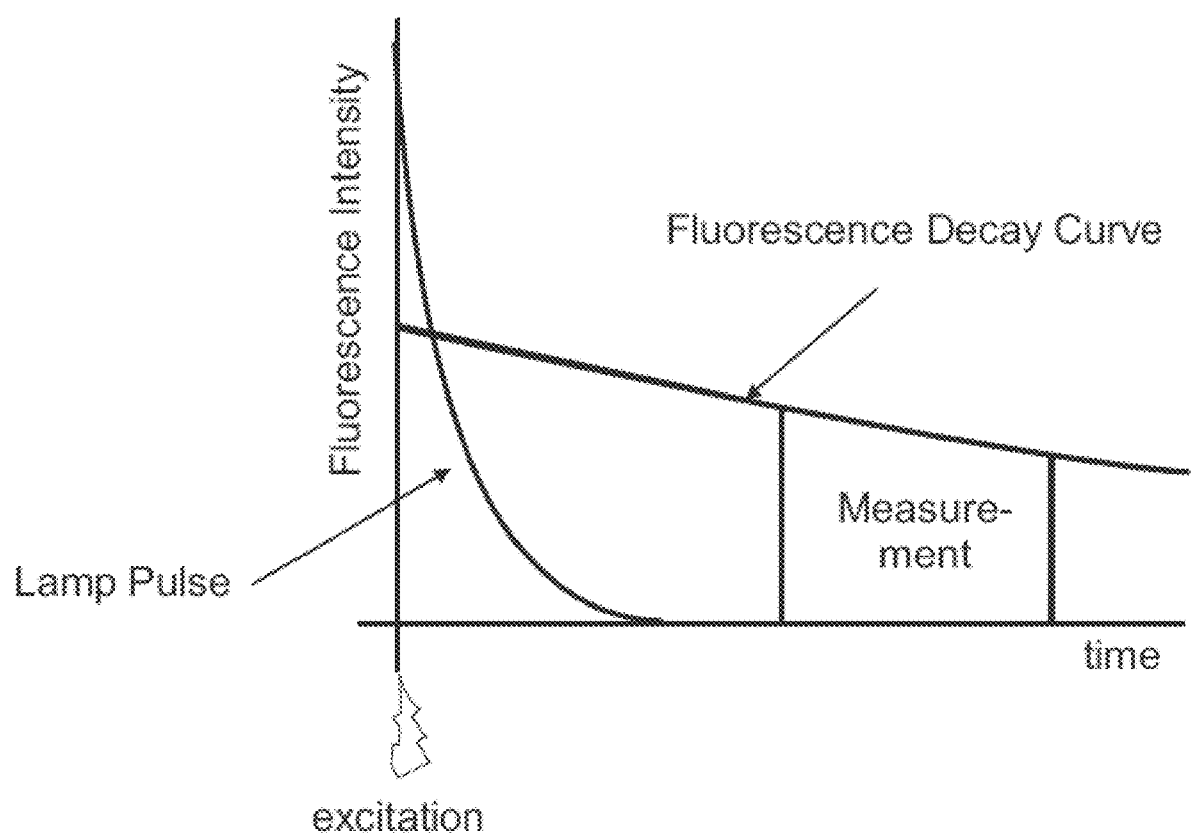
FIG. 4B is a schematic view illustrating principles of TRF detection.

We have demonstrated capability for detection and quantification of membrane bound proteins labeled with TRF stains. Membranes are incubated with Europium-chelate labeled secondary antibodies or streptavidin that bind specifically to the protein of interest. Europium (Eu) has a long fluorescence lifetime, on the order of 1 msec, and detection is done in time resolved fluorescence (TRF) mode with 50 µs delay which significantly reduces background from autofluorescence or other sources of short lifetime emissions (see FIGS. 4A and 4B). FIG. 4A is a schematic view of one non-limiting example of a method of TRF detection using the ScanLatern™ Western Blot Detection System (Molecular Devices, LLC, Sunnyvale, Calif.), which in some embodiments may utilize a cartridge configured specifically for WB detection. An existing primary antibody 401 binds to a protein of interest 402. An Eu-labeled secondary antibody 403 then binds to the primary antibody 401. The ScanLater™ system is then utilized for detection (measurement) 404. It will be understood that a detection system other than the ScanLater™ system may be utilized. FIG. 4B is a schematic view illustrating principles of TRF detection. FIG. 4B plots intensity of the lamp excitation pulse and fluorescence decay as a function of time, with time=0 corresponding to the initiation of the excitation pulse. FIG. 4B also shows the period of time during which measurement may be taken relative to the preceding excitation pulse.

The membranes are placed into a plate reader system where they are scanned with a flash-lamp based TRF cartridge that has been optimized for WB scanning. The flash-lamp reduces the cost of the system as compared to the pulsed uv laser system previously reported while maintaining sensitivity (Zuchner et al. (2009), Anal. Chem. 81(22): 9449-9453). The method does not involve enzyme detection, and the Eu-chelates are resistant to photo-bleaching so the signal remains stable for long periods of time (weeks to months). This allows repeat reading of membranes and potential for comparison of band intensities to known standards for more accurate quantitation.

The TRF detection employs photon counting; hence the theoretical dynamic range is >$10^5$. In practice, dynamic range is limited by saturation of binding sites on high-abundance bands and non-specific binding to background membrane. There is also no camera "blooming" from saturation with high intensity light, as can occur with chemiluminescence or fluorescence detection, thus the system gives sharp bands and excellent image quality. This system provides a substrate-free environment for membrane-bound protein analysis with high sensitivity, broad dynamic range, and long-term stability. It provides advantages over current systems by allowing improved quantification and the ability to re-scan samples for reference or as instrument standards.

Figure 5A:
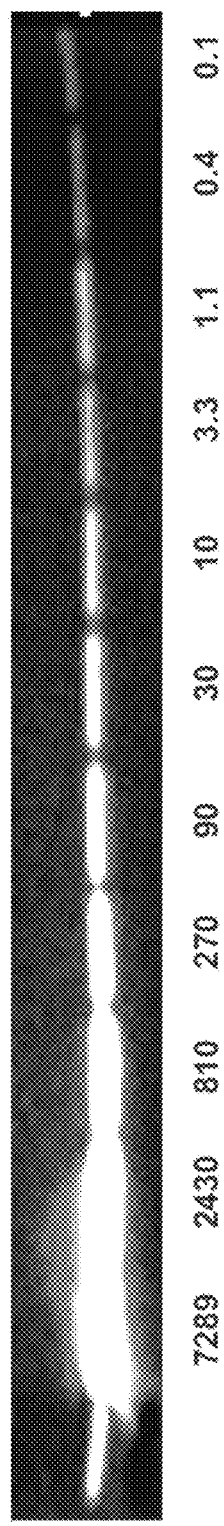
FIG. 5A is an image of a three-fold serial dilution of glutathione S-transferase (GST).
Figure 5B:
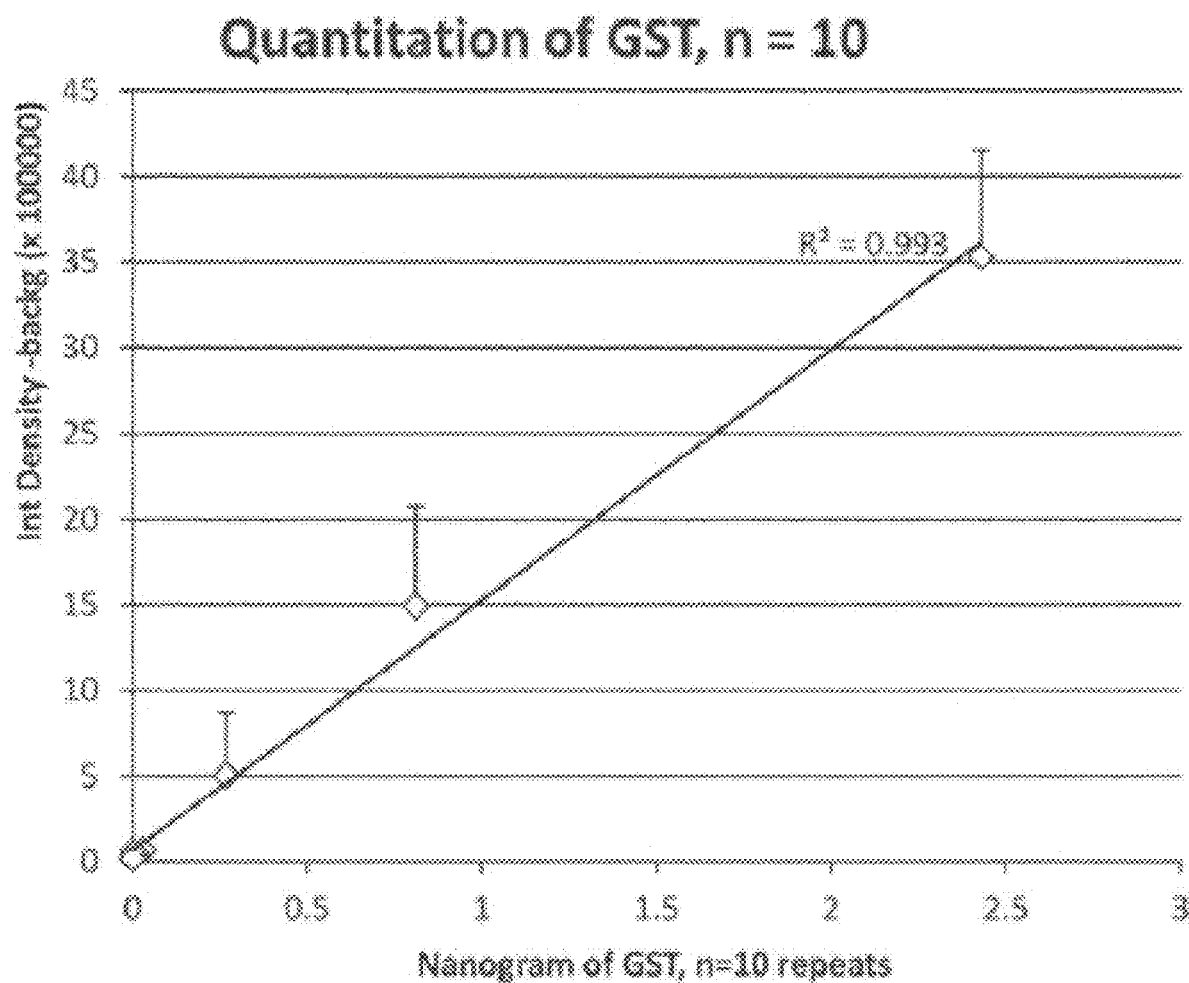
FIG. 5B is a graph of integrated intensities from individual bands across an average of 10 different Western Blots.

A three-fold serial dilution of glutathione S-transferase (GST) was used to demonstrate the dynamic range of ScanLater™ as scanned by SpectraMax® Paradigm® Multimode Detection Platform (Molecular Devices, LLC, Sunnyvale, Calif.) (see FIG. 5A) For the detection of the GST protein, biotin labeled rabbit anti-GST primary antibody was used. The ScanLater™ Eu-labeled streptavidin was used for detection. The blot was washed, dried and scanned. The system demonstrated sub-picogram detection limits of GST with over 4 logs of positive response of the signal vs. amount of GST (see FIG. 5B) FIG. 5A is an image of a GST dilution series, and FIG. 5B is a graph of integrated intensities from individual bands across an average of 10 different Western Blots.

Figure 6:
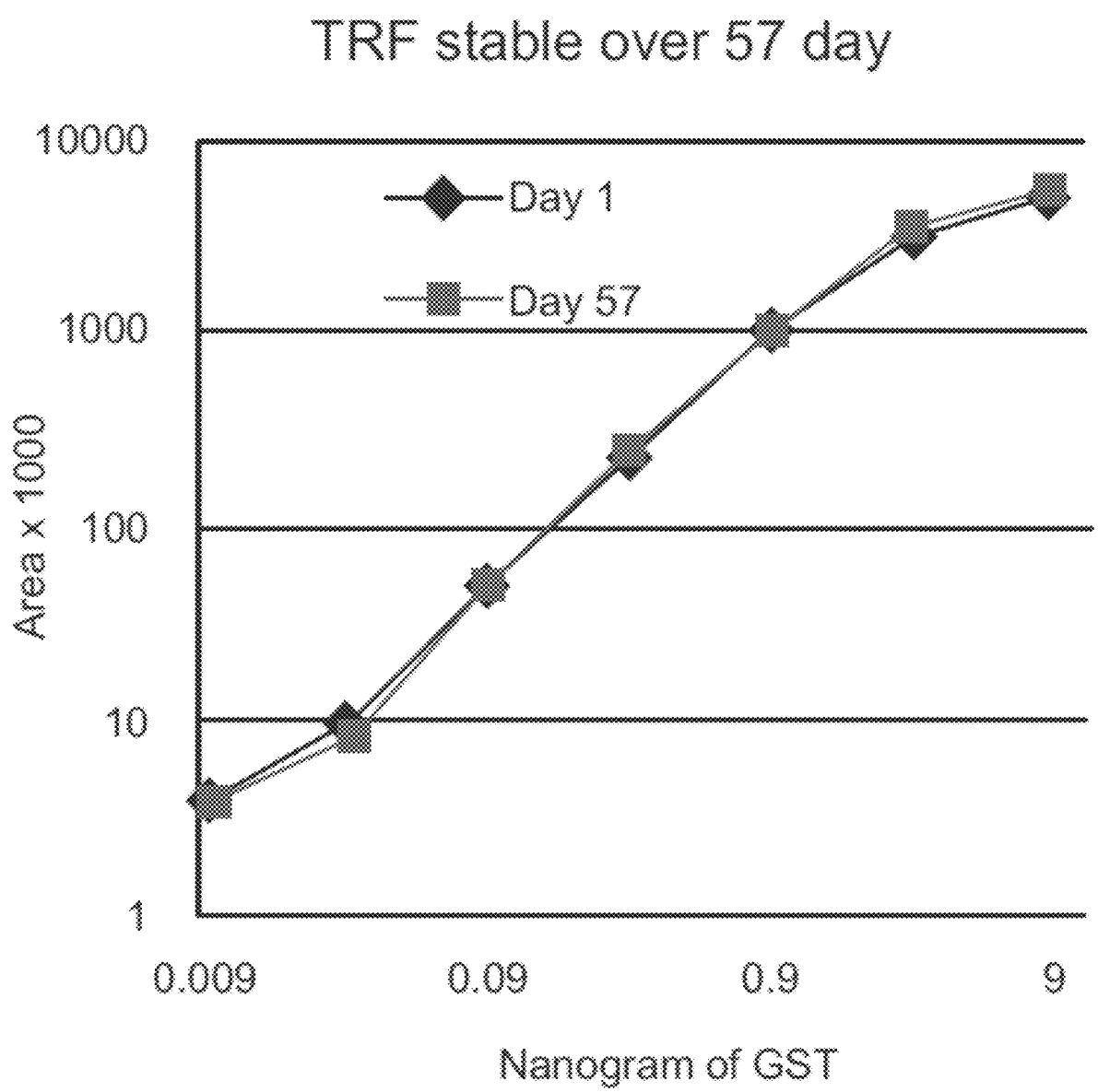
FIG. 6 is a graph showing stability of Western Blot results over time using a SpectraMax® Paradigm® reader with a ScanLatern™ cartridge.

Limitations of CL and FL detection methods include signal stability. In the case of typical CL reagents, signals are stable for 5-20 minutes after which the substrate is used up and band intensity decreases. For FL, organic fluorophors are more stable when kept in appropriate conditions, but they are prone to photobleaching and signals will decay after repeated exposure to excitation light. TRF detection avoids both of these limitations and provides improved stability performance. To show long-term stability, a three-fold serial dilution of GST was used to demonstrate the signal stability over 57 days. The WB was prepared as described previously and measured immediately after preparation (Day 1) and then 57 days later after storage in a dark environment under ambient conditions. FIG. 6 is a graph showing stability of Western Blot results over time using a SpectraMax® Paradigm® reader with a ScanLater™ cartridge. The two scans were analyzed for mean band intensity over background and the results are presented in FIG. 6. No degradation of the WB or decrease in signal was observed after 57 days of storage.

Figure 7:
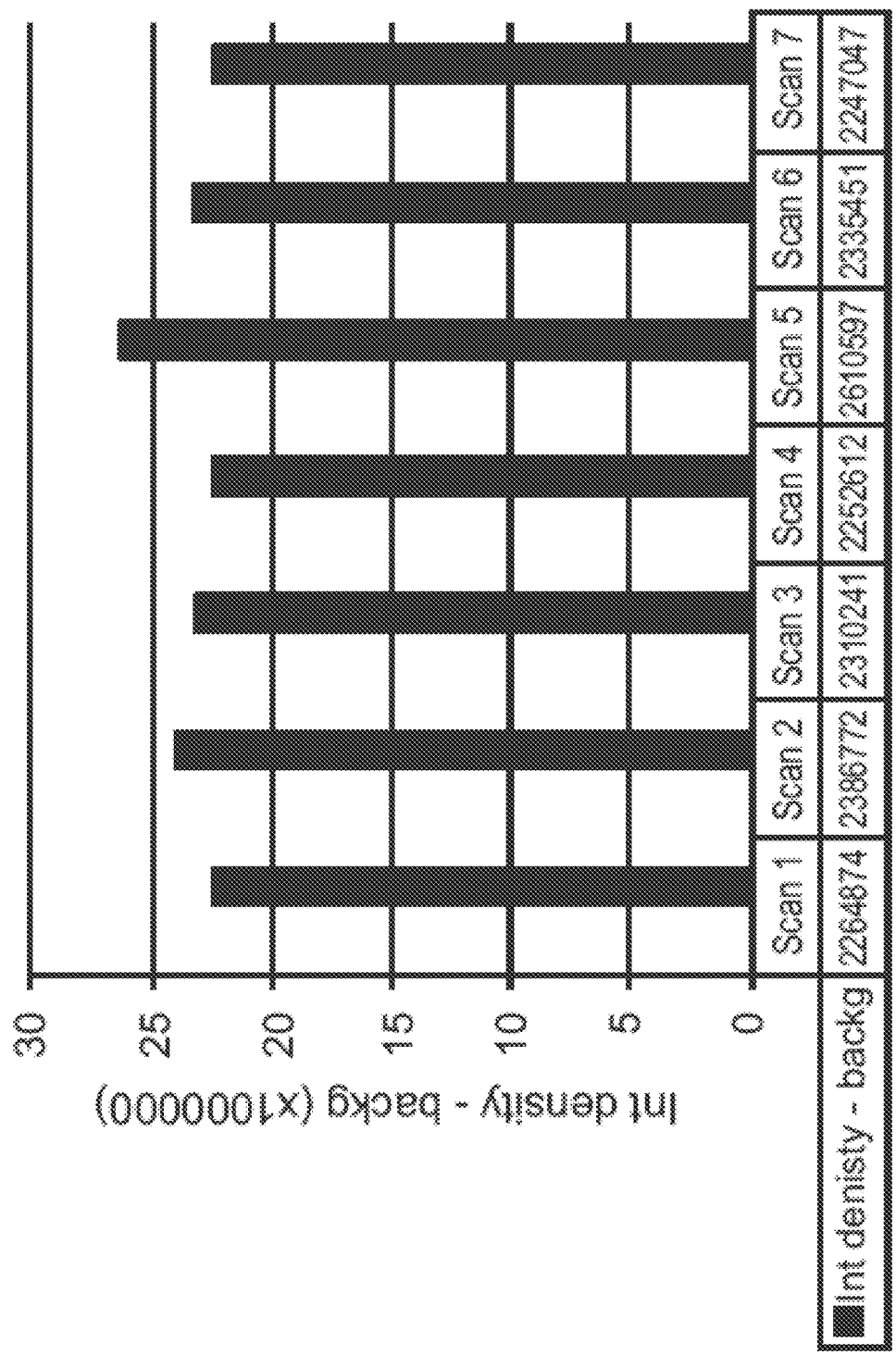
FIG. 7 is a graph showing a lack of photo-bleaching of TRF reagents after repeated scans of a single band on a Western Blot. For each scan, bars show intensity ("Int. Density").

To study the effect of photo-bleaching a WB developed with two-fold serial dilution of transferrin was subjected to repeated reads. FIG. 7 is a graph showing a lack of photo-bleaching of TRF reagents after repeated scans of a single band on a Western Blot. For each scan, bars showing integrated intensity ("Int. Density") are on the right. The average intensity from the 250 pg band was measured for each scan and the results are shown in FIG. 7. No systematic decrease in signal intensity was observed indicating that photo-bleaching of the TRF reagents was not an issue.

Multiplexing of TRF has been reported with some success. The use of Eu and Tb based probes has been demonstrated in biochemical assays using Time-Resolved Fluorescence Resonance Energy Transfer (TR-FRET) to detect two different proteins (Degorce et al. (2009) *Curr. Chem. Genomics.* 3:22-32; Bookout et al. (2000) 1 *Agric. Food Chem.* 48(12):5868-5873; Hamy et al. (2001) *J. Biomol. Screen.* 6(3):179-187). In addition, there have also been reports of multiplexing with Eu and Sm, and Eu, Tb, and Sm (Bador et al. (1987) *Clin. Chem.* 33(1):48-51; Heinonen et al. (1997) *Clin. Chem.* 43(7):1142-1150). The analytical schemes for these systems use a flashlamp with a single color bandpass filter for excitation and multiple emission bandpass filters.

Figure 8:
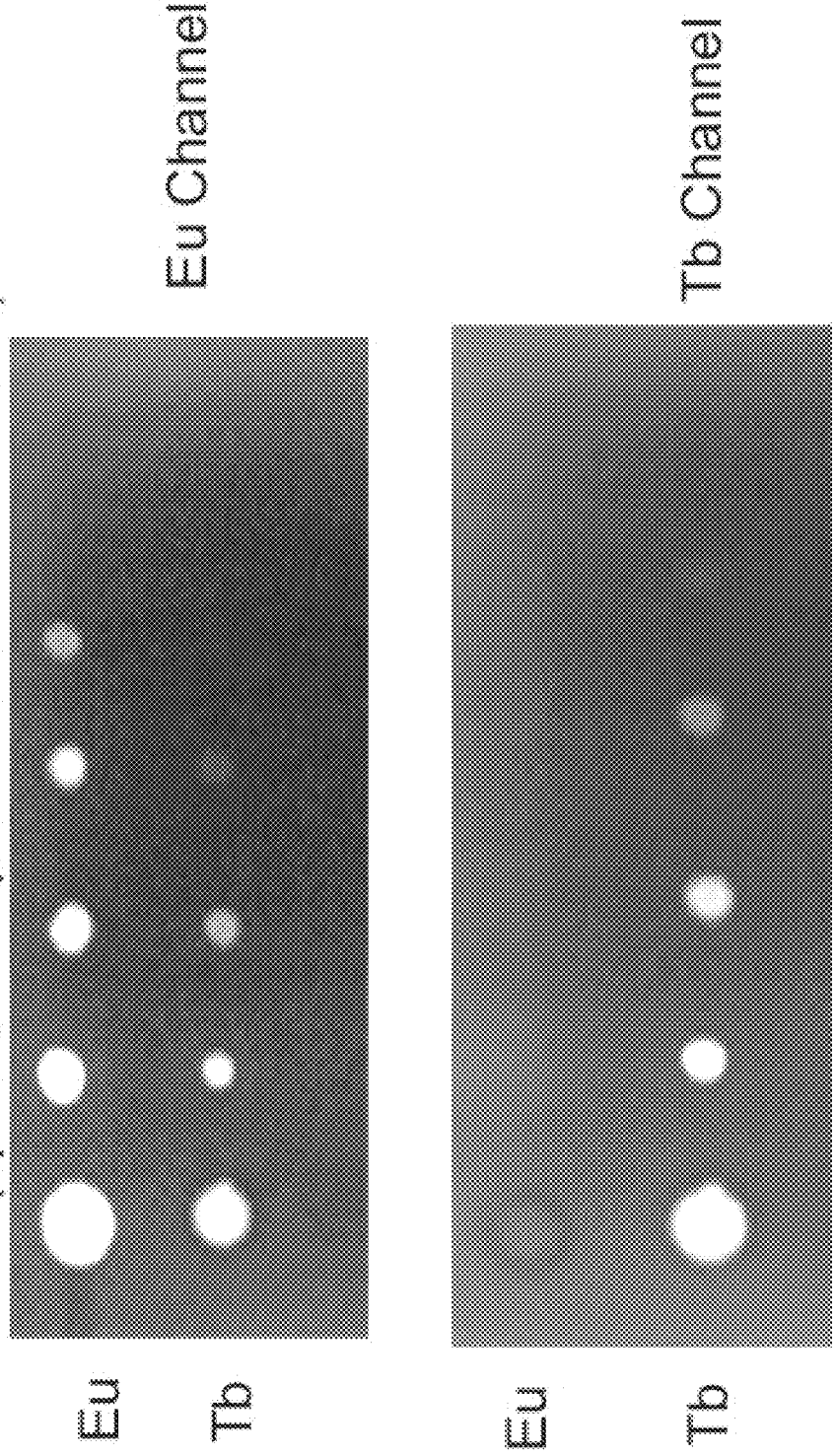
FIG. 8 shows Dot Blot results comparing cross-talk emissions between detection channels for europium (Eu) and terbium (Tb) based probes.
Figure 9:
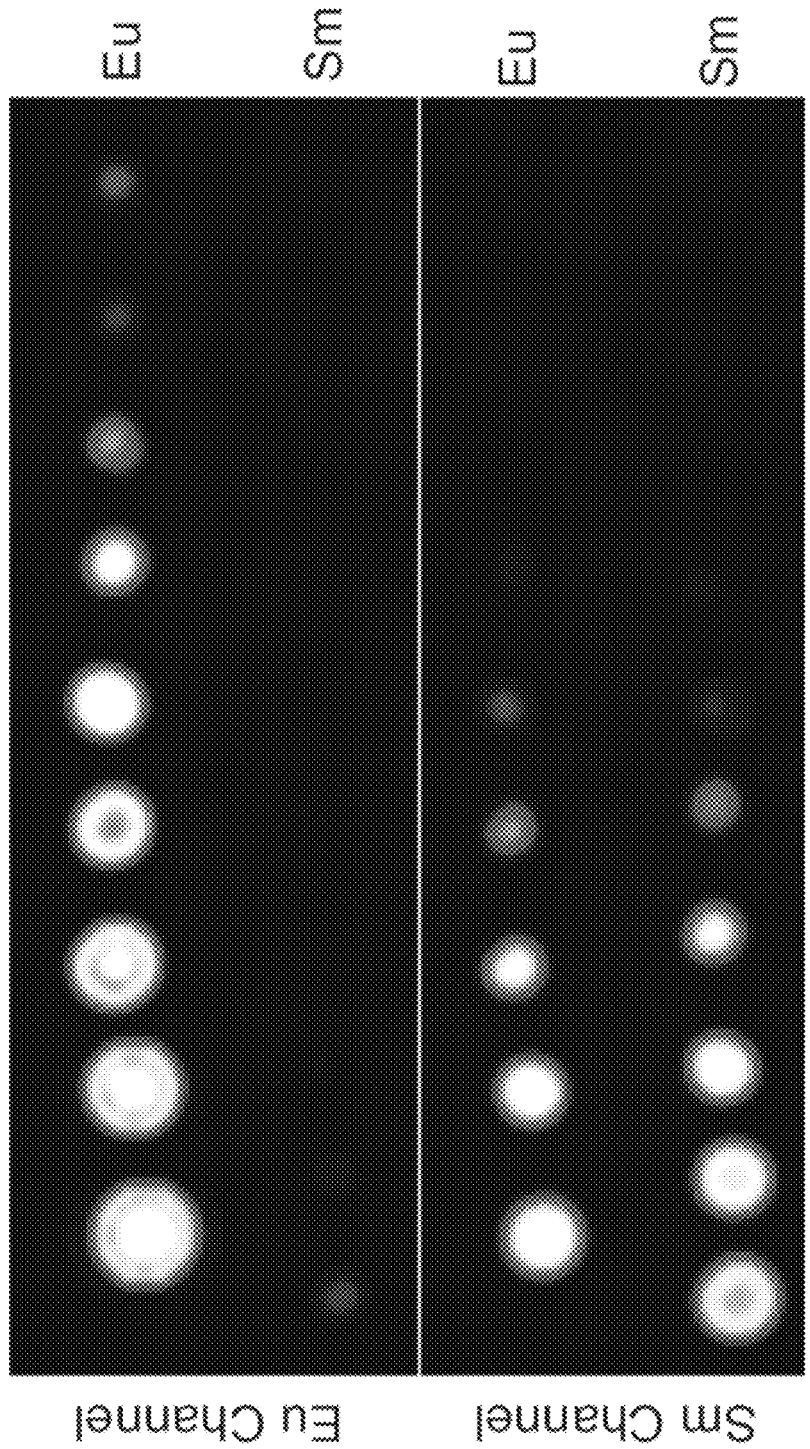
FIG. 9 shows Dot Blot results comparing cross-talk emissions between detection channels for europium (Eu) and samarium (Sm) based probes.

These systems of the prior art described above suffer from cross-talk as emission from one of the lanthanides bleeds into the detection channels of the other lanthanides. In practice, good separation can be achieved in only one of the ratios because of the abundance of emission peaks in the lanthanide spectrum. For example, with Eu and Tb there is minimal Eu signal in the Tb channel, but the Tb cross-talk into the Eu channel can be as high as 10%. Eu and Sm are reversed where there is no Sm cross-talk into the Eu channel, but significant (>10%) Eu cross-talk into the Sm channel. This limits the utility of these methods to having only one truly sensitive channel, while the other is limited by background signal from the second species. Examples of these for Eu, Tb, and Sm dot blots are shown in FIG. 8 and FIG. 9. FIG. 8 shows Dot Blot results comparing cross-talk emissions between detection channels for europium (Eu) and terbium (Tb) based probes. FIG. 9 shows Dot Blot results comparing cross-talk emissions between detection channels for europium (Eu) and samarium (Sm) based probes.

As described elsewhere herein, an aspect of the present invention concerns a novel method to multiplex long lifetime fluorescent dyes using TRF detection. We used a combination of spectral and temporal differences in fluorescence emission to enhance the ability to separate signals in an assay from multiple dyes. In some embodiments, this was reduced to practice with the combination of Ruthenium (Ru) and Europium (Eu) labels in a multiplexed Western Blot detection scheme, but also has applications to immunoassays, protein arrays, and other multiplexed biological assays. Ru has been used as a dye for detection of proteins, DNA, and other compounds and its long lifetime has been used to create analytical systems that reject shorter lifetime signals (Demas et al. (1999) *Anal. Chem.* 71(23):793A-800A; Berggren et al. (1999) *Anal. Biochem.* 276(2):129-143; Ullmer et al. (2012) *Br. J. Pharmacol.* 167(7):1448-1466) However, there have been no reports of combining Ru and Eu or other very long lifetime lanthanides in a multiplexed system.

The solution we developed exploits both time-domain and wavelength domain differences between TRF dyes to reduce cross-talk to below 1%, and more particularly to below 0.01%. Temporal Separation. Ru, whose half-life is ~1 μsec is detected with shorter time integration (2 μsec); Eu, whose half-life is ~800 μsec, is detected with longer time integration (1000 μsec). Spectral Separation: Ru is excited at 470 nm and detected at 624 nm; Eu is excited at 370 nm and detected at 616 nm.

Figure 10:
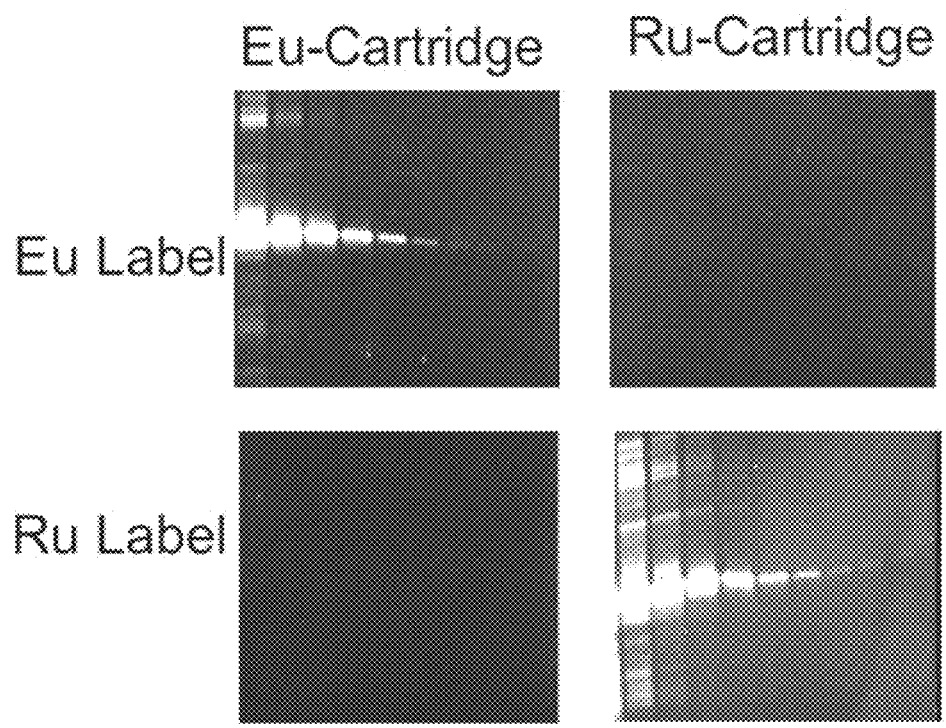
FIG. 10 shows Western Blot results of a GST dilution series comparing cross-talk emissions between detection channels with europium (Eu) and ruthenium (Ru) based probes; these scans were obtained with cartridges using laser diode excitation.

FIG. 10 shows Western Blot results of a GST dilution series comparing cross-talk emissions between detection channels with europium (Eu) and ruthenium (Ru) based probes. These scans were obtained with cartridges using laser diode excitation.

Figure 11:
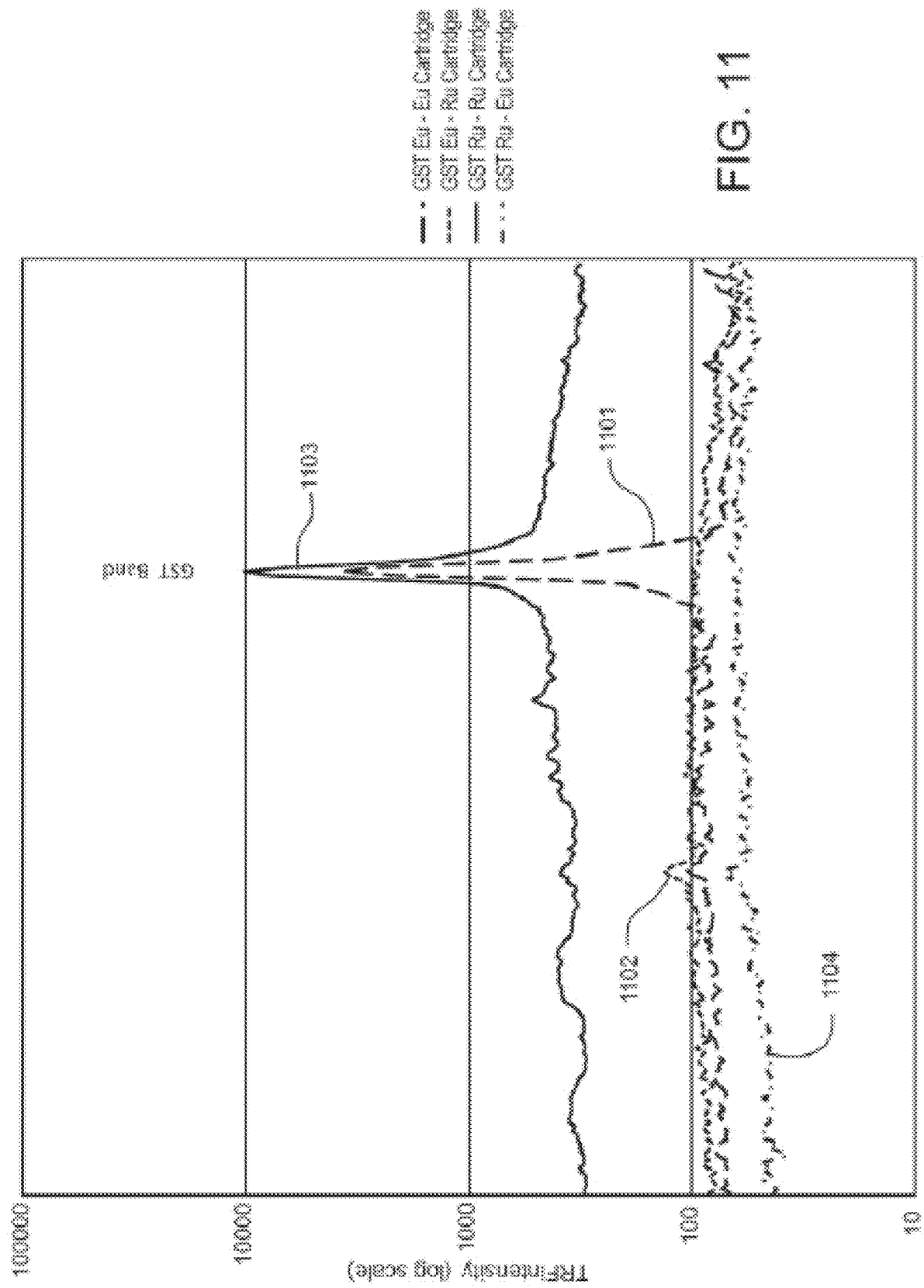
FIG. 11 is a graph showing averaged Line Scans through lanes on the Western Blots shown in FIG. 10; the line scan for the GST Eu-Eu Cartridge is labeled 1101, the line scan for the GST Eu-Ru Cartridge is labeled 1102, the line scan for the GST Ru-Ru Cartridge is labeled 1103, and the line scan for the GST Ru-Eu Cartridge is labeled 1104.

FIG. 11 is a graph showing averaged Line Scans through lanes on the Western Blots shown in FIG. 10. The line scan for the GST Eu-Eu Cartridge is labeled 1101, the line scan for the GST Eu-Ru Cartridge is labeled 1102, the line scan for the GST Ru-Ru Cartridge is labeled 1103, and the line scan for the GST Ru-Eu Cartridge is labeled 1104.

These results were obtained with two different cartridges in a SpectraMax® Paradigm® reader, but can be extended to a single cartridge that works in both SpectraMax® Paradigm® and SpectraMax® i3 Multi-Mode Microplate Reader Detection Platform systems (Molecular Devices, LLC, Sunnyvale, Calif.).

Multiplexed Fluorescence Detection Using Infrared Dyes

Multiplexed fluorescence detection has also been demonstrated with short lifetime organic dyes. However, there is a need to increase the sensitivity and dynamic range of assays that employ these systems.

While time resolved fluorescence has shown improvements over normal fluorescence, attempts to multiplex detection have had issues with crosstalk between different lanthanide dyes using for example terbium (Tb), europium (Eu), samarium (Sin) and dysprosium (Dy). As described below, crosstalk between different lanthanide dyes (which has been in 10% range) has been reduced with time-resolved fluorescence (TRF) detection methods (as described above) especially when lanthanide based fluorescent labels were chosen with lanthanide species having markedly different lifetimes. In that case, cross talk was minimized by measuring the longer lifetime species after emissions from the shorter lifetime species had extinguished. As described above, additional capability was facilitated by use of fluorescent labels including upconversion phosphors having low fluorescent backgrounds at the excitation wavelengths. Emissions from upconversion phosphor fluorescent labels typically do not to contribute background to the multiplexing detection of the lanthanide species fluorescent labels. Further capability is facilitated in the present invention by the use of fluorescent labels including infrared dyes.

However, in order to increase the sensitivity and dynamic range of assays that employ these systems, it is preferred to select the fluorescent labels with excitation and emission bands that do not contribute (or minimally contribute) to each other's emission or excitation. For example, infrared dyes have relatively broad absorption bands Therefore, emissions from other fluorescent labels could generate spurious emissions from the infrared dyes, thereby contributing to background noise or making it difficult to correlate an intensity of the infrared dye emission to a concentration of a species in the sample. Conversely, the source for exciting infrared dyes (typically at 690 nm) may also produce upconversion emissions if the UCP is not properly selected. These types of background problems are compounded if broad band emission sources are used to stimulate the lanthanide labels. The present invention with both time-domain and wavelength domain resolution minimizes this type of cross-talk permitting the use of infrared dye fluorescent labels which do not to contribute background fluorescence signals interfering with fluorescence from the upconversion species or fluorescence from the lanthanide species of fluorescent labels.

The solution described below exploits wavelength domain differences between TRF dyes to reduce cross talk to below 1%. For the combination with upconverting phosphors (UCPs), the crosstalk is expected to be below 1%.

Figure 12:
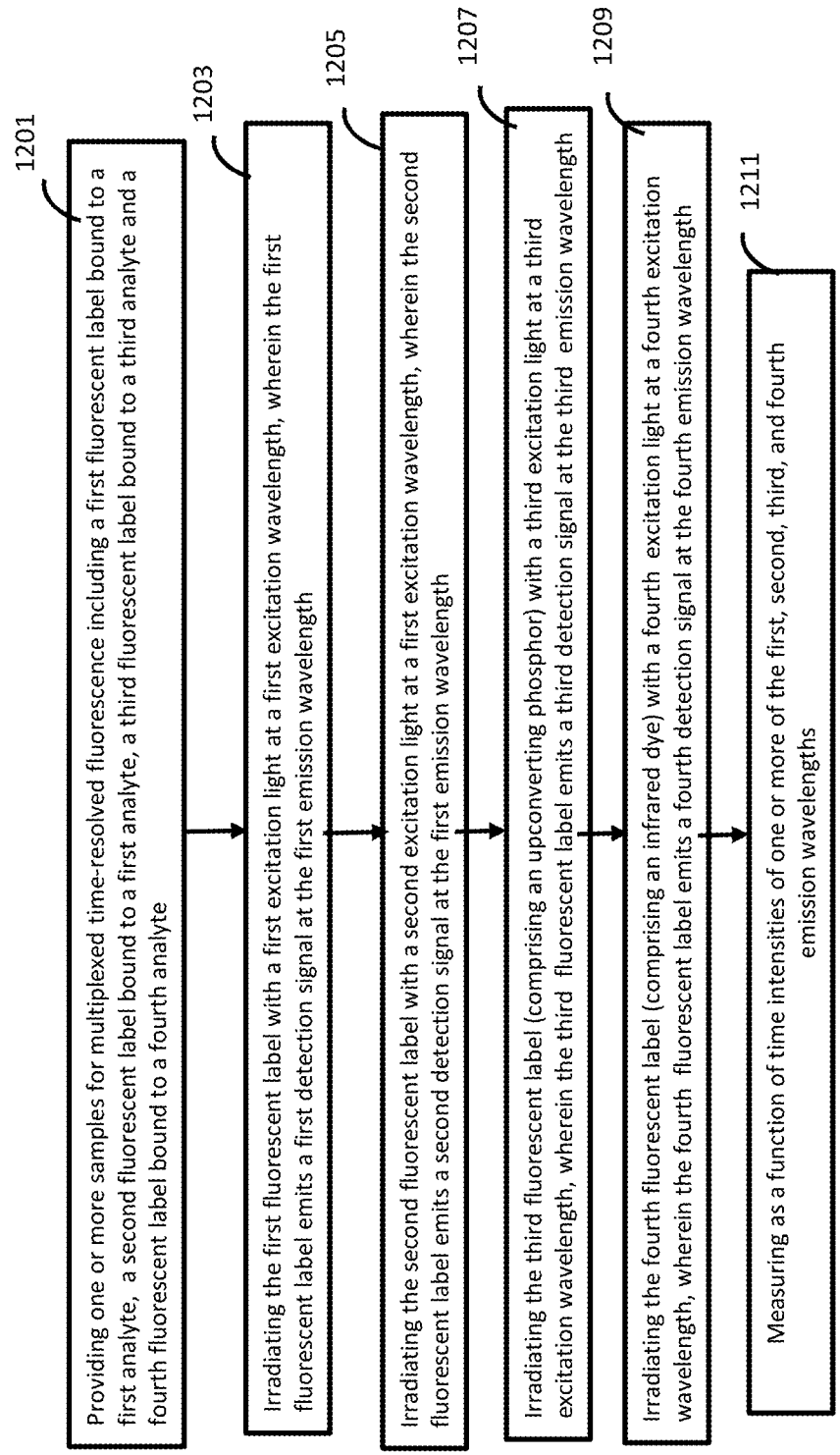
FIG. 12 is a flow chart of a method for multiplexed time-resolved fluorescence (TRF) detection according to various embodiments utilizing infrared dyes.

FIG. 12 is a flow chart depicting multiplexed time-resolved fluorescence (TRF) detection according to an embodiment of this invention.

As depicted in FIG. 12 at step 1201, the method provides a sample for multiplexed time-resolved fluorescence including a first fluorescent label bound to a first analyte, a second fluorescent label bound to a first analyte, a third fluorescent label bound to a third analyte and a fourth fluorescent label bound to a fourth analyte. The first fluorescent label emits at a first emission wavelength having a first lifetime. The second fluorescent label emits at a second emission wavelength having a second lifetime. The third fluorescent label comprises an upconverting phosphor (UCP) emitting at a third emission wavelength having a third lifetime, and the fourth fluorescent label comprises an infrared dye emitting infrared light at a fourth emission wavelength having a fourth lifetime. In one embodiment, the infrared dye can be at least one of (or both) a first IR emitter and a second IR emitter, having different excitation and emission wavelengths.

In an example of wavelength separation/resolution according to this invention, Ru (a first fluorophore) can be excited at a wavelength centered at 470 nm and is detectable by its fluorescent emission at a wavelength centered at 624 nm; Eu (a second fluorophore) can be excited at a wavelength centered at 370 nm and is detectable by its fluorescent emission at a wavelength centered at 616 nm; an upconversion phosphor (a third fluorophore) can be excited at a wavelength centered at 980 nm and is detectable by its fluorescent emission at a different wavelength depending on the type of UCP; and an infrared dye (a fourth fluorophore) such as IR 680 fluorescent dye which is excited at a wavelength centered about 680 nm and is detectable by its fluorescent emission at a wavelength centered about 730 nm, and/or IR 800 fluorescent dye which is excited at a wavelength centered about 780 nm and is detectable by its fluorescent emission at a wavelength centered about 810 nm. The present invention is not so limited to the infrared dyes, the upconversion phosphors, or the non upconversion phosphors noted above or elsewhere in the specification.

At step 1203, the first fluorescent label is irradiated with a first excitation light at a first excitation wavelength, wherein the first fluorescent label emits a first detection signal at the first emission wavelength.

At step 1205, the second fluorescent label is irradiated with a second excitation light at a second excitation wavelength different from the first excitation wavelength, wherein the second fluorescent label emits a second detection signal at the second emission wavelength.

At step 1207, the third fluorescent label (comprising an upconversion phosphor) is irradiated with a third excitation light at a third excitation wavelength (preferably different from the first excitation wavelength and different from the second excitation wavelength), wherein the third fluorescent label emits a third detection signal at the third emission wavelength. The third fluorescent label (including the UCPs) can be excited and emissions detected therefrom during any time segment because the UCPs are excited by near infrared light, not suitable for excitation of the first and second fluorophore, and preferably emits light different from the first, second, or fourth emission wavelengths.

At step 1209, the fourth fluorescent label (comprising an infrared dye) is irradiated with a fourth excitation light at a fourth excitation wavelength (preferably different from the first excitation wavelength, different from the second excitation wavelength, and different from the third excitation wavelength).

At step 1211, intensities are measured (as a function of time) one or more of the first emission wavelength, the second emission wavelength, the third emission wavelength, and the fourth emission wavelength. For example, intensities are measured of at least one of the first emission wavelength, the second emission wavelength, the third emission wavelength, and the fourth emission wavelength for a first duration, and intensities are measured of at least a different one of the first emission wavelength, the second emission wavelength, the third emission wavelength, and the fourth emission wavelength for a second duration.

For temporal separation, the first fluorescent label can have a relatively short lifetime compared to the second fluorescent label or the UCP. For example, the first fluorescent label may include a Ru donor having a half-life of ~1 μsec, and detected with a relatively short time integration (e.g., 2 μsec). The second fluorescent label may include an Eu donor having a half-life of ~800 μsec, and detected with a relatively longer time integration (e.g., 1000 μsec).

UCPs also can have a relatively prolonged half-life (e.g., 20 to 500 μsec) to the first fluorescent label and can be detected with a relatively long integration time (e.g., 50-2000 μsec). For example, $NaErF_4$:0.5% $Tm^{3+}$ nanocrystals have exhibited red upconversion luminescence through high concentration $Er^{3+}$-based host sensitization, in which $Tm^{3+}$ ions are employed to trap excitation energy. $NaYF_4$:$Yb^{3+}$/$Ho^{3+}$ or $NaYF_4$:40% $Gd^{3+}$ have red-to-green upconversions. $NaYF_4$:$Yb^{3+}$,$Er^{3+}$ nanocrystals having a high concentration of $Mn^{2+}$ have exhibited single-band red upconversion emission via an efficient energy transfer between $Mn^{2+}$ and $Er^{3+}$ Such UCPs in the literature have reported lifetimes in the range from about 10 to nearly 1000 μs. Time-resolved fluorescence measurements for these long lifetime UCPs is possible.

In one embodiment, the fourth fluorescent label (including one or more IR dyes such as IR 680 fluorescent dye and/or IR 800 fluorescent dye) excited in the near infrared region provides a fluorescent label with a relatively low background fluorescence signal from materials in vicinity of a sample. Furthermore, with the use of such IR dyes, there is almost no detectable crosstalk in relation to the time resolved fluorescence of a) the first down converting fluorescent label and/or the second down converting fluorescent label and/or b) the UCP fluorescent labels. These IR dyes have lifetimes of few tenths of a ns to 10 ns.

Figure 13:
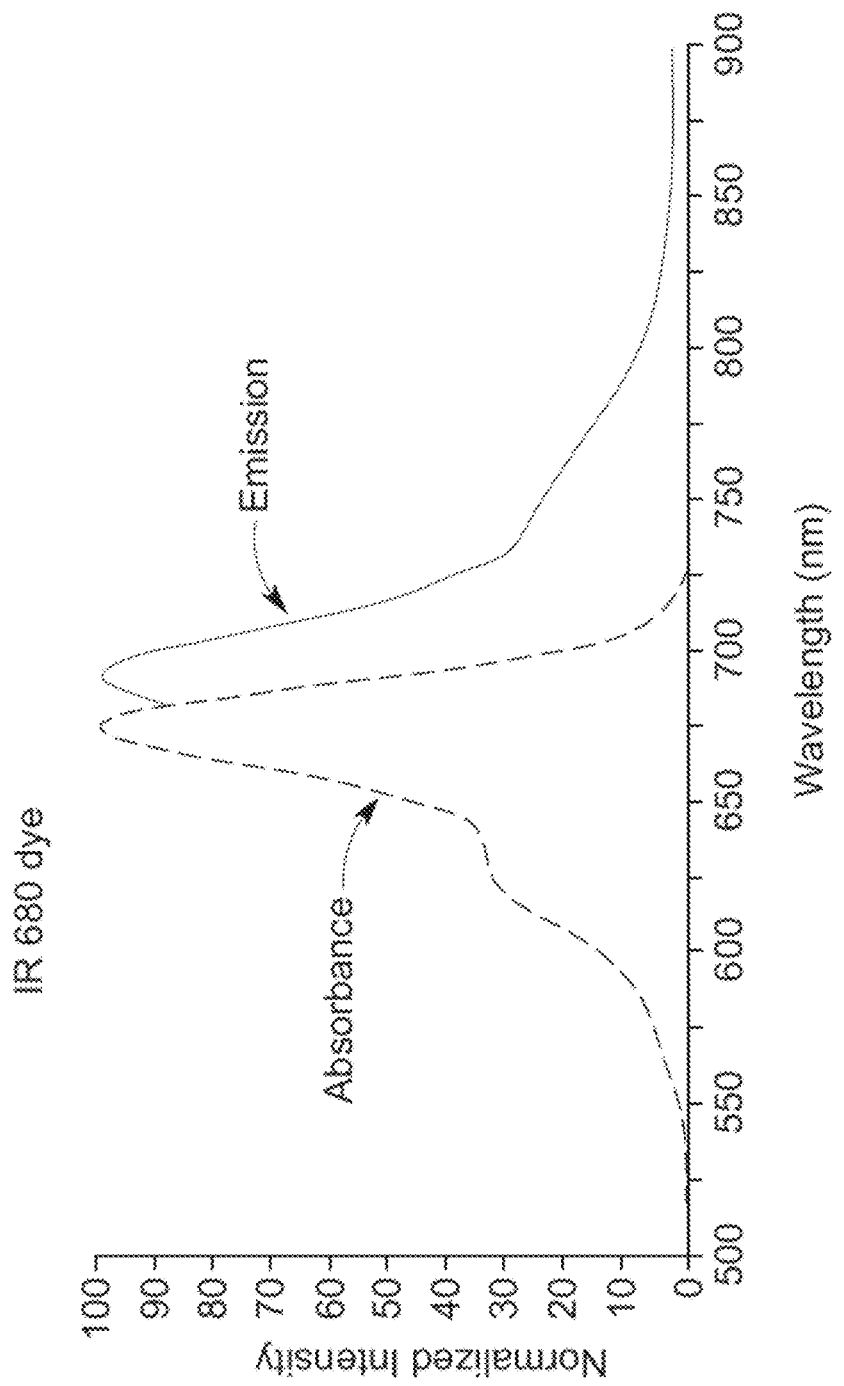
FIG. 13 is a graph depicting the measured absorbance and emission data from an IR 680 fluorescent dye.
Figure 14:
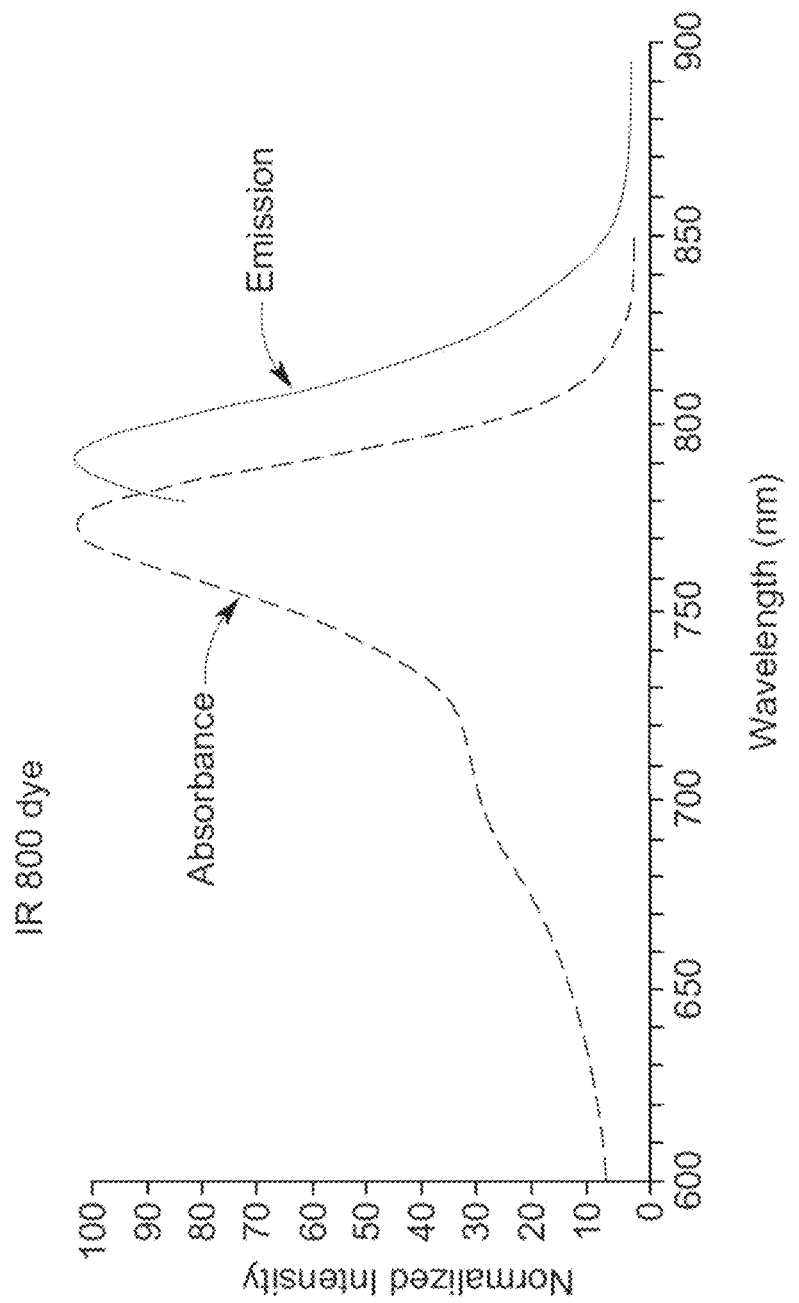
FIG. 14 is a graph depicting the measured absorbance and emission data from an IR 800 fluorescent dye.

FIGS. 13 and 14 are graphs depicting the measured absorbance and emission data from an IR 680 fluorescent dye and an IR 800 fluorescent dye. This data shows the breadth of the absorbance and the emission from infrared dyes, and illustrates the meaning of "centered about" as used herein. Furthermore, these graphs serve to illustrate the potential issues noted above in the selection of wavelength resolved excitation and emission lines. Because of the broad absorbance, emissions from other fluorescent labels in the range from 650 to 675 nm could generate spurious emissions from the infrared dyes.

Figure 15:
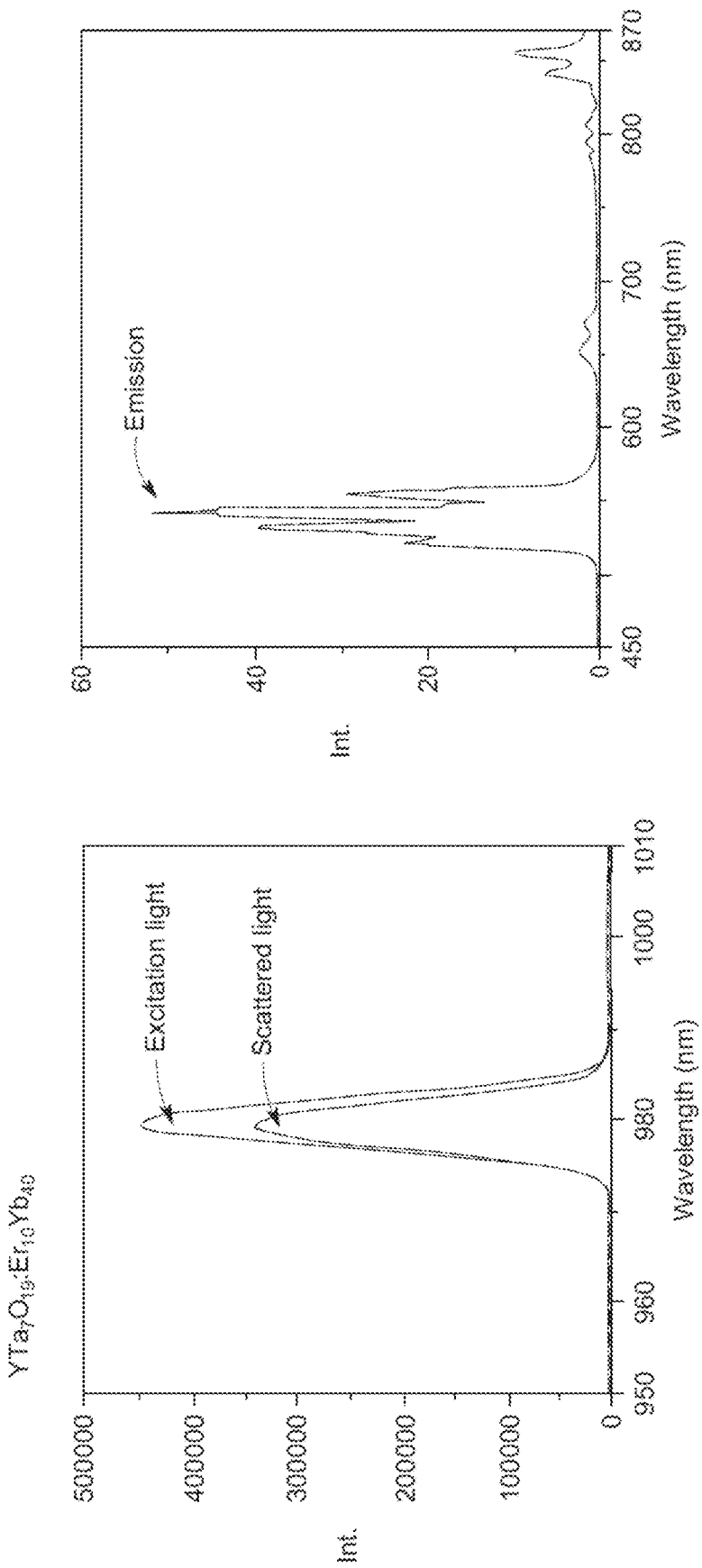
FIG. 15 is a graph depicting excitation and emission data from an upconversion phosphor.

Conversely, the source for exciting infrared dyes (typically at 690 nm) may also produce upconversion emissions if the UCP is not properly selected. FIG. 15 is a graph depicting excitation and emission data from an upconversion phosphor $YTa_7O_{19}$:$Er_{10}Yb_{40}$. Here, this upconversion phosphor would not be excited by the 680 nm or 780 nm light used to excite IR 680 or IR 780. Moreover, its emissions about 535 nm would not excite the Ru and Eu fluorophores, excitable respectively at 470 nm and 570 nm.

Returning to a discussion of step 1211 noted above, this step includes the measuring (as a function of time) of at least one of the first emission wavelength, the second emission wavelength, the third emission wavelength, and the fourth emission wavelength. The first and second durations may be the same duration if the emission wavelengths are sufficiently wavelength dispersed such that, in this embodiment, the intensity of one of the fluorescent labels is not skewed by the intensity of another one of the fluorescent labels. The first and second durations may be completely separate in time. This embodiment would be useful when the intensity of one of the fluorescent labels is skewed by the intensity of another one of the fluorescent labels. This embodiment would be useful when the intensity of background fluorescence of one of the fluorescent labels would interfere with a measurement of an intensity of another one of the fluorescent labels. In this embodiment, by delaying measurement, the background fluorescence decays away before exciting and/or measuring the fluorescence of the target molecule.

Figure 16:
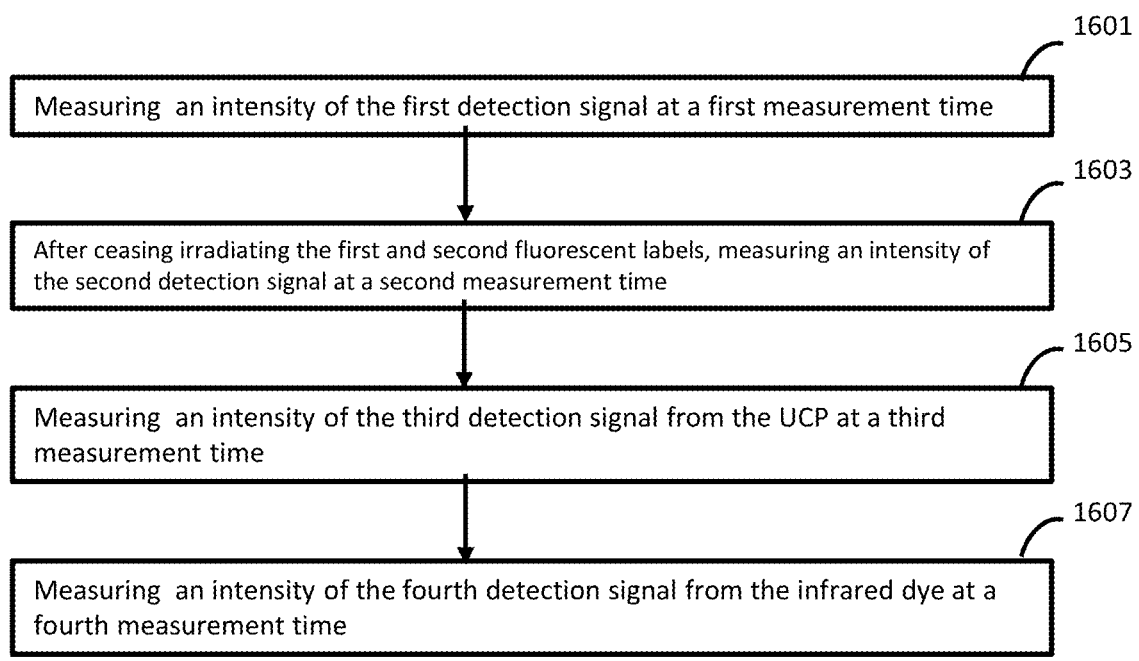
FIG. 16 is a flow chart of a method for multiplexed time-resolved fluorescence (TRF) detection according to various embodiments utilizing infrared dyes for low noise fluorescence measurements.

FIG. 16 is a flow chart of a method for multiplexed time-resolved fluorescence (TRF) detection elaborating on different ways to implement step 1211 of FIG. 12. In FIG. 16, at 1601, an intensity of the first detection signal is measured at a first measurement time. Here, the intensity of the first detection signal is correlated with the amount of the first analyte in the sample. At step 1603, after ceasing irradiating the first and second fluorescent labels, an intensity of the second detection signal is measured at a second measurement time different from the first measurement time. Here, the intensity of the second detection signal is correlated with the amount of the second analyte in the sample. In one embodiment of the invention, the detection of the second fluorescent label can occur after ceasing irradiating the first fluorophore and preferably after the first fluorophore's emission has extinguished.

At step 1605, an intensity of the third detection signal from the UCP is measured at a third measurement time. Here, the intensity of the third detection signal is correlated with the amount of the third analyte in the sample. At step 1607, an intensity of the fourth detection signal from the infrared dye is measured at a fourth measurement time. Here, the intensity of the fourth detection signal is correlated with the amount of the fourth analyte in the sample.

While described above with respect to the first and second detection signals having time resolved measurement in which the intensity of the second detection signal is measured at a second measurement time different from the first measurement time, the invention is not so limited, and any or all of the first, second, third, and fourth fluorescent labels can be measured at different times from one or all of the other times when the other labels are being measured.

Consistent with the examples described above, the first excitation wavelength can be at least one visible wavelength, the second excitation wavelength can be at least one ultraviolet light, the third excitation wavelength can be a first infrared wavelength, and the fourth excitation wavelength can be a second infrared wavelength different from the first infrared wavelength. While described above, with the first excitation wavelength being at least one visible wavelength, the second excitation wavelength being at least one ultraviolet light, the third excitation wavelength being a first infrared wavelength, and the fourth excitation wavelength being a second infrared wavelength different from the first infrared wavelength, the present invention is not so limited. In general, it is desirable that the excitation wavelengths be different.

Indeed, in one embodiment of the invention, the first excitation wavelength, the second excitation wavelength, the third excitation wavelength, the first emission wavelength, the second emission wavelength, the third emission wavelength are different wavelengths (preferably spectrally resolvable from each other) separated from each other by 5-10 nm, by 10-20 nm, or by 20-100 nm or by 100-300 nm, or by 300-600 nm. In this way, stray light from any of the excitations of (or emissions from) one label would not interfere with excitations of (or emissions from) the other labels.

Figure 17:
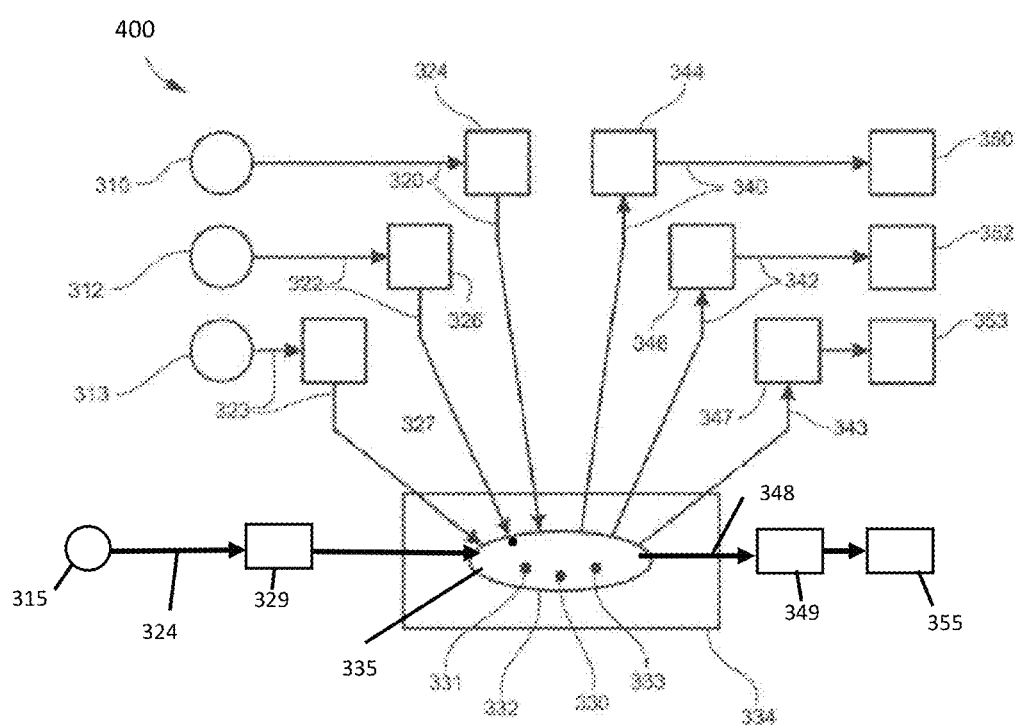
FIG. 17 is a schematic view of an example of a fluorescence detection apparatus according to another embodiment.

As an example, in the embodiment illustrated in FIG. 17, the apparatus 400 may include, in addition to the first light source 310 and the second light source 312 configured for generating the first excitation light 320 and the second excitation light 322, and the third light source 313 configured for generating a third excitation light 327, respectively a fourth light source 315 for generating a fourth excitation light 324. The apparatus 300 may also include, in addition to the first light detector 350 and the second light detector 352 configured for receiving and measuring a first detection signal 340 and a second detection signal 342 emitted from the first analyte 330 and the second analyte 331, a third light detector 353 configured for receiving and measuring a third detection signal 343 emitted from a third analyte 333 of the sample 332, respectively a fourth light detector 355 configured for receiving and measuring a fourth detection signal 348 emitted from a fourth analyte 335 of the sample 332. The apparatus 300 may also include, in addition to the first excitation optics 324, the second excitation optics 326, and the third excitation optics 327, fourth excitation optics 329. The apparatus 300 may also include, in addition to the first emission optics 344, the second emission optics 346, and the third emission optics 347, fourth emission optics 349.

As in other embodiments described herein, one or more of the foregoing components may be provided in one or more cartridges (not shown) that may be removably installed in the apparatus 400. As in other embodiments described herein, the apparatus 400 shown in FIG. 17 may be utilized for duplex measurements that employ two different fluorescent labels bound to different analytes. In addition, the apparatus 400 shown in FIG. 17 may be utilized for triplex measurements that employ three different fluorescent labels bound to different analytes. In other embodiments, the apparatus 400 may include more than four light sources and/or more than four light detectors.

As in other embodiments described herein, the apparatus 400 may further include a computing device, such as the computing device (or system controller) 236 described above and schematically illustrated in FIG. 2, which is configured for controlling, monitoring and/or timing various functional aspects of the apparatus 400, receiving data or other signals from the apparatus 400 such as detection signals from the light detectors and transmitting control signals to the light detector detectors and/or other components. For example, in a duplex experiment the computing device may be configured for controlling the first light source 310 and the second light source 312 to respectively generate the first excitation light 320 and the second excitation light 322 at predetermined excitation times and for predetermined durations, controlling the first light detector 350 to measure the first detection signal 340 at a first measurement time, and controlling the second light detector 352 to measure the second detection signal 342 at a second measurement time different from the first measurement time. The computing device may also be configured for receiving an electrical output from the respective light detectors 350 and 352 corresponding to measurements of the first detection signal 340 and the second detection signal 342, and correlating the measurements with the amount of the first analyte 330 in the sample 332 and the amount of the second analyte 331 in the sample 332. The computing device may also be configured for controlling the second light source 312 to cease generating the second excitation light 322, and controlling the second light detector 352 to measure the second detection signal 342 after ceasing generating the second excitation light 322.

As another example, the computing device may be configured for controlling the third light source 313 and the fourth light source 315 to generate respectively the third excitation light 323 and the fourth excitation light 324 at respective predetermined excitation times and for respective predetermined durations, and controlling the third light detector 353 to measure the third detection signal 343 at a third measurement time different from the first measurement time and the second measurement time, and may be configured for controlling the fourth light detector 355 to measure the fourth detection signal 343 at a fourth measurement time different from the first measurement time, the second measurement time, and the third measurement time. The computing device may also be configured for controlling the third light source 313 to cease generating the third excitation light 323, and controlling the third light detector 353 to measure the third detection signal 343 at a third measurement time different from the first measurement time and the second measurement time after ceasing generating the third excitation light 323. The computing device may also be configured for receiving an electrical output from the third light detector 353 corresponding to a measurement of the third detection signal 343, and correlating the measurement with the amount of the third analyte 333 in the sample 332. The computing device may also be configured for controlling the fourth light source 315 to cease generating the fourth excitation light 324, and controlling the fourth light detector 355 to measure the fourth detection signal 348 at a fourth measurement time, preferably (but not necessarily) different from the first measurement time, the second measurement time, and the third measurement time, preferably (but not necessarily) after ceasing generating the fourth excitation light 324. The computing device may also be configured for receiving an electrical output from the fourth light detector 355 corresponding to a measurement of the fourth detection signal 348, and correlating the measurement with the amount of the fourth analyte 335 in the sample 332.

In any of the embodiments illustrated in FIGS. 2-3H and 17, certain components of the apparatus 400 may be common to (or shared by) more than one channel. Thus, the number of light sources provided may be different from the number of light detectors provided, or the number of sets of excitation or emission optics, etc. For example, a light detector may have a range of wavelength sensitivity that allows it to be effective in detecting signals transmitted over two or more channels. As another example, the emission optics may include an emission filter having a wavelength bandpass effective for filtering detection signals transmitted over two or more channels. Providing common or shared components may reduce the total number of, and total space required by, components required for the apparatus 400, and may enable the apparatus 400 and/or cartridges utilized with the apparatus 400 to be more compact.

In some embodiments and as described elsewhere herein, the sample 332 may be provided by contacting the sample 332 with: a first antibody that specifically binds the first analyte 330, a second antibody that specifically binds the second analyte 331; a first fluorescent antibody conjugate that specifically binds the first antibody, the first fluorescent antibody conjugate being or including the first (UCP) fluorescent label; and a second fluorescent antibody conjugate that specifically binds the second antibody, the second fluorescent antibody conjugate being or including the second (non-UCP) fluorescent label. The sample 332 may then be incubated under conditions and for a time sufficient to allow the antibodies and the antibody conjugates to form immunocomplexes.

In other embodiments and as described elsewhere herein, the sample 332 may be provided by contacting the sample 332 with a first antibody that specifically binds the first analyte and a second antibody that specifically binds the second analyte. The first fluorescent label may be attached directly to the first antibody, and/or the second fluorescent label may be attached directly to the second antibody.

As an example of a method for multiplexed fluorescence detection, the sample 332 includes a third fluorescent label bound to a third analyte 333 and a fourth fluorescent label bound to a fourth analyte 335. Antibodies and antibody conjugates, or direct binding, may be performed depending on the embodiment. The first, second, third, and fourth analytes may be, for example, a protein, a membrane-bound protein, a reference protein, an unknown protein, an unmodified protein, or a modified or phosphorylated version of a protein, as described herein. The first and second fluorescent labels may be or include a transition metal chelate, or include a lanthanide chelate. The third fluorescent label may be or include a UCP label. The fourth fluorescent label may be an infrared dye.

Measurement of the first analyte 330 may be acquired by normal fluorescence or TRF as described above. Measurement of the second analyte 331 may be acquired by normal fluorescence or TRF as described above. In some embodiments, the first fluorescence emission lifetime is longer than the second fluorescence emission lifetime by a factor of at least 5 times, or at least 50 times, or at least 100 times, or at least 500 times, or 1000 times. Measurement of the third analyte 333 (containing the UCP) may be acquired by normal fluorescence as described above. Measurement of the infrared dye containing analyte (fourth analyte 335) may be acquired by normal fluorescence.

Exemplary Embodiments

Exemplary embodiments provided in accordance with the presently disclosed subject matter include, but are not limited to, the following:

1. A method for multiplexed fluorescence detection, the method comprising providing a sample comprising a first fluorescent label bound to a first analyte and a second fluorescent label bound to a second analyte, wherein the first fluorescent label comprises an upconverting phosphor (UCP) and the second fluorescent label comprises a non-UCP label; irradiating the first fluorescent label with a first excitation light at a first excitation wavelength, wherein the first fluorescent label emits a first detection signal at a first emission wavelength; irradiating the second fluorescent label with a second excitation light at a second excitation wavelength different from the first excitation wavelength, wherein the second fluorescent label emits a second detection signal at a second emission wavelength; measuring an intensity of the first detection signal at a first measurement time, wherein the intensity of the first detection signal is correlated with the amount of the first analyte in the sample;

ceasing irradiating the second fluorescent label; and after ceasing irradiating the second fluorescent label, measuring an intensity of the second detection signal at a second measurement time, wherein the intensity of the second detection signal is correlated with the amount of the second analyte in the sample.

2. The method of embodiment 1, comprising measuring the intensity of the first detection signal while irradiating the first fluorescent label.

3. The method of embodiment 1, comprising ceasing irradiating the first fluorescent label and, after ceasing irradiating the first fluorescent label, measuring the intensity of the first detection signal.

4. The method of any of the preceding embodiments, wherein the sample comprises a third fluorescent label bound to a third analyte, the third fluorescent label comprises a non-UCP label different from the second fluorescent label, and the method further comprises: irradiating the third fluorescent label with a third excitation light at a third excitation wavelength different from the first excitation wavelength and the second excitation wavelength, wherein the third fluorescent label emits a third detection signal at a third emission wavelength; ceasing irradiating the third fluorescent label; and after ceasing irradiating the third fluorescent label, measuring an intensity of the third detection signal at a third measurement time.

5. The method of embodiment 4, comprising measuring the intensity of the first detection signal while irradiating the first fluorescent label.

6. The method of embodiment 4, comprising ceasing irradiating the first fluorescent label and, after ceasing irradiating the first fluorescent label, measuring the intensity of the first detection signal.

7. The method of any of embodiments 4-6, wherein the second fluorescent label comprises a transition metal chelate, and the third fluorescent label comprises a lanthanide chelate.

8. The method of any of embodiments 4-6, wherein: the second fluorescent label comprises a transition metal chelate selected from the group consisting of transition metal chelates of ruthenium (Ru(I)), osmium (Os(II)), and rhenium (Re(I)); and the third fluorescent label comprises a lanthanide chelate selected from the group consisting of lanthanide chelates of samarium (Sm(III)), dysprosium (Dy(III)), europium (Eu(III)), and terbium (Tb(III)).

9. The method of any of embodiments 4-8, wherein: the first excitation wavelength is in the near-infrared range, and the first emission wavelength is in the visible range; and at least one of the second excitation wavelength and the third excitation wavelength is in the ultraviolet range.

10. The method of any of embodiments 4-9, wherein the UCP of the first fluorescent label has a first fluorescence emission lifetime, the second fluorescent label has a second fluorescence emission lifetime, the third fluorescent label has a third fluorescence emission lifetime, and the first fluorescence emission lifetime is different than the second fluorescence emission lifetime and the third fluorescence emission lifetime.

11. The method of any of embodiments 4-9, wherein the UCP of the first fluorescent label has a first fluorescence emission lifetime, the second fluorescent label has a second fluorescence emission lifetime, the third fluorescent label has a third fluorescence emission lifetime, and the second fluorescence emission lifetime is longer than the third fluorescence emission lifetime by a factor selected from the group consisting of: at least 5 times; at least 50 times; at least 100 times; at least 500 times; and at least 1000 times.

12. The method of any of embodiments 4-9, wherein the UCP of the first fluorescent label has a first fluorescence emission lifetime, the second fluorescent label has a second fluorescence emission lifetime, and comprising at least one of: at least one of the second fluorescence emission lifetime and the third emission lifetime is in a range of 0.1 µs to 10 µs; at least one of the second fluorescence emission lifetime and the third emission lifetime is in a range of 100 µs to 1 ms.

13. The method of any of embodiments 4-12, wherein at least one of the second fluorescent label and the third fluorescent label has a Stokes shift selected from the group consisting of: a Stokes shift of greater than 20 nm; a Stokes shift of greater than 100 nm, a Stokes shift of greater than 250 nm; and a Stokes shift in a range from about 250 nm to about 350 nm.

14. The method of any of embodiments 4-13, wherein the second emission wavelength is different from the first emission wavelength.

15. The method of any of embodiments 4-14, wherein the second measurement time is different from the first measurement time.

16. The method of any of embodiments 4-15, wherein the third emission wavelength is different from the first emission wavelength and the second emission wavelength.

17. The method of any of embodiments 4-16, wherein the third measurement time is different from the first measurement time and the second measurement time.

18. The method of any of the preceding embodiments, wherein providing the sample comprises: contacting the sample with: a first antibody that specifically binds the first analyte; a second antibody that specifically binds the second analyte; a third antibody that specifically binds the third analyte; a first fluorescent antibody conjugate that specifically binds the first antibody, wherein the first fluorescent antibody conjugate comprises the first fluorescent label; and a second fluorescent antibody conjugate that specifically binds the second antibody, wherein the second fluorescent antibody conjugate comprises the second fluorescent label; a third fluorescent antibody conjugate that specifically binds the third antibody, wherein the third fluorescent antibody conjugate comprises the third fluorescent label; and incubating the sample under conditions and for a time sufficient to allow the antibodies and the antibody conjugates to form immunocomplexes.

19. The method of any of embodiments 4-17, wherein providing the sample comprises contacting the sample with a first antibody that specifically binds the first analyte, a second antibody that specifically binds the second analyte, and a third antibody that specifically binds the third analyte, wherein at least one of the first fluorescent label, the second fluorescent label and the third fluorescent label is attached directly to the respective first antibody, second antibody, or third antibody.

20. The method of any of the preceding embodiments, wherein the first analyte, the second analyte, and the third analyte comprise proteins or membrane-bound proteins.

21. The method of any of the preceding embodiments, wherein at least one of the first analyte, the second analyte, and the third analyte is a reference protein, and at least one other of the first analyte, the second analyte, and the third analyte is an unknown protein, and further comprising: normalizing the detection signal acquired from the unknown protein to the detection signal acquired from the reference protein.

22. The method of any of the preceding embodiments, wherein at least one of the first analyte, the second analyte, and the third analyte is an unmodified protein, and at least one other of the first analyte, the second analyte, and the third analyte is a modified or phosphorylated version of the protein, and further comprising calculating a ratio of the modified or phosphorylated version of the protein to the unmodified protein based on the measured intensities of the detection signals acquired from the unmodified protein and the modified or phosphorylated version of the protein.

23. The method of any of the preceding embodiments, comprising directing at least two of the first detection signal, the second detection signal, and the third detection signal through a common emission filter.

24. The method of any of the preceding embodiments, wherein the UCP comprises a lanthanide-doped or transition metal-doped inorganic compound exhibiting anti-Stokes shift.

25. The method of embodiment 24, wherein the inorganic compound comprises a dopant ion selected from the group consisting of erbium ($Er^{3+}$), thulium ($Tm^{3+}$), holmium ($Ho^{3+}$), praseodymium ($Pr^{3+}$), neodymium ($Nd^{3+}$), dysprosium ($Dy^{3+}$), ytterbium ($Yb^{3+}$), samarium ($Sm^{3+}$), and a combination of two or more of the foregoing.

26. The method of embodiment 24 or 25, wherein the inorganic compound is selected from the group consisting of a halide, an oxide, and an oxysulfide.

27. The method of any of the preceding embodiments, wherein the second fluorescent label comprises a transition metal chelate or a lanthanide chelate.

28. The method of any of the preceding embodiments, wherein the second fluorescent label comprises a transition metal chelate selected from the group consisting of transition metal chelates of ruthenium (Ru(II)), osmium (Os(II)), and rhenium (Re(I)).

29. The method of any of the preceding embodiments, wherein the second fluorescent label comprises a lanthanide chelate selected from the group consisting of lanthanide chelates of samarium (Sm(III)), dysprosium (Dy(III)), europium (Eu(III)), and terbium (Tb(II)).

30. The method of any of the preceding embodiments, wherein the first excitation wavelength is in the near-infrared range, and the first emission wavelength is in the visible range.

31. The method of any of the preceding embodiments, wherein the second excitation wavelength is in the ultraviolet range, and the second emission wavelength is longer than the second excitation wavelength.

32. The method of any of the preceding embodiments, wherein the UCP of the first fluorescent label has a first fluorescence emission lifetime, the second fluorescent label has a second fluorescence emission lifetime, and the first fluorescence emission lifetime is different than the second fluorescence emission lifetime.

33. The method of any of the preceding embodiments, wherein the UCP of the first fluorescent label has a first fluorescence emission lifetime, the second fluorescent label has a second fluorescence emission lifetime, and comprising at least one of: the second fluorescence emission lifetime is in a range of 0.1 µs to 10 µs; the second fluorescence emission lifetime is in a range of 100 µs to 1 ms.

34. The method of any of the preceding embodiments, wherein the second fluorescent label has a Stokes shift selected from the group consisting of: a Stokes shift of greater than 20 nm; a Stokes shift of greater than 100 nm; a Stokes shift of greater than 250 nm; and a Stokes shift in a range from about 250 nm to about 350 nm.

35. The method of any of the preceding embodiments, wherein the second emission wavelength is different from the first emission wavelength.

36. The method of any of the preceding embodiments, wherein the second measurement time is different from the first measurement time.

37. The method of any of the preceding embodiments, wherein providing the sample comprises: contacting the sample with: a first antibody that specifically binds the first analyte; a second antibody that specifically binds the second analyte; a first fluorescent antibody conjugate that specifically binds the first antibody, wherein the first fluorescent antibody conjugate comprises the first fluorescent label; and a second fluorescent antibody conjugate that specifically binds the second antibody, wherein the second fluorescent antibody conjugate comprises the second fluorescent label; and incubating the sample under conditions and for a time sufficient to allow the antibodies and the antibody conjugates to form immunocomplexes.

38. The method of any of embodiments 1-36, wherein providing the sample comprises contacting the sample with a first antibody that specifically binds the first analyte and a second antibody that specifically binds the second analyte, wherein the first fluorescent label is attached directly to the first antibody, or the second fluorescent label is attached directly to the second antibody, or both of the foregoing.

39. The method of any of the preceding embodiments, wherein the first analyte and the second analyte comprise proteins or membrane-bound proteins.

40. The method of any of the preceding embodiments, wherein one of the first analyte and the second analyte is a reference protein, and the other of the first analyte and the second analyte is an unknown protein, and further comprising: normalizing the second detection signal to the first detection signal, or normalizing the first detection signal to the second detection signal.

41. The method of any of the preceding embodiments, wherein one of the first analyte and the second analyte is an unmodified protein, and the other of the first analyte and the second analyte is a modified or phosphorylated version of the protein, and further comprising calculating a ratio of the modified or phosphorylated version of the protein to the unmodified protein based on the measured intensities of the first detection signal and the second detection signal.

42. The method of any of the preceding embodiments, comprising directing the first detection signal and the second detection signal through a common emission filter or through different emission filters.

43. The method of any of the preceding embodiments, wherein irradiating the first fluorescent label and irradiating the second fluorescent label are done simultaneously or sequentially.

44. The method of any of the preceding embodiments, wherein providing the sample comprises providing a plurality of samples, and further comprising: performing multiplexed fluorescence detection on each sample by performing, on each sample, the steps of irradiating the first fluorescent label, irradiating the second fluorescent label, measuring an intensity of the first detection signal, and measuring an intensity of the second detection signal.

45. The method of embodiment 44, wherein performing multiplexed fluorescence detection on each sample comprises optically aligning the respective samples with a light source configured for generating the first excitation light and the second excitation light and a light detector configured for measuring the first detection signal and the second detection signal.

46. The method of embodiment 45, wherein: optically aligning the respective samples with the light source and the light detector comprises optically aligning the respective samples with a cartridge; the cartridge is removably installed in an apparatus housing of a fluorescence detection apparatus such that the cartridge communicates with the fluorescence detection apparatus optically and/or electrically; the cartridge encloses excitation optics defining an optical path from the light source to an aligned sample, or emission optics defining an optical path from the aligned sample to the light detector, or both of the foregoing; the light source is disposed in the cartridge or in the apparatus housing; and the light detector is disposed in the cartridge or in the apparatus housing.

47. The method of any of embodiments 44-46, wherein the samples are respectively disposed in separate wells of a multi-well plate or separate blots of a membrane.

48. A fluorescence detection apparatus configured for performing at least the irradiating and measuring steps of the method of any of the preceding embodiments, the fluorescence detection apparatus comprising: a light source configured for generating the first excitation light and the second excitation light, and a light detector configured for measuring the first detection signal and the second detection signal.

49. The fluorescence detection apparatus of embodiment 48, comprising at least one of: the light source comprises a first light source configured for generating the first excitation light and a second light source configured for generating the second excitation light; the light detector comprises a first light detector configured for measuring the first detection signal and a second light detector configured for measuring the second detection signal.

50. The fluorescence detection apparatus of embodiment 49, further comprising a third light source configured for generating the third excitation light, and a third light detector configured for measuring the third detection signal.

51. A fluorescence detection apparatus, comprising: a sample support configured for supporting a sample, the sample comprising a first fluorescent label bound to a first analyte and a second fluorescent label bound to a second analyte, wherein the first fluorescent label comprises an upconverting phosphor (UCP) and the second fluorescent label comprises a non-UCP label; a light source configured for generating a first excitation light at a first excitation wavelength and a second excitation light at a second excitation wavelength different from the first excitation wavelength; a light detector configured for measuring a first detection signal emitted from the sample at a first emission wavelength in response to excitation by the first excitation light, and a second detection signal emitted from the sample at a second emission wavelength in response to excitation by the second excitation light; and a computing device configured for: controlling the light source to respectively generate the first excitation light and the second excitation light at predetermined excitation times and for predetermined durations: and controlling the light detector to measure the first detection signal at a first measurement time, and to measure the second detection signal at a second measurement time.

52. The fluorescence detection apparatus of embodiment 51, wherein the computing device is configured for receiving an electrical output from the light detector corresponding to measurements of the first detection signal and the second detection signal, and correlating the measurements with the amount of the first analyte in the sample the amount of the second analyte in the sample.

53. The fluorescence detection apparatus of embodiment 51, wherein the computing device is configured for controlling the light source to cease generating the second excitation light, and controlling the light detector to measure the second detection signal after ceasing generating the second excitation light.

54. The fluorescence detection apparatus of any of embodiments 48-53, wherein: the sample comprises a third fluorescent label bound to a third analyte, the third fluorescent label comprising a non-UCP label different from the second fluorescent label; the light source is configured for generating a third excitation light at a third excitation wavelength different from the first excitation wavelength and the second excitation wavelength; the light detector is configured for measuring a third detection signal at a third emission wavelength; and the computing device is configured for: controlling the light source to generate the third excitation light at a predetermined excitation time and for a predetermined duration; and controlling the light detector to measure the third detection signal at a third measurement time.

55. The fluorescence detection apparatus of embodiment 54, wherein the computing device is configured for controlling the light source to cease generating the third excitation light, and controlling the light detector to measure the third detection signal at a third measurement time different from the first measurement time and the second measurement time after ceasing generating the third excitation light.

56. The fluorescence detection apparatus of any of embodiments 48-55, comprising an apparatus housing, a cartridge removably installed in the apparatus housing, excitation optics configured for defining an optical path from the light source to the sample, and emission optics configured for defining an optical path from the sample to the light detector, wherein the light source is disposed in the cartridge or in the apparatus housing; the light detector is disposed in the cartridge or in the apparatus housing, and the computing device is disposed in the apparatus housing.

57. The fluorescence detection apparatus of embodiment 56, wherein at least one of the excitation optics and the emission optics is disposed in the cartridge.

58. The fluorescence detection apparatus of any of embodiments 48-57, wherein the sample support comprises or is configured for supporting a multi-well plate or a multi-blot membrane.

60. A method for multiplexed time-resolved fluorescence (TRF) detection includes:

providing one or more samples comprising a first fluorescent label bound to a first analyte and a second fluorescent label bound to a second analyte, a third fluorescent label bound to a third analyte, and a fourth fluorescent label bound to a fourth analyte, wherein
the first fluorescent label emits at a first emission wavelength having a first lifetime,
the second fluorescent label emits at a second emission wavelength having a second lifetime,
the third fluorescent label comprises an upconverting phosphor (UCP) emitting at a third emission wavelength having a third lifetime, and
the fourth fluorescent label comprises an infrared dye emitting infrared light at a fourth emission wavelength having a fourth lifetime;

irradiating the first fluorescent label with a first excitation light at a first excitation wavelength, wherein the first fluorescent label upon irradiation with the first excitation wavelength emits a first detection signal at the first emission wavelength;

irradiating the second fluorescent label with a second excitation light at a second excitation wavelength different from the first excitation wavelength, wherein the second fluorescent label upon irradiation with the second excitation wavelength emits a second detection signal at the second emission wavelength:

irradiating the third fluorescent label with a third excitation light at a third excitation wavelength different from the first excitation wavelength and different from the second excitation wavelength, wherein the third fluorescent label upon irradiation with the third excitation wavelength emits a third detection signal at the third emission wavelength;

irradiating the fourth fluorescent label with a fourth excitation light at a fourth excitation wavelength different from the first excitation wavelength, different from the second excitation wavelength, and different from the third excitation wavelength, wherein the fourth fluorescent label upon irradiation with the fourth excitation wavelength emits a fourth detection signal at the third emission wavelength; and measuring as a function of time at least one intensity of at least one of the first emission wavelength, the second emission wavelength, the third emission wavelength, and the fourth emission wavelength for a first duration, and measuring at least a different one of the first emission wavelength, the second emission wavelength, the third emission wavelength, and the fourth emission wavelength for a second duration.

In this embodiment, the multiplexed time-resolved fluorescence can be made with respect to any of the four (4) emission wavelengths, a combination of any of the four emission wavelengths, or all of the four emission wavelengths. In some cases, the lifetimes of the fluorescent labels make the measuring as a function of time an emission signal coincident with the excitation light or for a relatively short time (e.g., less than 100 ns) after excitation.

61. The method of embodiment 60, wherein
excitation light directed to one of the first fluorescent label, the second fluorescent label, the third fluorescent label, and the fourth fluorescent label does not stimulate a secondary emission (which might if measured be mistaken as one of the first, second, third, and fourth detection signals) from any of the remaining fluorescent labels, or an emission from one of the first fluorescent label, the second fluorescent label, the third fluorescent label, and the fourth fluorescent label does not stimulate a secondary emission (which might if measured be mistaken as one of the first, second, third, and fourth detection signals) from any of the remaining fluorescent labels.

62. The method of embodiment 60, wherein the measuring intensities comprises:
measuring an intensity of the first detection signal at a first measurement time, wherein the intensity of the first detection signal is correlated with the amount of the first analyte in the sample; and after ceasing irradiating the first fluorescent label and the second fluorescent label, measuring an intensity of the second detection signal at a second measurement time, wherein the intensity of the second detection signal is correlated with the amount of the second analyte in the sample.

63. The method of embodiment 62, wherein the measuring intensities further comprises:
measuring an intensity of the third detection signal from the UCP at a third measurement time, wherein the intensity of the third detection signal is correlated with the amount of the third analyte in the sample; and measuring an intensity of the fourth detection signal from the infrared dye at a fourth measurement time, wherein the intensity of the fourth detection signal is correlated with the amount of the fourth analyte in the sample.

64. The method of embodiment 63, wherein at least one of the first measurement time and the second measurement time is different from the third measurement time or the fourth measurement time.

65. The method of embodiment 60, wherein the first excitation wavelength comprises at least one visible wavelength, the second excitation wavelength comprises at least one ultraviolet light, the third excitation wavelength comprises a first infrared wavelength, and the fourth excitation wavelength comprises a second infrared wavelength different from the first infrared wavelength.

66. The method of embodiment 60, wherein the first excitation wavelength, the second excitation wavelength, the third excitation wavelength, the first emission wavelength, the second emission wavelength, the third emission wavelength are different wavelengths (preferably spectrally resolvable from each other) separated from each other by 5-10 nm, by 10-20 nm, or by 20-100 nm, or by 250-350 nm, or by 300-600 nm).

67. The method of embodiment 60, wherein the infrared dye comprises at least one of a) first IR emitter and a second IR emitter, having different excitation and emission wavelengths.

68. The method of embodiment 60, wherein the infrared dye comprises both a) first IR emitter and a second IR emitter, having different excitation and emission wavelengths.

69. The method of embodiment 60, wherein
the first fluorescent label comprises Ru excited at 470 nm and emitting at 624 nm; and
the second fluorescent label comprises Eu excited at 370 nm and emitting at 616 nm.

70. The method of embodiment 69, wherein:
the third fluorescent label comprising the UCP is excited with first near infrared light (e.g., at 980 nm) and emits at a shorter wavelength than the first near infrared light (e.g., in the wavelength range between 450 nm and 750 nm depending on the UCP material of construction).

the fourth fluorescent label comprising the infrared dye is excited with a second near infrared light (e.g., at 680 nm or 780 nm) and emits at a longer wavelength than the second near infrared light (e.g., at 730 nm or 810 nm).

71. The method of embodiment 70, wherein the infrared dye comprises a first infrared dye and a second infrared dye, respectively, excited at 680 nm or 780 nm and emitting respectively at 730 nm or 810 nm.

72. The method of embodiment 60, wherein the first fluorescent label or the second fluorescent label comprises at least one dopant selected from the group consisting of ruthenium (Ru(II)), osmium (Os(II)), rhenium (Re(I)); samarium (Sm(III)), dysprosium (Dy(III)), europium (Eu (III)), and terbium (Tb(I)).

73. The method of embodiment 60, wherein the UCP comprises at least one dopant ion selected from the group consisting of erbium ($Er^{3+}$), thulium ($Tm^{3+}$), holmium ($Ho^{3+}$), praseodymium ($Pr^{3+}$), neodymium ($Nd^{3+}$), dysprosium ($Dy^{3+}$), ytterbium ($Yb^{3+}$), and samarium ($Sm^{3+}$).

74. The method of embodiment 60, wherein
the first lifetime of the first fluorescent label is in a range of 1 ns to 1 µs,
the second lifetime of the second fluorescent label is in a range of 10 µs to 1 ms,
the third lifetime of the UCP is in a range of 1 ns to 1 ms, and
the fourth lifetime of the infrared dye is in a rage of 0.1 ns to 100 ns.

75. The method of embodiment 60, wherein providing the sample comprises:
contacting the sample with:
a first antibody that specifically binds the first analyte,
a second antibody that specifically binds the second analyte, a third antibody that specifically binds the third analyte,
a fourth antibody that specifically binds the third analyte,
a first fluorescent antibody conjugate that specifically binds the first antibody,
wherein the first fluorescent antibody conjugate comprises the first fluorescent label,
a second fluorescent antibody conjugate that specifically binds the second antibody, wherein the second fluorescent antibody conjugate comprises the second fluorescent label,
a third fluorescent antibody conjugate that specifically binds the third antibody, wherein the third fluorescent antibody conjugate comprises the third fluorescent label including the UCP, and
a fourth fluorescent antibody conjugate that specifically binds the fourth antibody, wherein the fourth fluorescent antibody conjugate comprises the fourth fluorescent label including the infrared dye, and further comprising
incubating the sample under conditions and for a time sufficient to allow the antibodies and the antibody conjugates to form immunocomplexes.

76. The method of embodiment 60, wherein one of the first analyte, the second analyte, the third analyte, and the fourth analyte comprise proteins or membrane-bound proteins.

77. The method of embodiment 60, wherein one of the first analyte, the second analyte, the third analyte, and the fourth analyte is a reference protein, and remaining ones of the first analyte, the second analyte, the third analyte, and the fourth analyte are unknown proteins, and further comprising: normalizing at least one of the first detection signal, the second detection signal, the third detection signal, and the fourth detection signal to a detected signal from the reference protein.

78. The method of embodiment 60, wherein providing the sample comprises providing a plurality of samples, and further comprising: performing multiplexed fluorescence detection on each sample by performing, on each sample, the measuring as a function of time the intensities of the at least one of the first emission wavelength, the second emission wavelength, the third emission wavelength, and the fourth emission wavelength.

79. A fluorescence detection apparatus configured for performing at least the irradiating and measuring steps of the method of any of claims 60-78, the fluorescence detection apparatus comprising:
one or more light sources configured for generating the first excitation light, the second excitation light, the third excitation light, and the fourth excitation light; and
one or more light detectors configured for measuring the first detection signal, the second detection signal, the third detection signal, and the fourth detection signal.

80. A computer-readable storage medium including instructions for performing all or part of any of the methods described above or set forth in these embodiments. The computer-readable storage medium can be installed on any of the apparatuses described above or set forth in these embodiments.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the computing device 236 schematically depicted in FIG. 2. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), or application specific integrated circuits (ASICs). Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the computing device 236 in FIG. 2), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

The invention claimed is:

1. A method for multiplexed time-resolved fluorescence (TRF) detection includes:
    providing one or more samples comprising a first fluorescent label bound to a first analyte, a second fluorescent label bound to a second analyte, a third fluorescent label bound to a third analyte, and a fourth fluorescent label bound to a fourth analyte, wherein
        the first fluorescent label comprises a transition metal chelate and emits at a first emission wavelength having a first lifetime,
        the second fluorescent label comprises a lanthanide chelate and emits at a second emission wavelength having a second lifetime,
        the third fluorescent label comprises an upconverting phosphor (UCP) emitting at a third emission wavelength having a third lifetime, wherein the UCP is a lanthanide-doped or transition metal-doped inorganic compound exhibiting an anti-Stokes shift, and
        the fourth fluorescent label comprises a first infrared dye emitting at a fourth emission wavelength having a fourth lifetime;
    irradiating the first fluorescent label with a first excitation light at a first excitation wavelength, wherein the first fluorescent label upon irradiation with the first excitation wavelength emits a first detection signal at the first emission wavelength:
    irradiating the second fluorescent label with a second excitation light at a second excitation wavelength different from the first excitation wavelength, wherein the second fluorescent label upon irradiation with the second excitation wavelength emits a second detection signal at the second emission wavelength;
    irradiating the third fluorescent label with a third excitation light at a third excitation wavelength different from the first excitation wavelength and different from the second excitation wavelength, wherein the third fluorescent label upon irradiation with the third excitation wavelength emits a third detection signal at the third emission wavelength;
    irradiating the fourth fluorescent label with a fourth excitation light at a fourth excitation wavelength different from the first excitation wavelength, different from the second excitation wavelength, and different from the third excitation wavelength, wherein the fourth fluorescent label upon irradiation with the fourth excitation wavelength emits a fourth detection signal at the fourth emission wavelength: and
    measuring as a function of time at least one intensity of at least one of the first emission wavelength, the second emission wavelength, the third emission wavelength, and the fourth emission wavelength for a first duration, and measuring at least a different one of the first emission wavelength, the second emission wavelength, the third emission wavelength, and the fourth emission wavelength for a second duration.

2. The method of claim 1, wherein excitation light directed to the first fluorescent label does not stimulate a secondary emission from any of the second, third and fourth fluorescent labels,
    excitation light directed to the second fluorescent label, does not stimulate a secondary emission from any of the first, third and fourth fluorescent labels,
    excitation light directed to the third fluorescent label, does not stimulate a secondary emission from any of the first, second and fourth fluorescent labels,
    excitation light directed to the fourth fluorescent label, does not stimulate a secondary emission from any of the first, second and third fluorescent labels, and
    wherein an emission from the first fluorescent label does not stimulate a secondary emission from any of the second, third and fourth fluorescent labels,
    an emission from the second fluorescent label does not stimulate a secondary emission from any of the first, third and fourth fluorescent labels,
    an emission from the third fluorescent label does not stimulate a secondary emission from any of the first, second and fourth fluorescent labels,
    an emission from the fourth fluorescent label does not stimulate a secondary emission from any of the first, second and third fluorescent labels.

3. The method of claim 1, wherein the measuring step comprises:
    measuring the intensity of the first detection signal at a first measurement time, wherein the intensity of the first detection signal is correlated with the amount of the first analyte in the sample;
    ceasing irradiating the first and second fluorescent labels; and
    after ceasing irradiating the first fluorescent label and the second fluorescent label, measuring the intensity of the second detection signal at a second measurement time different from the first measurement time, wherein the intensity of the second detection signal is correlated with the amount of the second analyte in the sample.

4. The method of claim 3, wherein the measuring step further comprises:
    measuring the intensity of the third detection signal from the UCP at a third measurement time, wherein the intensity of the third detection signal is correlated with the amount of the third analyte in the sample; and
    measuring the intensity of the fourth detection signal from the infrared dye at a fourth measurement time, wherein the intensity of the fourth detection signal is correlated with the amount of the fourth analyte in the sample.

5. The method of claim 4, wherein at least one of the first measurement time and the second measurement time is different from the third measurement time or the fourth measurement time.

6. The method of claim 1, wherein the first excitation wavelength comprises at least one visible wavelength, the second excitation wavelength comprises at least one ultraviolet light, the third excitation wavelength comprises a first infrared wavelength, and the fourth excitation wavelength comprises a second infrared wavelength different from the first infrared wavelength.

7. The method of claim 1, wherein the first excitation wavelength, the second excitation wavelength, the third excitation wavelength, the first emission wavelength, the second emission wavelength, the third emission wavelength are different wavelengths spectrally resolved from each other.

8. The method of claim 1, wherein the one or more samples comprise a fifth fluorescent label bound to a fifth analyte, the fifth fluorescent label comprising a second infrared dye having different excitation and emission wavelengths than the first infrared dye.

9. The method of claim 1, wherein the first fluorescent label comprises ruthenium (Ru) excited at 470 nm and emitting at 624 nm; and the second fluorescent label comprises europium (Eu) excited at 370 nm and emitting at 616 nm.

10. The method of claim 9, wherein
the third fluorescent label comprising the UCP is excited with a first near infrared light and emits at a shorter wavelength than the first near infrared light,
the fourth fluorescent label comprising the first infrared dye is excited with a second near infrared light and emits at a longer wavelength than the second near infrared light.

11. The method of claim 10, wherein the first infrared dye is excited at 680 nm or 780 nm and emits at 730 nm or 810 nm, respectively.

12. The method of claim 1, wherein the first fluorescent label or the second fluorescent label comprises at least one dopant selected from the group consisting of ruthenium (Ru(II)), osmium (Os(II)), rhenium (Re(I)); samarium (Sm (III)), dysprosium (Dy(III)), europium (Eu(III)), and terbium (Tb(III)).

13. The method of claim 1, wherein the UCP comprises at least one dopant ion selected from the group consisting of erbium ($Er^{3+}$), thulium ($Tm^{3+}$), holmium ($Ho^{3+}$), praseodymium ($Pr^{3+}$), neodymium ($Nd^{3+}$), dysprosium ($Dy^{3+}$), ytterbium ($Yb^{3+}$), and samarium ($Sm^{3+}$).

14. The method of claim 1, wherein the first lifetime of the first fluorescent label is in a range of 1 ns to 1 µs, the second lifetime of the second fluorescent label is in a range of 10 µs to 1 ms, the third lifetime of the UCP is in a range of 1 ns to 1 ms; and the fourth lifetime of the infrared dye is in a rage of 0.1 ns to 100 ns.

15. The method of claim 1, wherein providing the one or more samples comprises contacting the one or more samples with:

a first antibody that specifically binds the first analyte,
a second antibody that specifically binds the second analyte,
a third antibody that specifically binds the third analyte,
a fourth antibody that specifically binds the fourth analyte,
a first fluorescent antibody conjugate that specifically binds the first antibody, wherein the first fluorescent antibody conjugate comprises the first fluorescent label,
a second fluorescent antibody conjugate that specifically binds the second antibody, wherein the second fluorescent antibody conjugate comprises the second fluorescent label,
a third fluorescent antibody conjugate that specifically binds the third antibody, wherein the third fluorescent antibody conjugate comprises the third fluorescent label including the UCP, and
a fourth fluorescent antibody conjugate that specifically binds the fourth antibody, wherein the fourth fluorescent antibody conjugate comprises the fourth fluorescent label including the infrared dye; and further comprising
incubating the one or more samples under conditions and for a time sufficient to allow the antibodies and the antibody conjugates to form immunocomplexes.

16. The method of claim 1, wherein one of the first analyte, the second analyte, the third analyte, and the fourth analyte comprise proteins or membrane-bound proteins.

17. The method of claim 1, wherein one of the first analyte, the second analyte, the third analyte, and the fourth analyte is a reference protein, and remaining ones of the first analyte, the second analyte, the third analyte, and the fourth analyte are protein analytes in unknown amounts, the method further comprising normalizing at least one of the first detection signal, the second detection signal, the third detection signal, and the fourth detection signal to signal detected from the reference protein.

18. The method of claim 1, wherein providing the one or more samples comprises providing a plurality of samples.

19. The method of claim 6, wherein the fourth excitation wavelength comprises a second infrared wavelength in a range of from about 680 nm to about 800 nm.

20. The method of claim 18, wherein the measuring step comprises measuring as a function of time the intensity of at least one of the first emission wavelength, the second emission wavelength, the third emission wavelength and the fourth emission wavelength for each of the plurality of samples.

* * * * *